(12) United States Patent
Hall-Goulle

(10) Patent No.: US 8,399,161 B2
(45) Date of Patent: Mar. 19, 2013

(54) TRANSPARENT COLOURANTS AND COLOURANT COMPOSITIONS, AND THEIR USE

(75) Inventor: Véronique Hall-Goulle, Dornach (CH)

(73) Assignee: BASF SE, Ludwigshafen (DE)

( * ) Notice: Subject to any disclaimer, the term of this patent is extended or adjusted under 35 U.S.C. 154(b) by 693 days.

(21) Appl. No.: 12/527,042

(22) PCT Filed: Feb. 13, 2008

(86) PCT No.: PCT/EP2008/051699
§ 371 (c)(1),
(2), (4) Date: Aug. 13, 2009

(87) PCT Pub. No.: WO2008/101841
PCT Pub. Date: Aug. 28, 2008

(65) Prior Publication Data
US 2010/0021831 A1    Jan. 28, 2010

(30) Foreign Application Priority Data
Feb. 23, 2007    (EP) ..................... 07102942

(51) Int. Cl.
*G02B 5/20* (2006.01)
(52) U.S. Cl. .......... 430/7; 430/270.1; 106/493; 427/164
(58) Field of Classification Search .......... None
See application file for complete search history.

(56) References Cited

U.S. PATENT DOCUMENTS

| 3,441,536 A * | 4/1969 | Dien .............................. 524/358 |
| 4,359,570 A | 11/1982 | Davis |
| 4,405,211 A | 9/1983 | Harrison et al. |
| 4,420,581 A | 12/1983 | Mcfarlane |
| 5,304,245 A * | 4/1994 | Mochizuki et al. ........... 106/493 |
| 6,818,304 B2 | 11/2004 | Miyako et al. |
| 7,029,526 B2 | 4/2006 | Hall-Goulle et al. |
| 2004/0232382 A1 | 11/2004 | Okamura |
| 2005/0095530 A1* | 5/2005 | Hosaka et al. ............. 430/270.1 |
| 2006/0225227 A1 | 10/2006 | Luttringer et al. |
| 2007/0000076 A1 | 1/2007 | Hall-Goulle |
| 2007/0058014 A1 | 3/2007 | Burglin |

FOREIGN PATENT DOCUMENTS

| DE | 2200115 A1 | 7/1973 |
| DE | 3314467 A1 | 1/1984 |
| EP | 0040139 | 5/1981 |
| EP | 0103095 B1 | 7/1983 |
| EP | 0 632 108 A1 * | 1/1995 |
| EP | 1291379 A1 | 3/2003 |
| GB | 2082196 A | 3/1982 |
| JP | 6264865 | 9/1985 |
| JP | 7-043948 A * | 2/1995 |
| JP | 09316115 | 5/1997 |
| WO | 03035770 A2 | 5/2003 |
| WO | 2004094532 A1 | 11/2004 |
| WO | 2005024123 A2 | 3/2005 |
| WO | 2005040492 A1 | 5/2005 |

OTHER PUBLICATIONS

Computer-generated translation of JP 7-043948 (Feb. 1995).*
Patent Abstracts of JP62064865, (Mar. 1987).
Patent Abstracts of JP09316115, (Dec. 1997).
Patent Abstracts of JP05-331378, (Dec. 1993).
Colour Index International—C.I. Solvent Yellow 167, (Feb. 2007).
Patent Abstracts of JP2000-281928, (Oct. 2000).
Derwent Abstract No. 2003-847895/79 of JP 2003238963, (Aug. 2003).
CAS Registry [73507-58-1], (Nov. 1984).
Derwent abstract of DE 2200115, (Jul. 1973).

* cited by examiner

*Primary Examiner* — John A. McPherson
(74) *Attorney, Agent, or Firm* — Shruti Costales

(57) ABSTRACT

A colorant composition comprising in a weight ratio of from 99:1 to 10:90, a pigment of average particle size from 10 to 200 nm and a compound of the formula

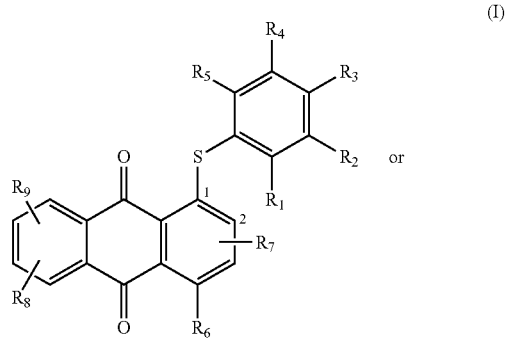

(I)

or

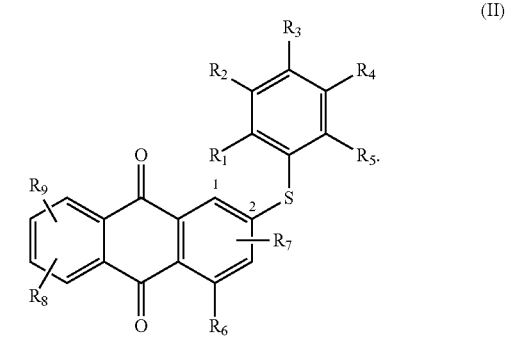

(II)

8 Claims, No Drawings

TRANSPARENT COLOURANTS AND COLOURANT COMPOSITIONS, AND THEIR USE

The invention relates to the field of pigmented colour filters. Normally, trichromatism is achieved by using one blue, one red and one green filter, or alternatively one yellow, one magenta and one cyan filter. These filters must be highly transparent, homogeneous and able to be prepared in a very uniform layer thickness with precise pattern.

The correct position and the absolute value of the transmission window are very important parameters for colour filters. There is a desire for high transmission in the wavelength range surrounding the light emission, coupled with as high as possible an absorption for different-coloured light. In addition, there is a strongly increasing demand for a higher display contrast (ratio of luminances in the ON/OFF states).

EP-A-1 291 379 discloses optical films for plasma displays, comprising violet to blue anthraquinone type colourants and a near infrared absorber. The purpose of using violet to blue colourants and infrared absorbers in plasma displays is to correct the colour tone and avoid interference with infrared remote controls by absorbing the undesirable light emissions of the usual neon/xenon light sources at 590 nm (Ne) and at 850 nm and above (Xe). These optical films are homogeneously coloured.

WO-03/035770 discloses a process for making green pigment compositions for colour filters by kneading both components with salt in the presence of a liquid.

JP-A-H05/331378 discloses pigment compositions for colour filters comprising yellow anthraquinone pigments of the formula

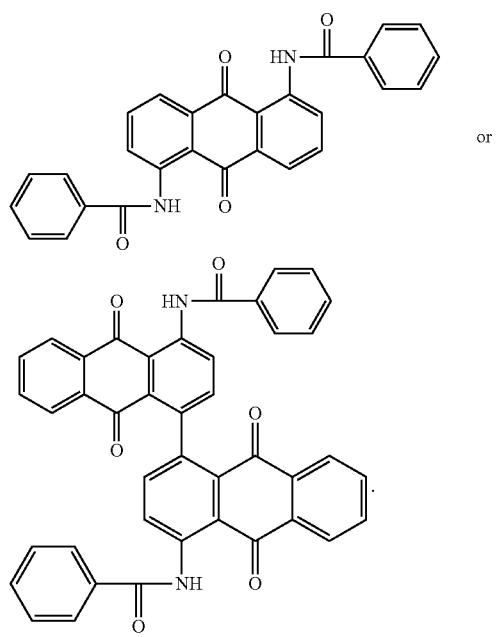

or

JP-A-2000/281928 discloses pigment compositions for pseudo yellow colour filters comprising anthraquinone pigments for example of the formula

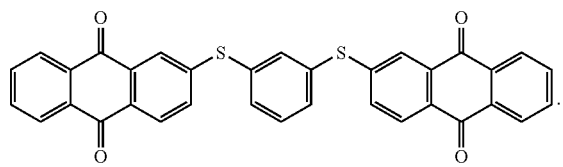 [SMILES: O=C1c2ccccc2C(=O)c2cc(Sc3cccc(Sc4ccc5c(c4)C(=O)c4ccccc4C5=O)c3)ccc21]

C. I. Solvent Yellow 167 is a known solvent dye of the formula

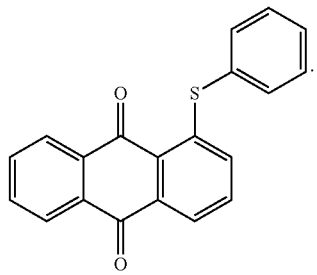

Substituted derivatives thereof have been used for example as intermediates (US-A-2004/0232382), as pleochroic colourants for liquid crystals (JP-A-2003/238963, DE-A-33 14 467 or GB-A-2082196) or as disperse dyes for textile materials (WO-2005/024123), optionally using inkjet printing (WO-2005/040492).

CAS Registry [73507-58-1] is a compound about which nothing else but the formula is known:

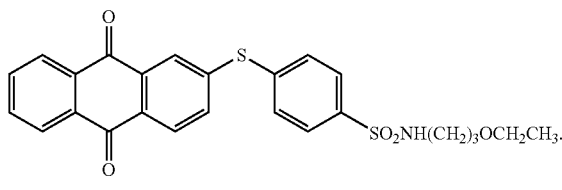

Further known compounds are disclosed in U.S. Pat. No. 4,359,570, U.S. Pat. No. 4,420,581, EP-A-0040 139, JP-A-S62/064865 and DE-OS-2200 115.

It has now surprisingly been found that the transmission of pigmented colour filters is improved by adding certain 1- or 2-phenylthio-substituted anthraquinones of greenish-yellow colour hue, lacking electron-rich $N^{(II)}$, $O^{(II)}$ and further $S^{(II)}$ substituents on the anthraquinone ring.

Thus, the invention relates to a colourant composition comprising in a weight ratio of from 99:1 to 10:90, preferably a weight ratio of from 95:5 to 30:70, particularly preferred a weight ratio of from 95:5 to 50:50, a pigment of average particle size from 10 to 200 nm and a compound of the formula (I)

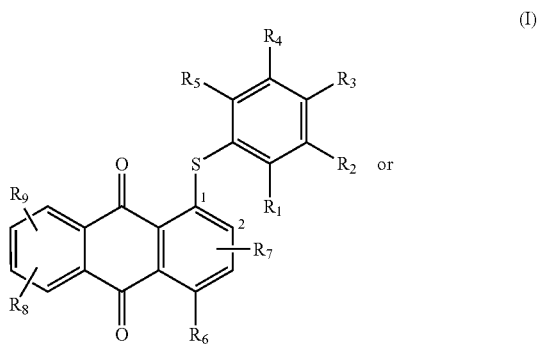

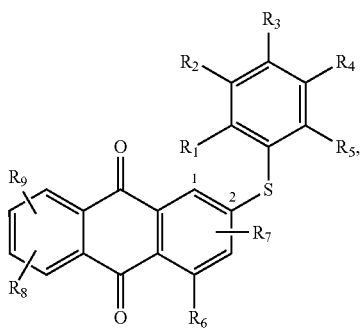

(II)

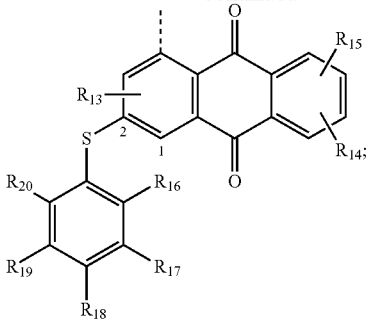

wherein
$R_1$, $R_2$, $R_3$, $R_4$, $R_5$, $R_6$, $R_7$, $R_8$ and $R_9$ are, each independently of all others, H, Br, Cl, F, $SOR_{10}$, $SO_2R_{10}$, $SO_3R_{10}$, $SO_2NR_{11}R_{12}$, $NO_2$, CN, $COR_{10}$, $COOR_{10}$ or $CONR_{11}R_{12}$; $C_1$-$C_{12}$alkyl, $C_3$-$C_{12}$cycloalkyl, $C_2$-$C_{12}$alkenyl, $C_3$-$C_{12}$cycloalkenyl or $C_2$-$C_{12}$alkynyl, each of which is unsubstituted or substituted one or several times by Cl, F, OH, $OR_{10}$, $SR_{10}$, $SOR_{10}$, $SO_2R_{10}$, $NR_{11}R_{12}$, CN, $COR_{10}$, $COOR_{10}$ or $CONR_{11}R_{12}$; $C_7$-$C_{12}$aralkyl or $C_6$-$C_{12}$aryl, each of which is unsubstituted or substituted one or several times by $SO_3R_{10}$, $SO_2NR_{11}R_{12}$, $NO_2$, Br, Cl, F, OH, $OR_{10}$, $SR_{10}$, $SOR_{10}$, $SO_2R_{10}$, $NR_{11}R_{12}$, CN, $COR_{10}$, $COOR_{10}$ or $CONR_{11}R_{12}$;

or any of $R_1$, $R_2$, $R_3$, $R_4$ and $R_5$ is, each independently of all others, OH, $OR_{10}$, $SR_{10}$, $SOR_{10}$, $SO_2R_{10}$, or $NR_{11}R_{12}$;

or $R_4$ is together with $R_3$ or with $R_5$ 1,3-propylen, 1,3-propenylen, 1,4-butylen, 1,4-buten(1)ylen or 1,4-buten(2)ylen, each of which is unsubstituted or substituted one or several times by Cl, F, OH, $OR_{10}$, $SR_{10}$, $SOR_{10}$, $SO_2R_{10}$, $NR_{11}R_{12}$, CN, $COR_{10}$, $COOR_{10}$ or $CONR_{11}R_{12}$, or 1,4-butadienylen which is unsubstituted or substituted one or several times by $SO_3R_{10}$, $SO_2NR_{11}R_{12}$, $NO_2$, Br, Cl, F, OH, $OR_{10}$, $SR_{10}$, $SOR_{10}$, $SO_2R_{10}$, $NR_{11}R_{12}$, CN, $COR_{10}$, $COOR_{10}$ or $CONR_{11}R_{12}$;

or $R_6$ is a radical of formula

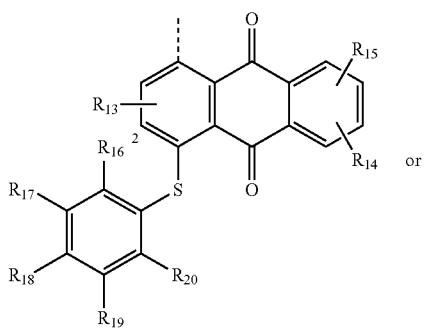

or $R_7$ is a direct bond from C in position 1 or 2 of the anthraquinone substructure to $R_1$;

$R_{10}$ is $[C_2$-$C_6$alkylene-O$]_nC_1$-$C_{12}$alkyl, $[C_2$-$C_6$alkylene-NH$]_n$ $C_1$-$C_{12}$alkyl, $C_1$-$C_{12}$alkyl, $C_3$-$C_{12}$cycloalkyl, $C_2$-$C_{12}$alkenyl, $C_3$-$C_{12}$cycloalkenyl or $C_2$-$C_{12}$alkynyl, each of which is unsubstituted or substituted one or several times by Cl, F, $OR_{21}$, $NR_{22}R_{23}$, CN, $COR_{21}$, $COOR_{21}$ or $CONR_{22}R_{23}$; $C_7$-$C_{12}$aralkyl or $C_6$-$C_{12}$aryl, each of which is unsubstituted or substituted one or several times by $NO_2$, $SOR_{21}$, $SO_2R_{21}$, $SO_3R_{21}$, $SO_2NR_{22}R_{23}$, Br, Cl, F, $OR_{21}$, $SR_{21}$, $NR_{22}R_{23}$, CN, $COR_{21}$, $COOR_{21}$ or $CONR_{22}R_{23}$;

$R_{11}$ and $R_{12}$ are independently from one another H, $[C_2$-$C_6$alkylene-O$]_nC_1$-$C_{12}$alkyl, $[C_2$-$C_6$alkylene-NH$]_nC_1$-$C_{12}$alkyl, $C_1$-$C_{12}$alkyl, $C_3$-$C_{12}$cycloalkyl, $C_2$-$C_{12}$alkenyl, $C_3$-$C_{12}$cycloalkenyl or $C_2$-$C_{12}$alkynyl, each of which is unsubstituted or substituted one or several times by Cl, F, $OR_{21}$, $NR_{22}R_{23}$, CN, $COR_{21}$, $COOR_{21}$ or $CONR_{22}R_{23}$; $C_7$-$C_{12}$aralkyl or $C_6$-$C_{12}$aryl, each of which is unsubstituted or substituted one or several times by $NO_2$, $SOR_{21}$, $SO_2R_{21}$, $SO_3R_{21}$, $SO_2NR_{22}R_{23}$, Br, Cl, F, $OR_{21}$, $SR_{21}$, $NR_{22}R_{23}$, CN, $COR_{21}$, $COOR_{21}$ or $CONR_{22}R_{23}$; or $NR_{11}R_{12}$ is a 5-, 6- or 7-membered, saturated, unsaturated or aromatic, heterocyclic N-radical comprising C, N, O and/or S atoms, which heterocyclic N-radical may optionally be annellated with a cyclohexane, cyclohexene or benzene ring and is unsubstituted or substituted one or several times by oxo, hydroxy, $C_1$-$C_{12}$alkoxy, thiono and/or $R_{10}$, two or more $R_{10}$ being identical or different from each other, and which annellated benzene ring is unsubstituted or substituted by $NO_2$, $SOR_{21}$, $SO_2R_{21}$, $SO_3R_{21}$, $SO_2NR_{22}R_{23}$, Br, Cl, F, $OR_{21}$, $NR_{22}R_{23}$, CN, $COR_{21}$, $COOR_{21}$ or $CONR_{22}R_{23}$;

$R_{13}$, $R_{14}$ and $R_{15}$ have independently from $R_7$, $R_8$ and $R_9$ the same definition as $R_7$, $R_8$ and $R_9$, preferably $R_{13}$, $R_{14}$ and $R_{15}$ are each identical to $R_7$, $R_8$ and $R_9$, respectively; or $R_{13}$ is a direct bond from C in position 1 or 2 of the anthraquinone substructure to $R_{16}$;

$R_{16}$, $R_{17}$, $R_{18}$, $R_{19}$ and $R_{20}$ have independently from $R_1$, $R_2$, $R_3$, $R_4$ and $R_5$ the same definition as $R_1$, $R_2$, $R_3$, $R_4$ and $R_5$, preferably $R_{16}$, $R_{17}$, $R_{18}$, $R_{19}$ and $R_{20}$ are each identical to $R_1$, $R_2$, $R_3$, $R_4$ and $R_5$, respectively;

$R_{21}$, $R_{22}$ and $R_{23}$ are independently of one another H; $[C_2$-$C_6$alkylene-O$]_nC_1$-$C_{12}$alkyl, $[C_2$-$C_6$alkylene-NH$]_nC_1$-$C_{12}$alkyl or $C_1$-$C_{12}$alkyl which is unsubstituted or substituted one or several times by F, oxo, OH, $OC_1$-$C_6$alkyl, $NH_2$, $NHC_1$-$C_6$alkyl, $N(C_1$-$C_6$alkyl$)_2$, COOH, $COOC_1$-$C_6$alkyl, $CONHC_1$-$C_6$alkyl, $CON(C_1$-$C_6$alkyl$)_2$ or CN; and n is an integer 1, 2, 3, 4 or 5.

Substituted several times is to be understood as from two to all H atoms of a hydrocarbon radical being substituted. Fully substituted alkyl radicals are for example trifluoromethyl, 2,2,2-trifluoroethyl-1, heptafluoropropyl or perfluorobutyl.

C$_1$-C$_{12}$Alkyl is, for example, methyl, ethyl, n-propyl, isopropyl, n-butyl, sec-butyl, isobutyl, tert-butyl, 2-methyl-butyl, n-pentyl, 2-pentyl, 3-pentyl, 2,2-dimethylpropyl, n-hexyl, heptyl, n-octyl, 1,1,3,3-tetramethylbutyl, 2-ethylhexyl, nonyl, decyl, undecyl or dodecyl.

C$_3$-C$_{12}$Cycloalkyl is, for example, cyclopropyl, cyclopropyl-methyl, cyclobutyl, cyclopentyl, cyclohexyl, cyclohexyl-methyl, trimethylcyclohexyl, thujyl, norbornyl, bornyl, norcaryl, caryl, menthyl, norpinyl, pinyl, 1-adamantyl or 2-adamantyl.

C$_2$-C$_{12}$Alkenyl is, for example, vinyl, allyl, 2-propen-2-yl, 2-buten-1-yl, 3-buten-1-yl, 1,3-butadien-2-yl, 2-penten-1-yl, 3-penten-2-yl, 2-methyl-1-buten-3-yl, 2-methyl-3-buten-2-yl, 3-methyl-2-buten-1-yl, 1,4-pentadien-3-yl, or any desired isomer of hexenyl, octenyl, nonenyl, decenyl or dodecenyl.

C$_3$-C$_{12}$Cycloalkenyl is, for example, 2-cyclobuten-1-yl, 2-cyclopenten-1-yl, 2-cyclohexen-1-yl, 3-cyclohexen-1-yl, 2,4-cyclohexadien-1-yl, 1-p-menthen-8-yl, 4(110)-thujen-10-yl, 2-norbornen-1-yl, 2,5-norbornadiene-1-yl, 7,7-dimethyl-2,4-norcaradien-3-yl or camphenyl.

C$_2$-C$_{12}$Alkynyl is, for example, 1-propyn-3-yl, 1-butyn-4-yl, 1-pentyn-5-yl, 2-methyl-3-butyn-2-yl, 1,4-pentadiyn-3-yl, 1,3-pentadiyn-5-yl, 1-hexyn-6-yl, cis-3-methyl-2-penten-4-yn-1-yl, trans-3-methyl-2-penten-4-yn-1-yl, 1,3-hexadiyn-5-yl, 1-octyn-8-yl, 1-nonyn-9-yl, 1-decyn-10-yl or 1-dodecyn-12-yl.

C$_7$-C$_{12}$Aralkyl is, for example, benzyl, 2-benzyl-2-propyl, β-phenyl-ethyl, 9-fluorenyl, α,α-dimethylbenzyl, ω-phenyl-butyl, ω-phenyl-pentyl or ω-phenyl-hexyl. When C$_7$-C$_{12}$aralkyl is substituted, either the alkyl moiety or the aryl moiety of the aralkyl group can be substituted.

C$_6$-C$_{12}$Aryl is, for example, phenyl, naphthyl or 1-biphenyl.

Halogen is for example F, Cl, Br or J, preferably F on alkyl and Cl or Br on aryl. Heterocyclic groups are for example Preferably, one or two of R$_1$, R$_2$ and R$_3$ are H, and R$_4$ and R$_5$ are both H. More preferably, one of R$_1$, R$_2$ and R$_3$ is SOR$_{10}$, SO$_2$R$_{10}$, SO$_3$R$_{10}$, SO$_2$NR$_{11}$R$_{12}$, CN, COR$_{10}$, COOR$_{10}$ or CONR$_{11}$R$_{12}$, particularly preferably CONR$_{11}$R$_{12}$ or SO$_2$NR$_{11}$R$_{12}$.

Preferably, R$_6$, R$_7$, R$_8$, R$_9$, R$_{13}$, R$_{14}$ and R$_{15}$ are SO$_3$R$_{10}$, SO$_2$NR$_{11}$R$_{12}$, NO$_2$, C$_1$-C$_{12}$alkyl, Cl, F or H, particularly preferably SO$_2$NR$_{11}$R$_{12}$ or H.

Independently of or in combination with above preferences, R$_{10}$, R$_{11}$ or R$_{12}$ preferably comprise a hydroxy group, for example 1, 2 or 3 hydroxy groups.

Suitable compounds of formula (I) or (II) are for example

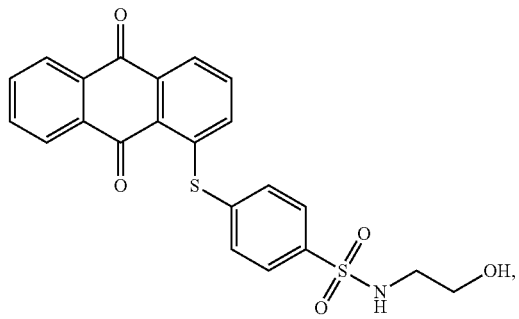

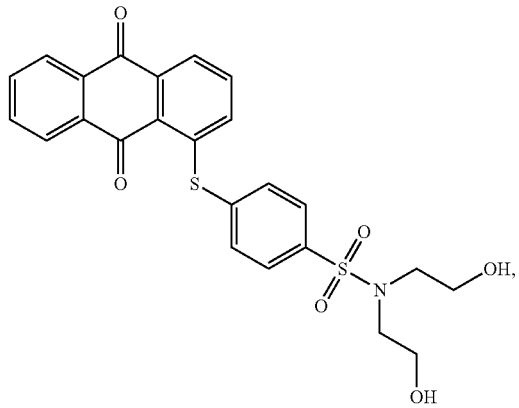

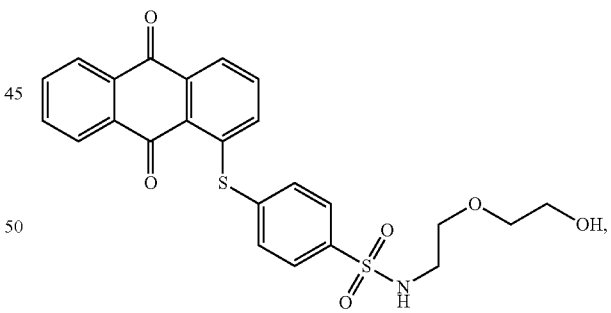

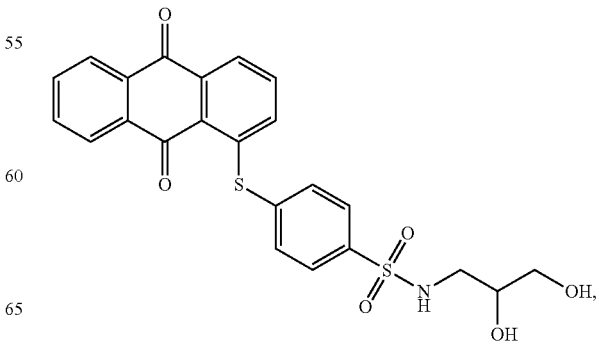

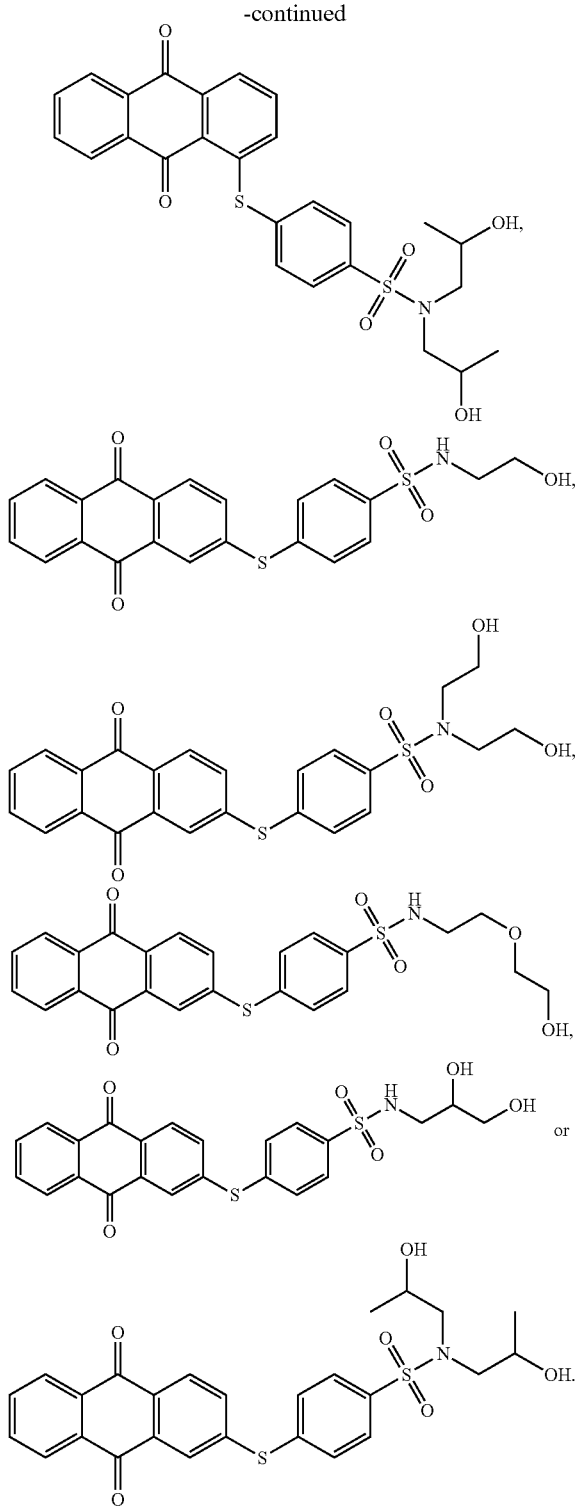

The compounds of formula (I) or (II) are suitably prepared for example by reaction of 1- or 2-halogenated anthraquinones with thiophenol derivatives. They generally exhibit an unusual thermal behaviour, which indicates liquid crystalline properties (Liquid Crystals 27/8, 1075-1085 [2000]).

The pigment can be an inorganic pigment or preferably an organic pigment. Organic pigments comprise for example, but not exclusively, anthanthrone, anthrapyrimidine, aminoanthraquinone, azo such as monoazo, disazo, β-naphthol, naphthol AS, laked azo, azocondensation, benzimidazolone or metal complexes such as metal-complex azo, azomethine, basic dye complex, diketopyrrolopyrrole, dioxazine, flavanthrone, hydroxyanthraquinone, indanthrone, indigo, isoindoline, isoindolinone, isoviolanthrone, nitro, phthalocyanine, perinone, perylene, pteridine, pyranthrone, quinacridone, quinoline, quinophthalone, thioindigo and triaryl-carbonium pigments. Mixtures of pigments may also be used. For further details as to all those organic pigments, reference is made to *Industrial Organic Pigments*, W. Herbst, K. Hunger, $2^{nd}$ edition, VCH Verlagsgesellschaft, Weinheim, 1997.

Pigments useful in combination with compounds of formulae (I) or (II) are, in particular, Colour Index Pigment Yellow 3, 7, 12, 13, 14, 17, 24, 34, 42, 53, 62, 74, 83, 93, 95, 108, 109, 110, 111, 119, 123, 128, 129, 138, 139, 147, 150, 164, 168, 173, 174, 180, 184, 188, 191, 191:1, 191:2, 193, 199, Pigment Orange 5, 13, 16, 34, 40, 43, 48, 49, 51, 61, 64, 71, 73, Pigment Red 2, 4, 5, 23, 48:1, 48:2, 48:3, 48:4, 52:2, 53:1, 57, 57:1, 88, 89, 101, 104, 112, 122, 144, 146, 149, 166, 168, 177, 178, 179, 181, 184, 190, 192, 194, 202, 204, 206, 207, 209, 214, 216, 220, 221, 222, 224, 226, 254, 255, 262, 264, 270, 272, 282, 283, Pigment Brown 23, 24, 33, 42, 43, 44, Pigment Violet 19, 23, 29, 31, 37, 42, Pigment Blue 15, 15:1, 15:2, 15:3, 15:4, 15:6, 16, 25, 26, 28, 29, 60, 64, 66, 80, Pigment Green 7, 17, 36, 37, 50, 3,6-di(3'-cyano-phenyl)-2,5-dihydro-pyrrolo[3,4-c]pyrrole-1,4-dione, 3-phenyl-6-(4'-tert-butyl-phenyl)-2,5-dihydro-pyrrolo[3,4-c]pyrrole-1,4-dione or Vat Red 74.

Especially preferred are pigments, the visible light absorption maxima of which are in the range from 400 to 500 nm and/or from 600 to 700 nm. The visible light range is from 400 to 700 nm. Most preferred pigments are green pigments, in particular halogenated phthalocyanine pigments, especially Colour Index Pigment Green 7, 17, 36 and/or 37. However, it is also suitable to use pigments, the visible light absorption maxima of which are in the range from 500 to 570 nm, in which case the hue angle h of the red pigment is shifted to higher values (CIE-L*C*h colour space).

The instant composition preferably further comprises a photoresist as described below, for example a photoinitiator and a polymerisable monomer.

Thus, the invention further pertains to a composition comprising from 0.1 to 70% by weight of a colourant comprising a pigment of average particle size from 10 to 200 nm and a compound of formula (I) or (II) in a weight ratio of from 99:1 to 10:90, preferably a weight ratio of from 95:5 to 30:70, and a liquid medium comprising a binder or a polymerisable compound.

The 1- or 2-phenylthio-anthraquinone dye can be used as a pure compound, or optionally as a mixture of several 1- and/or 2-phenylthio-anthraquinone dyes of different structures, for example mixtures of isomers or homologues. Pigment mixtures can also be used instead of a pure pigment. Depending on its solubility in the liquid used for dispersing the pigment, the 1- or 2-phenylthio-anthraquinone dye may dissolve partially or completely therein upon dispersion.

Some compounds of formula (I) or (II) are particularly preferred and novel.

Thus, the invention also relates to a compound of formula (I), wherein at least one of $R_1$, $R_2$ and $R_3$ is $SOR_{10}$, $SO_2R_{10}$, $SO_3R_{10}$, $SO_2NR_{11}R_{12}$, CN, $COR_{10}$, $COOR_{10}$ or $CONR_{11}R_{12}$, or at least one of $R_6$, $R_7$, $R_8$ and $R_9$ is $SO_2NR_{11}R_{12}$, with the proviso that the compound is not of formula

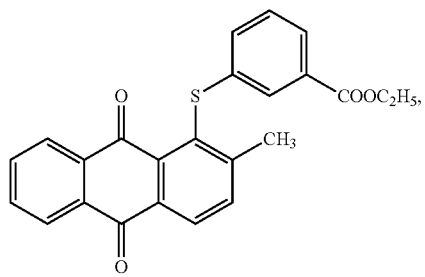

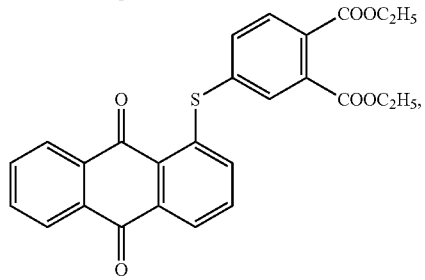

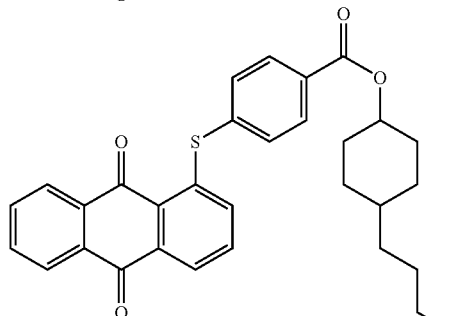

or

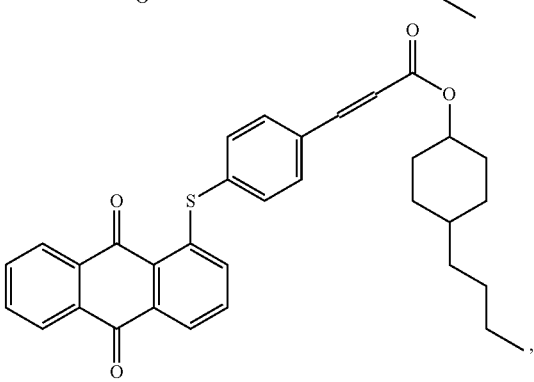

or a compound of formula (II), wherein at least one of $R_1$, $R_2$ and $R_3$ is $SOR_{10}$, $SO_2R_{10}$, $SO_3R_{10}$, $SO_2NR_{11}R_{12}$, CN, $COR_{10}$, $COOR_{10}$ or $CONR_{11}R_{12}$, or at least one of $R_6$, $R_7$, $R_8$ and $R_9$ is $SO_2NR_{11}R_{12}$, with the proviso that the compound is not of formula

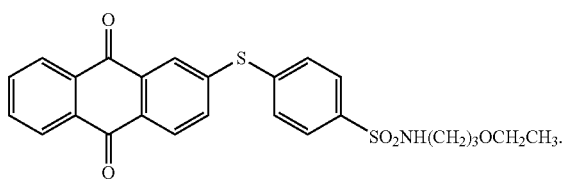

Preferred are compounds substituted by $SO_2NR_{11}R_{12}$, wherein $R_1$, $R_2$, $R_3$, $R_6$, $R_7$, $R_8$ and $R_9$ are not $SO_2NH_2$.

The invention also relates to a compound of formula

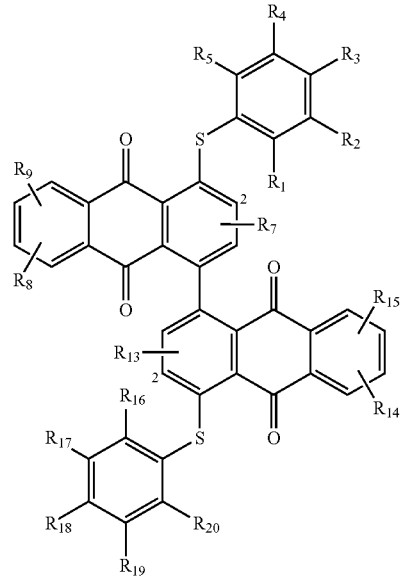

(III)

or

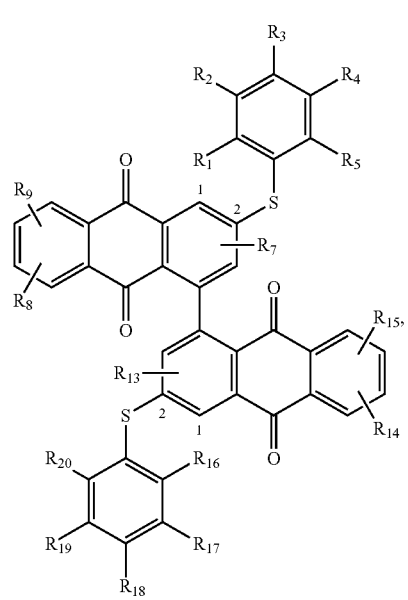

(IV)

wherein at least one of $R_1$, $R_2$ and $R_3$ is $SOR_{10}$, $SO_2R_{10}$, $SO_3R_{10}$, $SO_2NR_{11}R_{12}$, CN or $COR_{10}$, or at least one of $R_7$, $R_8$ and $R_9$ is $SO_2NR_{11}R_{12}$, with the proviso that $R_3$ is not $SO_2NH_2$. In formulae (III) or (IV), preferably $R_1$, $R_2$, $R_7$, $R_8$ and $R_9$ are not $SO_2NH_2$.

The compounds of formulae (I), (II), (III) and (IV) can also be used for any known colouring purpose, such as for example as solvent or disperse dyes on textiles, paper or other materials, or as colourants in printing inks, plastics and coatings.

A preferred application is the use of a compound of formula (I), (II), (III) or (IV), for enhancing or modifying the colour of high molecular weight organic materials comprising pigments.

High molecular weight organic materials are of natural or synthetic origin (e.g. polymers) and have usually a molecular weight usually in the range from $10^3$ to $10^8$ g/mol. They can be in the form of fibres, surface-coating compositions (including special-effect finishes, including those for the automotive sector) and printing inks, or preferably also in so-called resists (for example for colour filters) or as toners. Such uses will be so obvious to the person skilled in the art that it is possible to dispense with listing them here. They are also disclosed in numerous patent specifications and technical works, for example "Industrielle Organische Pigmente" (W. Herbst+K. Hunger, VCH Weinheim/N.Y., new editions continually published in German and English).

The total amount of colourants, including the compounds of formulae (I), (II), (III) and (IV) as well as the pigments, is adequately from 0.01 to 75% by weight, based on the total weight of colourants and high molecular weight organic material. In the coloured high molecular weight organic material, for example the pixels of a patterned colour filter, the compounds of formulae (I), (II), (III) or (IV) and the pigments are suitably in a weight ratio of from 99:1 to 10:90, preferably a weight ratio of from 95:5 to 30:70.

The 1-phenyl-anthraquinone dye of formula (I) or the 2-phenyl-anthraquinone dye of formula (II) can be used together with a photoresist for producing patterned colour filters, either as the only colourant or in combination with customary other colourants (dyes or pigments such as disclosed above), especially with halogenated copper phthalocyanine.

Accordingly, the invention also pertains to a colour filter comprising a transparent substrate and one layer or multiple layers thereon, at least one layer being a patterned layer, the pattern of which comprises a compound of formula (I), (II), (III) or (IV) and preferably a pigment. Preferably, the pigment and the compound of formula (I), (II), (III) or (IV) are comprised together in the pattern of the same layer. However, it is also possible the compound of formula (I), (II), (III) or (IV) and the pigment to be in two different layers exhibiting the same pattern and superposed so that their coloured areas match the same pixels, preferably adjacent layers.

The number of layers in a multi-layered structure is irrelevant for the purpose of the invention. Generally, a multi-layered structure comprises from 2 to 25 layers, especially from 3 to 10 layers, on the substrate. The layers may be patterned, especially in the case of coloured, black or electrically switchable layers, or uniform, especially in the case of optional intermediate and/or protective layers. The structure of colour filters of different types, in all of which the instant invention is suitable, is well-known in the art.

Thus, the invention further pertains to a composition comprising from 0.1 to 70% by weight of a colourant comprising a pigment of average particle size from 10 to 200 nm and a compound of formula (I), (II), (III) or (IV) in a weight ratio of from 99:1 to 10:90, preferably a weight ratio of from 95:5 to 30:70, and a liquid medium comprising a binder or a polymerisable compound.

The invention finally pertains to a process for manufacturing a colour filter, wherein a composition comprising from 0.1 to 70% by weight of a colourant comprising a pigment of average particle size from 10 to 200 nm and a compound of formula (I), (II), (III) or (IV) in a weight ratio of from 99:1 to 10:90, preferably a weight ratio of from 95:5 to 30:70, and a liquid medium comprising a binder or a polymerisable compound is applied onto a transparent substrate optionally comprising patterned or not patterned layers thereon, and the composition is dried and/or cured to give a patterned layer.

The drying, patterning and curing processes are well-known in the art, but are nevertheless described below in more detail for illustration purpose.

The invention in particular also pertains to the use of the instant pigment compositions in colour filters, which can themselves be used for example in electro-optical systems such as TV screens, computer screens, cellular phone screens, navigation systems, electronic agendas, charge coupled devices, cameras, color copiers, CMOS, liquid crystal displays, flexible displays, flat panel displays, plasma displays or electroluminescent displays and the like. These may be, for example, active (twisted nematic) or passive (supertwisted nematic) ferroelectric displays or light-emitting diodes.

The colourants or colourant compositions of the invention will generally be used in the manufacture of colour filters as a solution or dispersion in an organic solvent or water. There are several ways to manufacture these colour filters, which follow two mainstreams:

Direct patterning during applying;
Patterning after applying the colourant.

Direct patterning can be obtained by several printing techniques, such as impact (off-set, flexography, stamping, letter-press etc.) as well as non-impact (ink jet techniques).

Other direct patterning techniques are based on lamination processes, electronic discharging processes like electro-deposition and some special colour proofing methods, like the so-called Chromalin™ process (DuPont).

For impact printing techniques, colourants may be dissolved or dispersed in water or organic solvents by standard de-agglomeration methods (Skandex, Dynomill, Dispermat and the like) in the presence of a dispersant and a polymeric binder to produce an ink. Any dispersion technique known in the field, including the choice of solvent, dispersant and binder, can be used. The type of ink and its viscosity depend on the application technique and are well-known to the skilled artisan. Most usual binders, to which the invention is of course not limited, are (meth)acrylates, epoxies, PVA, polyimids, Novolak systems and the like as well as combinations of these polymers.

The ink dispersion then can be printed on all kind of standard printing machines. Curing of the binder system is preferably achieved by a heating process. The three colours can be applied at once or in different printing steps with intermediate drying and/or curing steps, for example one colour at a time in three printing steps.

Inks for use in ink jet, for example piezo or bubble jet, can be prepared likewise. They generally contain a colourant dissolved or dispersed in water and/or one or a mixture of many hydrophilic organic solvents in combination with a dispersant and a binder.

For ink jet printing, a standard ink jet printer can be used or a dedicated printer can be built in order to optimize for example the printing speed etc.

For lamination techniques, like thermal transfer and the like, a web system has to be made: the colourant is dispersed in a solvent or water with dispersant and binder and coated on a foil and dried. The colourant/binder system can be pattern-wise or uniformly transferred to a colour filter substrate with the help of energy (UV, IR, heat, pressure etc.). Depending on the technique used, the colourant for example may be transferred alone (dye diffusion or sublimation transfer), or the colourant dispersion may be entirely transferred including the binder (wax transfer).

For electrodeposition, the colourant has to be dispersed in water together with an ionized polymer. By means of an electrical current, the ionized polymer is deionized at the anode or the cathode and, being insoluble then, deposited together with the pigments. This can be done on (transparent) photo-conductors like ITO etc. which are patterned or pattern-wise shielded by a photoresist.

The Chromalin™ process makes use of a photosensitive material, deposited on a colour filter substrate. The material becomes tacky upon UV exposure. The so called 'toner', comprising a mixture or compound of colourant and polymer, is distributed on the substrate and sticks on the tacky parts. This process has to be done three to four times for R, G, B and eventually black.

Patterning after applying is a method based mostly on the known photoresist technology, wherein the colourant is dispersed in the photoresist composition. Other methods are indirect patterning with the help of a separate photoresist or lamination techniques.

The colourant may be dissolved or dispersed into photoresists by any standard method such as described above for the printing processes. The binder systems may also be identical. Further suitable compositions are described for example in EP0654711, WO 98/45756 or WO 98/45757.

Photoresists comprise a photoinitiator and a polycrosslinkable monomer (negative radical polymerization), a material to crosslink the polymers itself (for example a photoacid generator or the like) or a material to chemically change the solubility of the polymer in certain developing media. This process, however, can also be done with heat (for example using thermal arrays or a NIR beam) instead of UV, in the case of some polymers which undergo chemical changes upon heating, resulting in changes of solubility in the mentioned developing media. A photoinitiator is then not needed.

The photosensitive or heat sensible material is coated on a colour filter substrate, dried and UV (or heat) irradiated, sometimes again baked (photoacid generators) and developed with a developing medium (mostly a base). In this last step only the non-exposed (negative systems) or only the exposed (positive systems) parts are washed away, giving the wanted pattern. This operation has to be repeated for all the colours used.

Photosensitive lamination techniques are using the same principle, the only difference being the coating technique. A photosensitive system is applied as described above, however on a web instead of a colour filter substrate. The foil is placed on the colour filter substrate and the photosensitive layer is transferred with the help of heat and/or pressure.

Indirect processes, with the above mentioned polymeric binders without a photosensitive component, make use of an extra photoresist, coated on top of the pigmented resist. During the patterning of the photoresist, the coloured resist is patterned as well. The photoresist has to be removed afterwards.

More details about the manufacture of colour filters can be found in text books, reviews and other scientific articles. The skilled artisan will associate the instant invention with the use of any such known technique as well.

For example, which is of course in no way limitative, substantially colourless methacrylic resin are commonly used in colour filters, examples thereof which are known to the skilled artisan being copolymers of aromatic methacrylates with methacrylic acid of $M_w$ from 30'000 to 60'000. Such resins are highly appropriated to make films by spin-coating.

The colour filters of the invention contain the colourant compositions of the invention judiciously in a concentration of from 1 to 75% by weight, preferably from 5 to 50% by weight, with particular preference from 25 to 40% by weight, based on the overall weight of the layer comprising said colourant.

The invention therefore likewise provides a colour filter comprising a transparent substrate and a layer comprising from 1 to 75% by weight, preferably from 5 to 50% by weight, with particular preference from 25 to 40% by weight, based on the overall weight of the layer comprising said colourant, of a colourant composition of the invention or the individual components of said composition dispersed in a high molecular mass organic material. The substrate is preferably essentially colourless (T≧95% all over the visible range from 400 to 700 nm).

The instant printing inks or photoresists for making colour filters contain the colourant or colourant compositions of the invention judiciously in a concentration of from 0.01 to 40% by weight, preferably from 1 to 25% by weight, with particular preference from 5 to 10% by weight, based on the overall weight of the printing ink or photoresist.

The invention therefore likewise provides a composition for making colour filters comprising from 0.01 to 40% by weight, preferably from 1 to 25% by weight, with particular preference from 5 to 10% by weight, based on the overall weight of the composition, of a colourant or colourant composition of the invention dispersed therein.

This colourant composition also may additionally contain other colourants of different structure. The additional components will shift the mixture's spectrum hypsochromically or bathochromically depending on their own hue. The skilled artisan will appreciate by himself which colourants can additionally be used, and in which amounts, depending on the desired colour.

In certain cases, it is advantageous to use the inventive compositions in mixture or in combination with other additives such as wetting agents, surfactants, defoamers, antioxidants, UV absorbers, light stabilizers, plastisizers, or general texture improving agents and so forth. Generally such additives can be used in a concentration from about 0.1 to 25 percent, preferably from about 0.2 to 15% and most preferably from about 0.5 to 8%, by weight based on the total weight of (a), (b) and (c).

Surfactants are generally used to disperse insoluble components, such as the copper phthalocyanine pigments. They may also be used for example with instant anthraquinone dyes of low solubility; however, when the whole colourant is totally dissolved, it is generally judicious not to use surfactants, as this might lead to scattering and to a lower contrast. Cationic, anionic, amphoteric, zwitterionic or neutral nonionic surfactants are very well known to the person skilled in the art. Suitable surfactants include for example anionic surfactants such as alkylbenzene- or alkylnaphthalene-sulfonates, alkylsulfosuccinates or naphthalene formaldehyde sulfonates; cationic surfactants including, for example, quaternary salts such as benzyl tributyl ammonium chloride; or nonionic or amphoteric surfactants such as polyoxyethylene surfactants and alkyl- or amidopropyl betaines, respectively. Most preferred surfactant, which leads to excellent colourant dispersions and especially highly transparent colour filters, is EFKA® 3440 (CIBA Specialty Chemicals Inc.).

Suitable texture improving agents are, for example, fatty acids such as stearic acid or behenic acid, and fatty amines such as laurylamine and stearylamine. In addition, fatty alcohols or ethoxylated fatty alcohols, polyols such as aliphatic 1,2-diols or epoxidized soy bean oil, waxes, resin acids and resin acid salts may be used for this purpose.

Suitable UV stabilizers are, for example, the known benzotriazole derivatives known under the trade name TINUVIN® or CIBA® Fast H Liquid an aryl sulfonated benzotriazol, both being products of CIBA Specialty Chemicals Inc.

The skilled artisan will obviously recognize that there are many other possible applications in all fields where colourants are used, such as inks, coatings and polymers. The instant colourant or colourant compositions will prove particularly useful alone or in combination with fine or transparent pigments. Where ever the thermal colour stability is an issue, it is worth to try resolving it by using the instant compositions, with a reasonable expectation of much better results to be obtained. Typical examples are coil- and powder coatings, extruded or injection moulded engineering plastics as well as melt-spun fibers, this list self-evidently not being exhaustive.

The materials used for manufacturing colour filters according to above-mentioned and other processes are well-known in the art.

For example, a binder may be used which is alkali-soluble, preferably a linear organic polymer that is soluble in an organic solvent and developable with a weak alkali aqueous solution. As such binder used in a colour filter resist composition, which is soluble in an alkaline aqueous solution and insoluble in water, for example, a homopolymer of a polymerizable compound having one or more acid groups and one or more polymerizable unsaturated bonds in the molecule, or a copolymer of two or more kinds thereof, and a copolymer of one or more polymerizable compounds having one or more unsaturated bonds copolymerizable with these compounds and containing no acid group, can be used. Such compounds can be obtained by copolymerizing one or more kinds of a low molecular compound having one or more acid groups and one or more polymerizable unsaturated bonds in the molecule with one or more polymerizable compounds having one or more unsaturated bonds copolymerizable with these compounds and containing no acid group. Examples of acids groups are a —COOH group, a —SO$_2$NHCO— group, a —SO$_3$H group, a phenolic hydroxy group, a —SO$_2$NH— group, and a —CO—NH—CO— group. Among those, a high molecular compound having a —COOH group is particularly preferred.

Preferably, the organic polymer binder in the colour filter resist composition comprises an alkali soluble copolymer comprising, as addition polymerizable monomer units, at least an unsaturated organic acid compound such as acrylic acid, methacrylic acid and the like. It is preferred to use as a further co-monomer for the polymer binder an unsaturated organic acid ester compound such as methyl acrylate, ethyl (meth)acrylate, benzyl (meth)acrylate, styrene and the like to balance properties such as alkaline solubility, adhesion rigidity, chemical resistance etc.

The organic polymer binder can for example be either a random copolymer or a block copolymer, such as described in U.S. Pat. No. 5,368,976.

Polymerizable compounds suitable for the preparation of colour filters according to the invention, are also well-known in the art. They may for example have one or more acid group and one or more polymerizable unsaturated bond in the molecule.

Examples of the polymerizable compounds having one or more —COOH groups and one or more polymerizable unsaturated bonds in a molecule are (meth)acrylic acid, 2-carboxyethyl (meth)acrylic acid, 2-carboxypropyl (meth)acrylic acid, crotonic acid, cinnamic acid, mono[2-(meth)acryloyloxyethyl]succinate, mono[2-(meth)acryloyloxyethyl]adipate, mono[2-(meth)acryloyloxyethyl]phthalate, mono[2-(meth)acryloyloxyethyl]hexahydrophthalate, mono[2-(meth)acryloyloxyethyl]maleate, mono-[2-(meth)acryloyloxypropyl]succinate, mono[2-(meth)acryloyloxypropyl]adipate, mono[2-(meth)acryloyloxypropyl]phthalate, mono[2-(meth)acryloyloxypropyl]hexahydrophthalate, mono[2-(meth)acryloyloxypropyl]maleate, mono[2-(meth)-acryloyloxybutyl]succinate, mono[2-(meth)acryloyloxybutyl]adipate, mono-[2-(meth)acryloyloxybutyl]phthalate, mono[2-(meth)acryloyloxybutyl]hexahydrophthalate, mono[2-(meth)acryloyloxybutyl]maleate, 3-(alkylcarbamoyl)acrylic acid, α-chloroacrylic acid, maleic acid, monoesterified maleic acid, fumaric acid, itaconic acid, citraconic acid, mesaconic acid, maleic anhydride, and ω-carboxypolycaprolactone mono(meth)acrylate.

Vinylbenzenesulfonic acid and 2-(meth)acrylamide-2-methylpropanesulfonic acid are examples of the polymerizable compounds having one or more —SO$_3$H groups and one or more polymerizable unsaturated bonds.

N-methylsulfonyl (meth)acrylamide, N-ethylsulfonyl (meth)acrylamide, N-phenyl-sulfonyl (meth)acrylamide, and N-(p-methylphenylsulfonyl) (meth)acrylamide are examples of the polymerizable compounds having one or more —SO$_2$NHCO— groups and one or more polymerizable unsaturated bonds.

Examples of polymerizable compounds having one or more phenolic hydroxy groups and one or more polymerizable unsaturated bonds in a molecule include hydroxyphenyl (meth)acrylamide, dihydroxyphenyl (meth)acrylamide, hydroxy-phenyl-carbonyloxyethyl (meth)acrylate, hydroxyphenyloxyethyl (meth)acrylate, hydroxyphenylthioethyl (meth)acrylate, dihydroxyphenylcarbonyloxyethyl (meth)-acrylate, dihydroxyphenyloxyethyl (meth)acrylate, and dihydroxy-phenylthioethyl (meth)acrylate.

Examples of the polymerizable compound having one or more —SO$_2$NH— groups and one or more polymerizable unsaturated bonds in the molecule include compounds represented by formula (a) or (b):

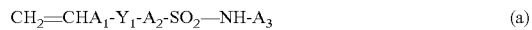

$$CH_2=CHA_1-Y_1-A_2-SO_2-NH-A_3 \qquad (a)$$

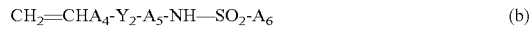

$$CH_2=CHA_4-Y_2-A_5-NH-SO_2-A_6 \qquad (b)$$

wherein $Y_1$ and $Y_2$ each represents —COO—, —CONA$_7$-, or a single bond; $A_1$ and $A_4$ each represents H or CH$_3$; $A_2$ and $A_5$ each represents C$_1$-C$_{12}$alkylene optionally having a substituent, cycloalkylene, arylene, or aralkylene, or C$_2$-C$_{12}$alkylene into which an ether group and a thioether group are inserted, cycloalkylene, arylene, or aralkylene; $A_3$ and $A_6$ each represents H, C$_1$-C$_{12}$alkyl optionally having a substituent, a cycloalkyl group, an aryl group, or an aralkyl group; and $A_7$ represents H, C$_1$-C$_{12}$alkyl optionally having a substituent, a cycloalkyl group, an aryl group, or an aralkyl group.

The polymerizable compounds having one or more —CO—NH—CO— group and one or more polymerizable unsaturated bond include maleimide and N-acryloyl-acrylamide. These polymerizable compounds become the high molecular compounds comprising a —CO—NH—CO— group, in which a ring is formed together with a primary chain by polymerization. Further, a methacrylic acid derivative and an acrylic acid derivative each having a —CO—NH—CO— group can be used as well. Such methacrylic acid derivatives and the acrylic acid derivatives include, for example, a methacrylamide derivative such as N-acetylmethacrylamide, N-propionylmethacrylamide, N-butanoylmethacrylamide, N-pentanoylmethacrylamide, N-decanoylmethacrylamide, N-dodecanoylmethacrylamide, N-benzoylmethacrylamide, N-(p-methylbenzoyl)methacryl-amide, N-(p-chlorobenzoyl) methacrylamide, N-(naphthyl-carbonyl)-methacrylamide, N-(phenylacetyl)-methacryl-amide, and 4-methacryloylamino-phthalimide, and an acrylamide derivative having the same substituent as these. These polymerizable compounds polymerize to be compounds having a —CO—NH—CO— group in a side chain.

Examples of polymerizable compounds having one or more polymerizable unsaturated bond and containing no acid group include a compound having a polymerizable unsaturated bond, selected from esters of (meth)acrylic acid, such as methyl (meth)acrylate, ethyl (meth)acrylate, propyl (meth) acrylate, butyl (meth)-acrylate, tetrahydrofurfuryl (meth) acrylate, benzyl (meth)acrylate, 2-ethylhexyl (meth)acrylate, hydroxyethyl (meth)acrylate, hydroxypropyl (meth)acrylate, hydroxybutyl (meth)acrylate, glycerol mono(meth)acrylate, dihydroxypropyl (meth)-acrylate, allyl (meth)acrylate, cyclohexyl (meth)acrylate, phenyl (meth)acrylate, methoxyphenyl (meth)acrylate, methoxyethyl (meth)acrylate, phenoxyethyl (meth)-acrylate, methoxydiethyleneglycol (meth) acrylate, methoxytriethyleneglycol (meth)-acrylate, methoxypropyl (meth)acrylate, methoxydipropyleneglycol (meth)acrylate, isobornyl meth(acrylate), dicyclopentadienyl (meth)acrylate, 2-hydroxy-3-phenoxy-propyl (meth)acrylate, tricyclo[5.2.1.0$^{2,6}$]decan-8-yl (meth)acrylate, aminoethyl (meth)acrylate, N,N-dimethylaminoethyl (meth)acrylate, aminopropyl (meth)acryl-ate, N,N-dimethylaminopropyl (meth)acrylate, glycidyl (meth)acrylate, 2-methyl-glycidyl (meth)acrylate, 3,4-epoxybutyl (meth)acrylate, 6,7-epoxyheptyl (meth)-acrylate; vinyl aromatic compounds, such as styrene, α-methylstyrene, vinyl-toluene, p-chlorostyrene, polychlorostyrene, fluorostyrene, bromostyrene, ethoxymethyl styrene, methoxystyrene, 4-methoxy-3-methylstyrene, dimethoxy-styrene, vinylbenzyl methyl ether, vinylbenzyl glycidyl ether, indene, 1-methyl-indene; vinyl or allyl esters, such as vinyl acetate, vinyl propionate, vinyl butylate, vinyl pivalate, vinyl benzoate, vinyl trimethylacetate, vinyl diethylacetate, vinyl borate, vinyl caproate, vinyl chloroacetate, vinyl dichloroacetate, vinyl methoxy-acetate, vinyl butoxyacetate, vinyl phenylacetate, vinyl acetate, vinyl acetoacetate, vinyl lactate, vinyl phenylbutylate, vinyl cyclohexylcarboxylate, vinyl salicylate, vinyl chlorobenzoate, vinyl tetrachlorobenzoate, vinyl naphthoate, allyl acetate, allyl propionate, allyl butylate, allyl pivalate, allyl benzoate, allyl caproate, allyl stearate, allyl acetoacetate, allyl lactate; vinyl or allyl ethers, such as vinyl methyl ether, vinyl ethyl ether, vinyl hexyl ether, vinyl octyl ether, vinyl ethylhexyl ether, vinyl methoxy-ethyl ether, vinyl ethoxyethyl ether, vinyl chloroethyl ether, vinyl hydroxyethyl ether, vinyl ethylbutyl ether, vinyl hydroxyethoxyethyl ether, vinyl dimethylaminoethyl ether, vinyl diethylaminoethyl ether, vinyl butylaminoethyl ether, vinyl benzyl ether, vinyl tetrahydrofurfuryl ether, vinyl phenyl ether, vinyl tolyl ether, vinyl chlorophenyl ether, vinyl chloroethyl ether, vinyl dichlorophenyl ether, vinyl naphthyl ether, vinyl anthryl ether, allyl glycidyl ether; amide type unsaturated compounds, such as (meth)acrylamide, N,N-dimethyl (meth)acrylamide, N,N-diethyl (meth)acrylamide, N,N-dibutyl (meth)acrylamide, N,N-diethylhexyl (meth) acrylamide, N,N-dicyclohexyl (meth)acrylamide, N,N-diphenyl (meth)acrylamide, N-methyl-N-phenyl (meth)acrylamide, N-hydroxyethyl-N-methyl (meth)acrylamide, N-methyl (meth)-acrylamide, N-ethyl (meth)acrylamide, N-propyl (meth)acrylamide, N-butyl (meth)-acrylamide, N-hydroxyethyl (meth)acrylamide, N-heptyl (meth)acrylamide, N-octyl (meth)acrylamide, N-ethyhexyl (meth)acrylamide, N-hydroxyethyl (meth)acrylamidecyclohexyl, N-benzyl (meth)acrylamide, N-phenyl (meth)acrylamide, N-tolyl (meth)acrylamide, N-hydroxyphenyl (meth)acrylamide, N-naphthyl (meth)acrylamide, N-phenylsulfonyl (meth) acrylamide, N-methylphenylsulfonyl (meth)acrylamide and N-(meth)acryloylmorpholine, diacetone acrylamide, N-methylol acrylamide, N-butoxyacrylamide; polyolefin type compounds, such as butadiene, isoprene, chloroprene and the like; (meth)acrylonitrile, methyl isopropenyl ketone, maleimide, N-phenylmaleimide, N-methylphenylmaleimide, N-methoxyphenylmaleimide, N-cyclohexylmaleimide, N-alkylmaleimide, maleic anhydride, poly-styrene macromonomer, polymethyl (meth)acrylate macromonomer, polybutyl (meth)acrylate macromonomer; crotonates, such as butyl crotonate, hexyl crotonate, glycerine monocrotonate; and itaconates, such as dimethyl itaconate, diethyl itaconate, dibutyl itaconate; and maleates or fumarates, such as dimethyl maleate, dibutyl fumarate.

Preferable examples of copolymers are copolymers of methyl (meth)acrylate and (meth)acrylic acid, copolymers of benzyl (meth)acrylate and (meth)acrylic acid, copolymers of methyl (meth)acrylate/, ethyl (meth)acrylate and (meth) acrylic acid, copolymers of benzyl (meth)acrylate, (meth) acrylic acid and styrene, copolymers of benzyl (meth)acrylate, (meth)acrylic acid and 2-hydroxyethyl (meth)acrylate, copolymers of methyl (meth)acrylate/, butyl (meth)acrylate, (meth)acrylic acid and styrene, copolymers of methyl (meth) acrylate, benzyl (meth)acrylate, (metha)crylic acid and hydroxyphenyl (meth)acrylate, copolymers of methyl (meth) acrylate, (metha)crylic acid and polymethyl (meth)acrylate macromonomer, copolymers of benzyl (meth)crylate, (metha)crylic acid and polymethyl (meth)acrylate macromonomer, copolymers of tetrahydrofurfuryl (meth)acrylate, styrene and (meth)acrylic acid, copolymers of methyl (meth)acrylate, (meth)acrylic acid and polystyrene macromonomer, copolymers of benzyl (meth)acrylate, (meth)acrylic acid and polystyrene macromonomer, copolymers of benzyl (meth)acrylate, (meth)acrylic acid, 2-hydroxyethyl (meth)acrylate and polystyrene macromonomer, copolymers of benzyl (meth) acrylate, (meth)acrylic acid, 2-hydroxypropyl (meth)acrylate and polystyrene macromonomer, copolymers of benzyl (meth)acrylate, (meth)acrylic acid, 2-hydroxy-3-phenoxypropyl (meth)acrylate and polymethyl (meth)acrylate macromonomer, copolymers of methyl (meth)acrylate, (meth) acrylic acid, 2-hydroxyethyl (meth)acrylate and polystyrene macromonomer, copolymers of benzyl (meth)acrylate, (metha)crylic acid, 2-hydroxyethyl (meth)acrylate and polymethyl (meth)acrylate macromonomer, copolymers of N-phenylmaleimide, benzyl (meth)acrylate, (metha)crylic acid and styrene, copolymers of benzyl (meth)acrylate, (meth)acrylic acid, N-phenylmaleimide, mono-[2-(meth) acryloyloxyethyl]succinate and styrene, copolymers of allyl (meth)acrylate, (meth)acrylic acid, N-phenylmaleimide, mono-[2-(meth)acryloyloxyethyl]succinate and styrene, copolymers of benzyl (meth)acrylate, (meth)acrylic acid, N-phenylmaleimide, glycerol mono(meth)acrylate and styrene, copolymers of benzyl (meth)acrylate, ω-carboxy-polycaprolactone mono(meth)acrylate, (meth)acrylic acid, N-phenylmaleimide, glycerol mono(meth)acrylate and styrene, and copolymers of benzyl (meth)acrylate, (meth)acrylic acid, N-cyclohexylmaleimide and styrene.

There can be used as well hydroxystyrene homo- or copolymers or a novolak type phenol resin, for example, poly (hydroxystyrene) and poly(hydroxystyrene-co-vinylcyclohexanol), a novolak resin, a cresol novolak resin, and a halogenated phenol novolak resin. More specifically, it includes, for example, the methacrylic acid copolymers, the acrylic acid copolymers, the itaconic acid copolymers, the crotonic acid copolymers, the maleic anhydride co-polymers, for example, with styrene as a co-monomer, and maleic acid copolymers, and partially esterified maleic acid copolymers each described in, for example, JP-B-S59/44615, JP-B-S54/ 34327, JP-B-S58/12577, JP-B-S54/25957, JP-A-S59/53836, JP-A-S59/71048, JP-A-S60/159743, JP-A-S60/258539, JP-A-H01/152449, JP-A-H02/199403 and JP-A-H02/ 199404, and which copolymers can be further reacted with an amine, as e.g disclosed in U.S. Pat. No. 5,650,263; further, a cellulose derivative having a carboxyl group on a side chain can be used, and particularly preferred are copolymers of benzyl (meth)acrylate and (meth)acrylic acid and copolymers of benzyl (meth)acrylate, (meth)acrylic acid and other monomers, for example as described in U.S. Pat. No. 4,139,391, JP-B-S59/44615, JP-A-S60/159,743 and JP-A-S60/258,539.

With respect to those having carboxylic acid groups among the above organic binder polymers, it is possible to react some or all of the carboxylic acid groups with glycidyl(meth)acrylate or an epoxy(meth)acrylate to obtain photopolymerizable organic binder polymers for the purpose of improving the photosensitivity, coating film strength, the coating solvent and chemical resistance and the adhesion to the substrate.

Examples are disclosed in JP-B-S50/34443 and JP-B-S50/34444, U.S. Pat. No. 5,153,095, U.S. Pat. No. 5,650,233 and U.S. Pat. No. 5,677,385, as well as by T. Kudo et al. in J. Appl. Phys., Vol. 37 (1998), p. 3594-3603. The entire contents of all above-mentioned patents and patent applications is enclosed herein by reference.

Among these various kinds of alkali-soluble binders, acrylic acid homo- and copolymers as well as methacrylic acid homo- and copolymers are particularly preferred.

The weight-average molecular weight of the binders is preferably from 500 to 1'000'000, e.g. from 3'000 to 1'000'000, more preferably from 5'000 to 400'000.

The content of an alkali-soluble binder in the dye-containing curable resin composition is preferably from 10 to 90% by weight, more preferably from 20 to 80% by weight, and particularly preferably from 30 to 70% by weight, based on the total solid content of the dye-containing curable resin composition.

Photopolymerisable vinyl compounds are also well known to the person skilled in the art. These monomers contain at least one ethylenic double bond and usually have a boiling point of 100° C. or more.

Examples of suitable photopolymerisable vinyl compounds are polyethylene glycol monoacrylate, polyethylene glycol monomethacrylate, polypropylene glycol monoacrylate, polypropylene glycol monomethacrylate, phenoxyethyl acrylate, phenoxyethyl methacrylate, polyethylene glycol diacrylate, polyethylene glycol dimethacrylate, trimethylolpropane triacrylate, trimethylolpropane triamethacrylate, neopentylglycol diacrylate, neopentylglycol dimethacrylate, pentaerythritol tri-acrylate, pentaerythritol triamethacrylate, pentaerythritol tetraacrylate, penta-erythritol tetramethacrylate, dipentaerythritol pentaacrylate, dipentaerythritol pentamethacrylate, dipentaerythritol hexaacrylate, dipentaerythritol hexamethacrylate, tri(acryloyloxyethyl)isocyanurate. Preferred photopolymerisable vinyl compounds are dipentaerythritol pentaacrylate and dipentaerythritol pentamethacrylate.

The total content of such a photopolymerisable vinyl compound in a colourant-containing curable composition is, while it varies depending on the material thereof, generally from 5 to 70% by weight, preferably from 5 to 50% by weight, and particularly preferably from 7 to 30% by weight, based on the solid content of the composition.

Suitable photoinitiators are also well-known to the person skilled in the art and are preferably selected from halomethyloxadiazols, halomethyl-s-triazines, 3-aryl-substituted coumarins, benzophenones, acetophenones, cyclopentadienebenzene-iron complexes, oxime esters and oximes.

Suitable photoinitiators are described, for example, in GB-2,339,571, U.S. Pat. No. 6,485,885, GB-2,358,017, GB-2,357,293, WO-02/100903, J. Photopolym. Sci. Technol. 15, 51-57 (2002), IP. com. Journal IPCOM 000012462D, 3(6), 101-109 (2003), US-2004/0102548, US-2004/0102673, PCT/EP2006/068202 and PCT/EP2006/068254.

Preferred photoinitiators are benzophenones of the formula

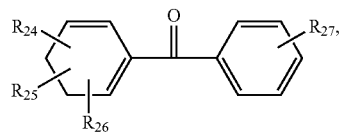

wherein $R_{24}$, $R_{25}$ and $R_{26}$ independently of one another are hydrogen, $C_1$-$C_4$-alkyl, $C_1$-$C_4$-halogenalkyl, $C_1$-$C_4$-alkoxy, chlorine or $N(C_1$-$C_4$-alkyl$)_2$; $R_{27}$ is hydrogen, $C_1$-$C_4$-alkyl, $C_1$-$C_4$-halogenalkyl, phenyl, $N(C_1$-$C_4$-alkyl$)_2$, $COOCH_3$,

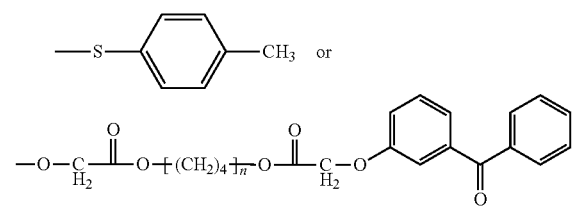

and n is 2-10. Specific examples are ESACURE TZT® available from Lamberti, (a mixture of 2,4,6-trimethylbenzophenone and 4-methylbenzophenone) and DAROCUR® BP (benzophenone).

Further preferred photoinitiators are alpha-hydroxy ketones, alpha-alkoxyketones or alpha-aminoketones of the formula

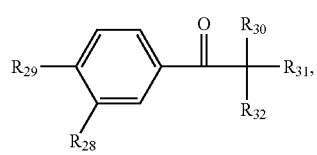

wherein $R_{28}$ is hydrogen or $C_1$-$C_{18}$-alkoxy; $R_{29}$ is hydrogen, $C_1$-$C_{18}$-alkyl, $C_1$-$C_{12}$hydroxyalkyl, $C_1$-$C_{18}$-alkoxy, —$OCH_2CH_2$—$OR_{33}$, morpholino, $C_1$-$C_{18}$alkyl-S—, a group $H_2C=CH$—, $H_2C=C(CH_3)$—,

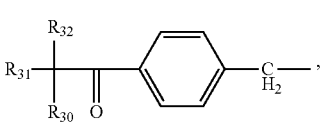

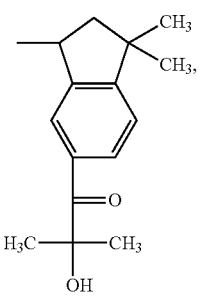

-continued

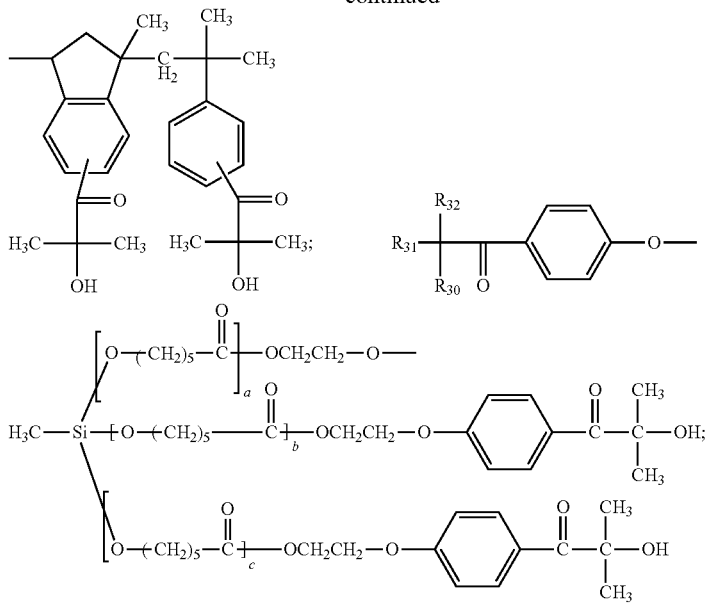

a, b and c are 1-3; n is 2-10; $G_3$ and $G_4$ independently of one another are end groups of the polymeric structure, preferably hydrogen or methyl; $R_{30}$ is hydroxy, $C_1$-$C_{16}$-alkoxy, morpholino, dimethylamino or —O(CH$_2$CH$_2$O)$_m$—C$_1$-C$_{16}$-alkyl; $R_{31}$ and $R_{32}$ independently of one another are hydrogen, $C_1$-$C_6$-alkyl, $C_1$-$C_{16}$-alkoxy or —O(CH$_2$CH$_2$O)$_m$—C$_1$-C$_{16}$-alkyl; or unsubstituted phenyl or benzyl; or phenyl or benzyl substituted by $C_1$-$C_{12}$-alkyl; or $R_{31}$ and $R_{32}$ together with the carbon atom to which they are attached form a cyclohexyl ring; m is 1-20; with the proviso that $R_{30}$, $R_{31}$ and $R_{32}$ are not all together $C_1$-$C_{16}$-alkoxy or —O(CH$_2$CH$_2$O)$_m$—C$_1$-C$_{16}$-alkyl; and $R_{33}$ is hydrogen,

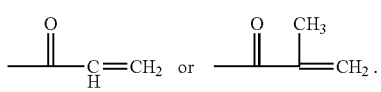

Specific examples are 1-hydroxy-cyclohexyl-phenyl-ketone, a mixture of 1-hydroxy-cyclohexyl-phenyl-ketone with benzophenone, 2-methyl-1 [4-(methylthio)phenyl]-2-morpholinopropan-1-one, 2-benzyl-2-dimethylamino-1-(4-morpholinophenyl)-butanone-1,2-dimethylamino-2-(4-methylbenzyl)-1-(4-morpholin-4-yl-phenyl)-butan-1-one, 1-[4-(2-hydroxyethoxy)-phenyl]-2-hydroxy-2-methyl-1-propan-1-one, 2,2-dimethoxy-1,2-diphenylethan-1-one, 2-hydroxy-2-methyl-1-phenyl-propan-1-one, 2-hydroxy-1-{4-[4-(2-hydroxy-2-methyl-propionyl)-benzyl]-phenyl}-2-methyl-propan-1-one, 2-benzyl-1-(3,4-dimethoxy-phenyl)-2-dimethylamino-butan-1-one, 2-hydroxy-1-{4-[4-(2-hydroxy-2-methyl-propionyl)-phenoxy]-phenyl}-2-methyl-propan-1-one,

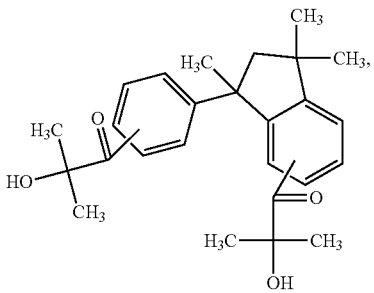

ESACURE® KIP provided by Fratelli Lamberti and 2-hydroxy-1-{1-[4-(2-hydroxy-2-methyl-propionyl)-phenyl]-1,3,3-trimethyl-indan-5-yl}-2-methyl-propan-1-one.

Further preferred photoinitiators are acylphosphine oxides of the formula

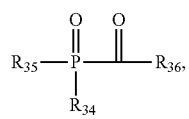

wherein $R_{34}$ and $R_{35}$ independently of one another are unsubstituted $C_1$-$C_{20}$-alkyl, cyclohexyl, cyclopentyl, phenyl, naphthyl or biphenylyl; or $C_1$-$C_{20}$-alkyl, cyclohexyl, cyclopentyl, phenyl, naphthyl or biphenylyl substituted by halogen, $C_1$-$C_{12}$-alkyl, $C_1$-$C_{12}$-alkoxy, $C_1$-$C_{12}$alkylthio or NR$_{37}$R$_{38}$, or $R_{34}$ and $R_{35}$ are independently of one another —(CO)R$_{36}$; $R_{37}$ and $R_{38}$ independently of one another are hydrogen, unsubstituted $C_1$-$C_{12}$-alkyl or $C_1$-$C_{12}$-alkyl substituted by OH or SH wherein the alkyl chain may be interrupted by one to four oxygen atoms; or $R_{37}$ and $R_{38}$ independently of one another are $C_2$-$C_{12}$-alkenyl, cyclopentyl, cyclohexyl, benzyl or phenyl; $R_{36}$ is unsubstituted cyclohexyl, cyclopentyl, phenyl, naphthyl or biphenylyl, or cyclohexyl, cyclopentyl, phenyl, naphthyl or biphenylyl substituted by halogen, $C_1$-$C_4$-alkyl and/or $C_1$-$C_4$-alkoxy; or $R_{36}$ is a 5- or 6-membered heterocyclic ring having an S atom or N atom. Specific examples thereof are bis(2,4,6-trimethyl-benzoyl)-phenylphosphine oxide, bis(2,4,6-trimethylbenzoyl)-phenylethoxy-phosphine oxide, 2,4,6-trimethylbenzoyl-diphenylphosphine oxide and bis(2,6-dimethoxybenzoyl)-2,4,4-trimethylpentylphosphine oxide.

Further preferred photoinitiators are titanocenes of the formula

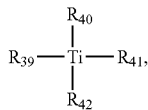

wherein $R_{39}$ and $R_{40}$ independently of one another are cyclopentadienyl optionally mono-, di-, or tri-substituted by $C_1$-$C_{18}$-alkyl, $C_1$-$C_{18}$-alkoxy, cyclopentyl, cyclohexyl or halogen; $R_{41}$ and $R_{42}$ are phenyl having at least one F or $CF_3$ substituent in ortho position to the Ti—C bond and having at least a further substituent which is unsubstituted pyrrolinyl or polyoxaalkyl or which is pyrrolinyl or polyoxaalkyl substituted by one or two $C_1$-$C_{12}$-alkyl, di($C_1$-$C_{12}$-alkyl)aminomethyl, morpholinomethyl, $C_2$-$C_4$-alkenyl, methoxymethyl, ethoxymethyl, trimethylsilyl, formyl, methoxy or phenyl; or $R_{41}$ and $R_{42}$ are

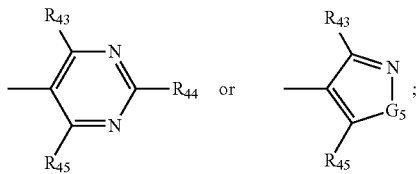

$G_5$ is O, S, or $NR_{46}$; $R_{43}$, $R_{44}$ and $R_{45}$ independently of one another are hydrogen, halogen, $C_2$-$C_{12}$-alkenyl, $C_1$-$C_{12}$alkoxy, $C_2$-$C_{12}$-alkoxy interrupted by one to four oxygen atoms, cyclohexyloxy, cyclopentyloxy, phenoxy, benzyloxy, unsubstituted phenyl or biphenyl or phenyl or biphenyl substituted by $C_1$-$C_4$-alkoxy, halogen, phenylthio or $C_1$-$C_4$-alkylthio, with the proviso that $R_{43}$ and $R_{45}$ are not both hydrogen and that, with respect to the residue

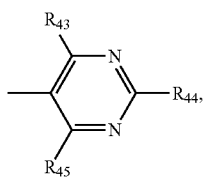

at least one substituent $R_{43}$ or $R_{45}$ is $C_1$-$C_{12}$alkoxy or $C_1$-$C_{12}$alkoxy interrupted by one to four oxygen atoms, cyclohexyloxy, cyclopentyloxy, phenoxy or benzyloxy; and $R_{46}$ is $C_1$-$C_8$alkyl, phenyl or cyclophenyl. Specific examples thereof are bis(η5-2,4-cyclopentadien-1-yl)-bis(2,6-difluoro-3-(1H-pyrrol-1-yl)-phenyl)-titanium and bis(2,6-difluorophenyl)-bis[(1,2,3,4,5-η)-1-methyl-2,4-cyclopentadien-1-yl]-titanium.

Further preferred photoinitiators are phenylglyoxalates of the formula

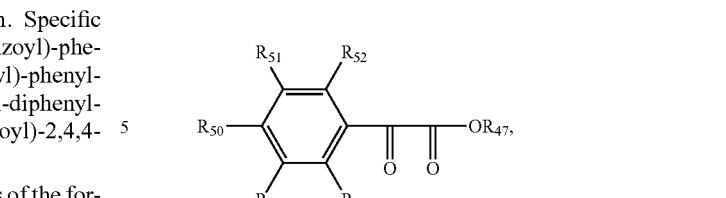

wherein $R_{47}$ is H, $C_1$-$C_{12}$-alkyl or

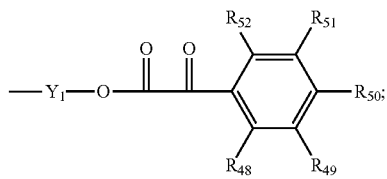

$R_{48}$, $R_{49}$, $R_{50}$, $R_{51}$ and $R_{52}$ independently of one another are hydrogen, unsubstituted $C_1$-$C_{12}$-alkyl or $C_1$-$C_{12}$-alkyl substituted by OH, $C_1$-$C_4$-alkoxy, phenyl, naphthyl, halogen or CN; wherein the alkyl chain optionally is interrupted by one or more oxygen atoms; or $R_{48}$, $R_{49}$, $R_{50}$, $R_{51}$ and $R_{52}$ independently of one another are $C_1$-$C_4$-alkoxy, $C_1$-$C_4$-alkylthio or $NR_{37}R_{38}$; $R_{37}$ and $R_{38}$ independently of one another are hydrogen, unsubstituted $C_1$-$C_{12}$-alkyl or $C_1$-$C_{12}$-alkyl substituted by OH or SH wherein the alkyl chain optionally is interrupted by one to four oxygen atoms; or $R_{37}$ and $R_{38}$ independently of one another are $C_2$-$C_{12}$-alkenyl, cyclopentyl, cyclohexyl, benzyl or phenyl; and $Y_1$ is $C_1$-$C_{12}$-alkylene optionally interrupted by one or more oxygen atoms. A specific example thereof is oxo-phenyl-acetic acid 2-[2-(2-oxo-2-phenyl-acetoxy)-ethoxy]-ethyl ester.

Further preferred photoinitiators are oxime esters of the formula

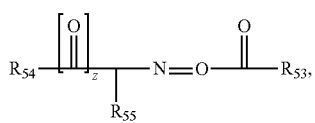

wherein z is 0 or 1; $R_{53}$ is hydrogen, $C_3$-$C_8$cycloalkyl; $C_1$-$C_{12}$alkyl which is unsubstituted or substituted by one or more halogen, phenyl and/or CN; or $R_{53}$ is $C_2$-$C_5$alkenyl; phenyl which is unsubstituted or substituted by one or more $C_1$-$C_6$alkyl, halogen, CN, $OR_{56}$, $SR_{57}$ and/or $NR_{58}R_{59}$; or $R_{53}$ is $C_1$-$C_8$-alkoxy, benzyloxy; or phenoxy which is unsubstituted or substituted by one or more $C_1$-$C_6$alkyl and/or halogen; $R_{54}$ is phenyl, naphthyl, benzoyl or naphthoyl, each of which is substituted 1 to 7 times by halogen, $C_1$-$C_{12}$alkyl, $C_3$-$C_8$cycloalkyl, benzyl, phenoxycarbonyl, $C_2$-$C_{12}$alkoxycarbonyl, $OR_{56}$, $SR_{60}$ $SOR_{57}$, $SO_2R_{57}$ and/or $NR_{58}R_{59}$, wherein the substituents $OR_{56}$, $SR_{57}$ and $NR_{58}R_{59}$ optionally form 5- or 6-membered rings via the radicals $R_{56}$, $R_{57}$, $R_{58}$ and/or $R_{59}$ with further substituents on the phenyl or naphthyl ring; or each of which is substituted by phenyl or by phenyl which is substituted by one or more $OR_{56}$, $SR_{57}$ and/or $NR_{58}R_{59}$; or $R_{54}$ is thioxanthylor

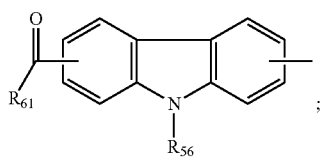

$R_{55}$ is hydrogen; unsubstituted $C_1$-$C_{20}$alkyl or $C_1$-$C_{20}$alkyl substituted by one or more halogen, $OR_{56}$, phenyl; or is $C_3$-$C_8$cycloalkyl; phenyl which is unsubstituted or substituted by one or more $C_1$-$C_6$alkyl, phenyl, halogen, $OR_{56}$, $SR_{57}$ and/or $NR_{58}R_{59}$; or is $C_2$-$C_{20}$alkanoyl or benzoyl which is unsubstituted or substituted by one or more $C_1$-$C_6$alkyl, phenyl, $OR_{56}$, $SR_{57}$ and/or $NR_{58}R_{59}$; or is $C_2$-$C_{12}$alkoxycarbonyl, phenoxycarbonyl, CN, —$CONR_{58}R_{59}$, $NO_2$, $C_1$-$C_4$haloalkyl, $S(O)_y$—$C_1$-$C_6$alkyl or $S(O)_y$-phenyl; y is 1 or 2; $R_{56}$ and $R_{57}$ independently of one another are hydrogen, $C_1$-$C_{20}$alkyl, $C_2$-$C_{12}$alkenyl, $C_3$-$C_8$cycloalkyl, phenyl-$C_1$-$C_3$alkyl; or are $C_1$-$C_8$alkyl which is substituted by —OH, —SH, —CN, $C_1$-$C_8$alkanoyl, benzoyl, which is unsubstituted or substituted by one or more $C_1$-$C_6$alkyl, halogen, —OH, $C_1$-$C_4$alkoxy or $C_1$-$C_4$alkylsulfanyl; or are phenyl or naphthyl, each of which is unsubstituted or substituted by halogen, $C_1$-$C_{12}$alkyl, $C_1$-$C_{12}$alkoxy, phenyl-$C_1$-$C_3$alkyloxy, phenoxy, $C_1$-$C_{12}$alkylsulfanyl, phenylsulfanyl, —$N(C_1$-$C_{12}$alkyl$)_2$, diphenylamino; $R_{58}$ and $R_{59}$ independently of one another are independently of each other are hydrogen, $C_1$-$C_{20}$alkyl, $C_2$-$C_4$hydroxyalkyl, $C_2$-$C_{10}$alkoxyalkyl, $C_2$-$C_5$alkenyl, $C_3$-$C_8$cycloalkyl, phenyl-$C_1$-$C_3$alkyl, $C_1$-$C_8$alkanoyl, $C_3$-$C_{12}$alkenoyl, benzoyl; or are phenyl or naphthyl, each of which is unsubstituted or substituted by $C_1$-$C_{12}$alkyl, benzoyl or $C_1$-$C_{12}$alkoxy; or $R_{58}$ and $R_{59}$ together are $C_2$-$C_6$alkylene optionally interrupted by —O— or —$NR_{56}$— and/or optionally substituted by hydroxyl, $C_1$-$C_4$alkoxy, $C_2$-$C_4$alkanoyloxy or benzoyloxy; $R_{61}$ is $C_1$-$C_{12}$alkyl, phenyl, $C_1$-$C_{12}$alkylphenyl or 2-(2'-tetrahydrofuryl)-phenyl. Specific examples thereof are 1,2-octanedione 1-[4-(phenylthio)phenyl]-2-(O-benzoyloxime), ethanone 1-[9-ethyl-6-(2-methylbenzoyl)-9H-carbazol-3-yl]-1-(O-acetyloxime) and 9H-thioxanthene-2-carboxaldehyde 9-oxo-2-(O-acetyloxime).

A further example of a photoinitiator is Esacure® 1001 available from Lamberti: 1-[4-(4-benzoylphenylsulfanyl)phenyl]-2-methyl-2-(4-methylphenysulfonyl)propan-1-one

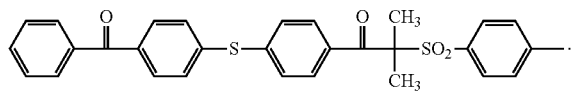

The most preferred photoinitiators are the following compounds:

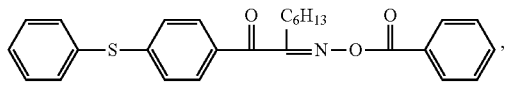

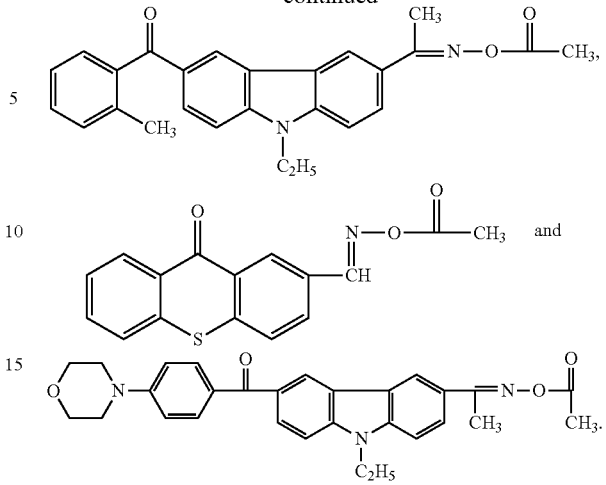

The photoinitiator may be used in combination with a sensitizer and/or a photostabiliser.

The total content of the photoinitiator is preferably from 0.01 to 10% by weight, preferably from 0.05 to 8% by weight, and particularly preferably from 1 to 5% by weight, based on the solid content of the composition.

Upon preparation of the dye-containing curable composition, a solvent is generally used. The solvent is not particularly limited as far as it satisfies solubility to the respective components and coating property of the dye-containing curable composition and it is preferably selected under particular consideration of the solubility of the alkali-soluble binder, the coating property and the safety.

Suitable solvents include esters, e.g. ethyl acetate, butyl acetate, butyl butyrate and methyl methoxyacetate, ether esters such as 1-methoxy-2-propyl-acetate (PGMEA), 2-methoxy-1-propyl-acetate, methylcellosolve acetate, diethylene glycol dimethyl ether, butylcarbitol acetate and polyethylene glycol methyl ether acrylate (PEGMEA), ethers, e.g. tetrahydrofuran, ketones, e.g. 2-butanone, cyclopentanone and cyclohexanone, and aromatic hydrocarbons such as toluene and xylene.

The instant new anthraquinone colourants and colourant compositions are well-dispersible in solvents and/or binders and lead to excellent rheology and storage stability of the resulting compositions. Colour filters made manufactured from these compositions exhibit outstanding hue, resolution, contrast and transparency in the spectral range above 500 nm, especially from 500 to 550 nm in combination with phthalocyanine green pigments, together with excellent general properties such as light and thermal stability.

The examples which follow illustrate the invention, without limiting it ("%" are by weight where not otherwise specified):

EXAMPLE 1

45 g Thiophenol are added dropwise to a suspension of 100 g 1-chloro-anthraquinone and 63 g potassium carbonate in 150 ml ethoxyethanol at 23° C. under stirring. The reaction is strongly exotherm and addition must be performed very slowly, and subsequent addition of solvent improves fluidity and stirring of the reaction mixture. After heating at 120° C. for 3½ hours and subsequent cooling to 23° C., the mixture is filtered on glass (porosity 3) to afford a presscake which is washed with 1 l of methanol. The presscake is in turn suspended in 1 l water at 50° C. and again filtered on a glass filter (porosity 3). Further washing of the presscake with warm water (4 l) affords a filtrate of neutral pH. The presscake is finally dried at 60° C./5·10³ Pa for 12 hours to provide 124.1 g of powdery orange 1-phenylsulfanyl-anthraquinone of formula

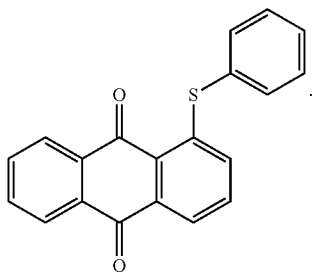 [SMILES: O=C1c2ccccc2C(=O)c2c(Sc3ccccc3)cccc21 ; "."]

HPLC (CH₃CN): purity 94% with $\lambda_{max}$ at 300 nm and 426 nm (PVC: 432 nm);

ESI-LC-MS: M=316 g/mol and 424 g/mol (traces of bis-phenylsulfanyl-anthraquinone) by negative ionisation;

| Analysis: | C | H | N | O | S |
|---|---|---|---|---|---|
| [%] | 75.36 | 3.82 | — | 10.14 | 10.16 |
| calc.: | 75.93 | 3.82 | 0.00 | 10.11 | 10.13 |

EXAMPLE 2

10 g 1-Phenylsulfanyl-anthraquinone are added in portions at 23° C. to 100 ml of chlorosulfonic acid. The thus obtained reaction mixture is stirred for 4 hours, then carefully poured into an ice-sodium chloride bath. The resulting suspension is filtered on glass, thoroughly washed with water and suspended in 150 ml of tetrahydrofuran. Drop-wise addition of an excess of ethanolamine (6 g) results in a red-orange solution which is stirred for 12 hours. The reaction mixture is then poured on ice and the resulting yellow suspension filtered on glass. The collected powder is dried at 50° C./5·10³ Pa for 5 hours. The dry powder is dissolved in 100 ml of acetone/hexane (9:1) and heated to 40° C. The solution is then filtered hot and the press-cake is washed with acetone. The resulting powder is finally dried at 60° C./5·10³ Pa for 15 hours, to afford 9.2 g of the product of formula

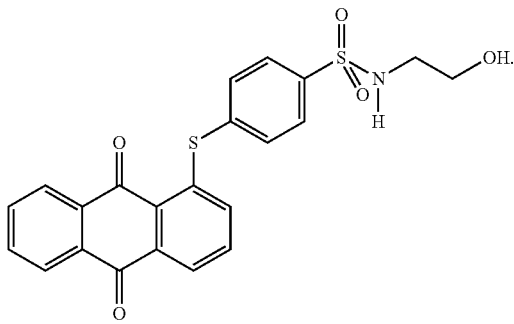 [SMILES: O=C1c2ccccc2C(=O)c2c(Sc3ccc(S(=O)(=O)NCCO)cc3)cccc21]

HPLC (THF): purity 94.5% with $\lambda_{max}$ at 306 nm and 422 nm;

Melting point: 186° C. (by DSC, 30-300° C. at 10° C./min);

ESI-LC-MS: M=439 g/mol by negative ionisation;

NMR (DMSO-d₆+D₂O): 8.13 (t, Ar—H, 2H), 7.95 (d, Ar—H, 1H), 7.83-7.90 (m, Ar—H, 4H), 7.74 (d, Ar—H, 2H), 7.55 (t, Ar—H, 1H), 7.04 (d, Ar—H, 1H), 3.39 (t, —CH₂—, 2H), 2.88 (t, —CH₂—, 2H);

| Analysis: | C | H | N | O | S |
|---|---|---|---|---|---|
| [%] | 60.36 | 4.36 | 3.10 | 18.60 | 14.36 |
| calc.: | 60.12 | 3.90 | 3.19 | 18.20 | 14.59 |

EXAMPLE 3

It is proceeded as in example 2, with the difference that 2-(2-hydroxy-ethylamino)-ethanol is used instead of 2-amino-ethanol in the second step. The product of following formula is obtained:

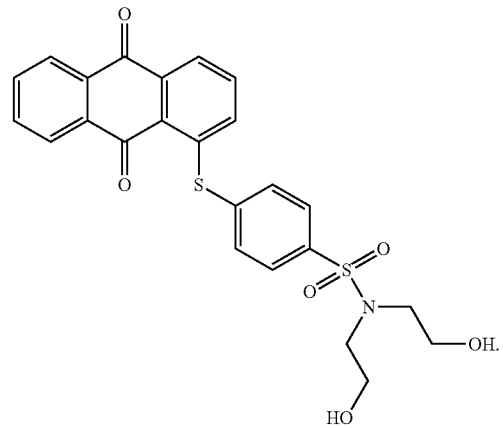 [SMILES: O=C1c2ccccc2C(=O)c2c(Sc3ccc(S(=O)(=O)N(CCO)CCO)cc3)cccc21]

HPLC (THF): purity 96.7% with $\lambda_{max}$ at 307 nm and 422 nm.

Differential Scanning Calorimetry (30-300° C. at 10° C./min): 158° C. (endotherm), 161° C. (exotherm) and 186° C. (endotherm).

ESI-LC-MS: M=483 g/mol by negative ionisation.

NMR (DMSO-d₆): 8.10-8.18 (m, Ar—H, 2H), 7.96 (d, Ar—H, 1H), 7.80-7.91 (m, Ar—H, 4H), 7.75 (d, Ar—H, 2H), 7.61 (t, Ar—H, 1H), 7.05 (d, Ar—H, 1H), 4.75 (t, —OH, 2H), 3.45-3.50 (m, —CH₂—, 4H), 3.16-3.20 (m, —CH₂—, 4H);

| Analysis: | C | H | N | O | S |
|---|---|---|---|---|---|
| [%] | 59.79 | 4.43 | 2.83 | 19.95 | 13.21 |
| calc.: | 59.61 | 4.38 | 2.90 | 19.85 | 13.26 |

Surprisingly, different pattern in the Differential Scanning Calorimetry spectrum are obtained, depending on the isolation method of the product, involving precipitation from various organic solvents. For example, the product is dissolved in hot 2-butoxyethanol, slowly diluted with toluene at 100° C. and after cooling down to 60° C., then slowly precipitated by addition of hexane (95.7% purity by HPLC):

DSC (30-300° C. at 10° C./min): 188° C. (endotherm), but the sharp inflexions 158° C. (endotherm) and 161° C. (exotherm) observed previously are not present in this spectrum.

EXAMPLE 4

It is proceeded as in example 2, with the difference that 2-(2-amino-ethoxy)-ethanol is used instead of 2-amino-ethanol in the second step. The product of following formula is obtained:

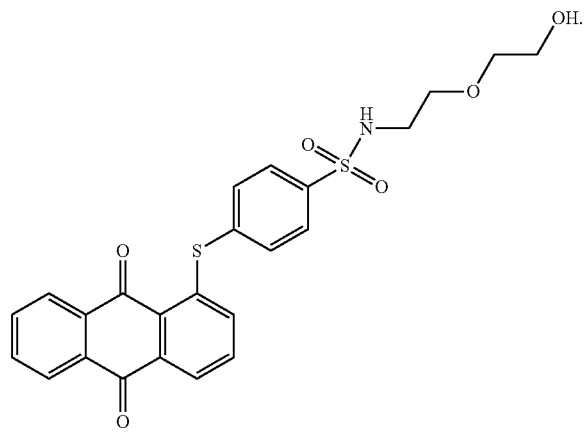 [SMILES: O=C1c2ccccc2C(=O)c2c(Sc3ccc(S(=O)(=O)NCCOCCO)cc3)cccc21]

HPLC (THF): purity 89.8% with $\lambda_{max}$ at 306 nm and 422 nm;

Melting point: 153° C. (Differential Scanning Calorimetry, 30-300.0° C. at 10° C./min);

ESI-LC-MS: M=483 g/mol by negative ionisation;

NMR (DMSO-d$_6$+D$_2$O): 8.13-8.22 (m, Ar—H, 2H), 7.99 (d, Ar—H, 1H), 7.86-7.95 (m, Ar—H, 4H), 7.80 (d, Ar—H, 2H), 7.64 (t, Ar—H, 1H), 7.09 (d, Ar—H, 1H), 3.35-3.50 (m, —CH$_2$—, 4H), 3.30-3.35 (m, —CH$_2$—, 2H), 2.99 (t, —CH$_2$—, 2H);

| Analysis: | C | H | N | O | S |
|---|---|---|---|---|---|
| [%] | 59.31 | 4.52 | 2.79 | 19.98 | 12.99 |
| calc.: | 59.61 | 4.38 | 2.90 | 19.85 | 13.26 |

EXAMPLE 5

It is proceeded as in example 2, with the difference that 3-amino-propane-1,2-diol is used instead of 2-amino-ethanol in the second step. The product of following formula is obtained:

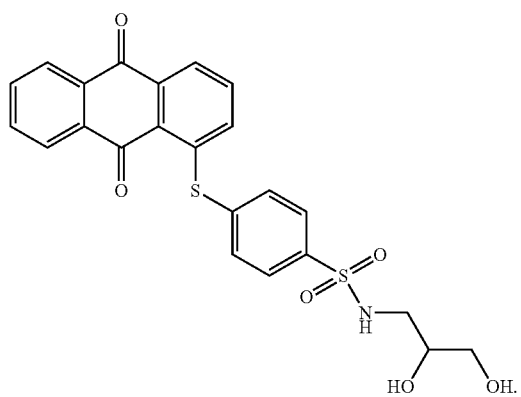 [SMILES: O=C1c2ccccc2C(=O)c2c(Sc3ccc(S(=O)(=O)NCC(O)CO)cc3)cccc21]

HPLC (THF): purity 91.5% with $\lambda_{max}$ at 306 nm and 423 nm;

Melting point: 177° C. (Differential Scanning Calorimetry, 30-300° C. at 10° C./min;

ESI-LC-MS of (5): M=469 g/mol by negative ionisation;

| Analysis: | C | H | N | O | S |
|---|---|---|---|---|---|
| [%] | 58.91 | 4.19 | 2.91 | 20.64 | 13.69 |
| calc.: | 58.84 | 4.08 | 2.98 | 20.44 | 13.66 |

EXAMPLE 6

It is proceeded as in example 2, with the difference that 1-(2-hydroxy-propylamino)-propan-2-ol is used instead of 2-amino-ethanol in the second step. The product of following formula is obtained:

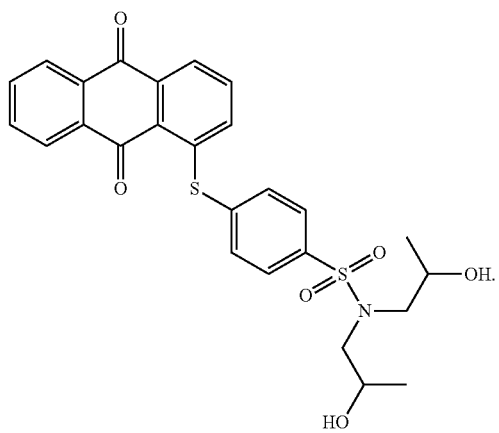 [SMILES: CC(O)CN(CC(C)O)S(=O)(=O)c1ccc(Sc2cccc3c2C(=O)c2ccccc2C3=O)cc1]

HPLC (THF): purity 98.1% with $\lambda_{max}$ at 307 nm and 421 nm;

ESI-LC-MS: M=511 g/mol by negative ionisation;

Differential Scanning Calorimetry (30-300.0° C. at 10° C./min): 101° C. (endotherm), 106° C. (exotherm) and 193° C. (endotherm);

NMR (DMSO-d$_6$+D$_2$O): 8.15-8.30 (m, Ar—H, 2H), 8.01 (d, Ar—H, 1H), 7.88-7.97 (m, Ar—H, 4H), 7.80 (d, Ar—H, 2H), 7.66 (t, Ar—H, 1H), 7.08 (d, Ar—H, 1H), 3.80-4.95 (m, —CH(sp$^3$), 2H), 2.85-3.30 (m, —N—CH$_2$—, 4H), 1.02 (d, —CH$_3$, 6H).

| Analysis: | C | H | N | O | S |
|---|---|---|---|---|---|
| [%] | 59.36 | 5.11 | 2.50 | 20.40 | 12.16 |
| calc.: | 61.04 | 4.93 | 2.74 | 18.76 | 12.53 |

Examples 7-589:

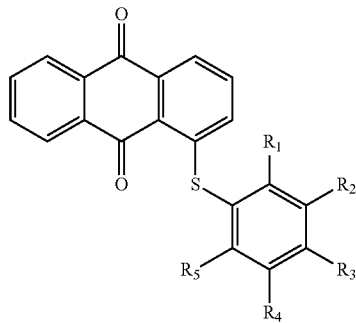

| Ex. | R₁ | R₂ | R₃ | R₄ | R₅ | R₆ | R₇ |
|---|---|---|---|---|---|---|---|
| 7 | H | H | $SO_2R_6R_7$ | H | H | $CH_3$ | $CH_2CH_2OH$ |
| 8 | H | H | $SO_2R_6R_7$ | H | H | $CH_2CH_3$ | $CH_2CH_2OH$ |
| 9 | H | H | $SO_2R_6R_7$ | H | H | H | $CH(CH_3)-CH_2OH$ |
| 10 | H | H | $SO_2R_6R_7$ | H | H | H | $CH-(CH_2OH)-CH_2CH_3$ |
| 11 | H | H | $SO_2R_6R_7$ | H | H | H | $CH_2CH_2SH$ |
| 12 | H | H | $SO_2R_6R_7$ | H | H | $CH_2C_6H_5$ | $CH_2CH_2OH$ |
| 13 | H | H | $SO_2R_6R_7$ | H | H | $CH_2CH_2-CH_3$ | $CH_2CH_2OH$ |
| 14 | H | H | $SO_2R_6R_7$ | H | H | H | $CH_2CH-(CH_3)OH$ |
| 15 | H | H | $SO_2R_6R_7$ | H | H | H | $CH_2CH_2-CH_2OH$ |
| 16 | H | H | $SO_2R_6R_7$ | H | H | H | $CH_2CH_2-CH_2CH_2OH$ |
| 17 | H | H | $SO_2R_6R_7$ | H | H | H | $CH(CH_2-CH_2CH_3)-CH_2OH$ |
| 18 | H | H | $SO_2R_6R_7$ | H | H | $CH(CH_3)_2$ | $CH_2CH_2OH$ |
| 19 | H | H | $SO_2R_6R_7$ | H | H | H | $CH-(CH_2OH)_2$ |
| 20 | H | H | $SO_2R_6R_7$ | H | H | H | $CH_2-CH(OH)-CH_2CH_3$ |
| 21 | $SO_2R_6R_7$ | H | $CH_3$ | H | H | H | $CH_2CH_2OH$ |
| 22 | $SO_2R_6R_7$ | H | $CH_3$ | H | H | $CH_2CH_2OH$ | $CH_2CH_2OH$ |
| 23 | $SO_2R_6R_7$ | H | $CH_3$ | H | H | H | $CH_2CH_2O-CH_2CH_2OH$ |
| 24 | $SO_2R_6R_7$ | H | $CH_3$ | H | H | H | $CH_2-CH(OH)-CH_2OH$ |
| 25 | $SO_2R_6R_7$ | H | $CH_3$ | H | H | $CH_2CH-(CH_3)OH$ | $CH_2CH-(CH_3)OH$ |
| 26 | $SO_2R_6R_7$ | H | $CH_3$ | H | H | $CH_3$ | $CH_2CH_2OH$ |
| 27 | $SO_2R_6R_7$ | H | $CH_3$ | H | H | $CH_2CH_3$ | $CH_2CH_2OH$ |
| 28 | $SO_2R_6R_7$ | H | $CH_3$ | H | H | H | $CH(CH_3)-CH_2OH$ |
| 29 | $SO_2R_6R_7$ | H | $CH_3$ | H | H | H | $CH-(CH_2OH)-CH_2CH_3$ |
| 30 | $SO_2R_6R_7$ | H | $CH_3$ | H | H | H | $CH_2CH_2SH$ |
| 31 | $SO_2R_6R_7$ | H | $CH_3$ | H | H | $CH_2C_6H_5$ | $CH_2CH_2OH$ |
| 32 | $SO_2R_6R_7$ | H | $CH_3$ | H | H | $CH_2CH_2-CH_3$ | $CH_2CH_2OH$ |
| 33 | $SO_2R_6R_7$ | H | $CH_3$ | H | H | H | $CH_2CH-(CH_3)OH$ |
| 34 | $SO_2R_6R_7$ | H | $CH_3$ | H | H | H | $CH_2CH_2-CH_2OH$ |
| 35 | $SO_2R_6R_7$ | H | $CH_3$ | H | H | H | $CH_2CH_2-CH_2CH_2OH$ |
| 36 | $SO_2R_6R_7$ | H | $CH_3$ | H | H | H | $CH(CH_2-CH_2CH_3)-CH_2OH$ |
| 37 | $SO_2R_6R_7$ | H | $CH_3$ | H | H | $CH(CH_3)_2$ | $CH_2CH_2OH$ |
| 38 | $SO_2R_6R_7$ | H | $CH_3$ | H | H | H | $CH-(CH_2OH)_2$ |
| 39 | $SO_2R_6R_7$ | H | $CH_3$ | H | H | H | $CH_2-CH(OH)-CH_2CH_3$ |
| 40 | $SO_2R_6R_7$ | H | $CH_2CH_3$ | H | H | H | $CH_2CH_2OH$ |
| 41 | $SO_2R_6R_7$ | H | $CH_2CH_3$ | H | H | $CH_2CH_2OH$ | $CH_2CH_2OH$ |
| 42 | $SO_2R_6R_7$ | H | $CH_2CH_3$ | H | H | H | $CH_2CH_2O-CH_2CH_2OH$ |
| 43 | $SO_2R_6R_7$ | H | $CH_2CH_3$ | H | H | H | $CH_2-CH(OH)-CH_2OH$ |
| 44 | $SO_2R_6R_7$ | H | $CH_2CH_3$ | H | H | $CH_2CH-(CH_3)OH$ | $CH_2CH-(CH_3)OH$ |
| 45 | $SO_2R_6R_7$ | H | $CH_2CH_3$ | H | H | $CH_3$ | $CH_2CH_2OH$ |
| 46 | $SO_2R_6R_7$ | H | $CH_2CH_3$ | H | H | $CH_2CH_3$ | $CH_2CH_2OH$ |
| 47 | $SO_2R_6R_7$ | H | $CH_2CH_3$ | H | H | H | $CH(CH_3)-CH_2OH$ |
| 48 | $SO_2R_6R_7$ | H | $CH_2CH_3$ | H | H | H | $CH-(CH_2OH)-CH_2CH_3$ |
| 49 | $SO_2R_6R_7$ | H | $CH_2CH_3$ | H | H | H | $CH_2CH_2SH$ |
| 50 | $SO_2R_6R_7$ | H | $CH_2CH_3$ | H | H | $CH_2C_6H_5$ | $CH_2CH_2OH$ |
| 51 | $SO_2R_6R_7$ | H | $CH_2CH_3$ | H | H | $CH_2CH_2-CH_3$ | $CH_2CH_2OH$ |
| 52 | $SO_2R_6R_7$ | H | $CH_2CH_3$ | H | H | H | $CH_2CH-(CH_3)OH$ |
| 53 | $SO_2R_6R_7$ | H | $CH_2CH_3$ | H | H | H | $CH_2CH_2-CH_2OH$ |
| 54 | $SO_2R_6R_7$ | H | $CH_2CH_3$ | H | H | H | $CH_2CH_2-CH_2CH_2OH$ |
| 55 | $SO_2R_6R_7$ | H | $CH_2CH_3$ | H | H | H | $CH(CH_2-CH_2CH_3)-CH_2OH$ |
| 56 | $SO_2R_6R_7$ | H | $CH_2CH_3$ | H | H | $CH(CH_3)_2$ | $CH_2CH_2OH$ |
| 57 | $SO_2R_6R_7$ | H | $CH_2CH_3$ | H | H | H | $CH-(CH_2OH)_2$ |
| 58 | $SO_2R_6R_7$ | H | $CH_2CH_3$ | H | H | H | $CH_2-CH(OH)-CH_2CH_3$ |
| 59 | $CH_3$ | H | $SO_2R_6R_7$ | H | H | H | $CH_2CH_2OH$ |
| 60 | $CH_3$ | H | $SO_2R_6R_7$ | H | H | $CH_2CH_2OH$ | $CH_2CH_2OH$ |
| 61 | $CH_3$ | H | $SO_2R_6R_7$ | H | H | H | $CH_2CH_2O-CH_2CH_2OH$ |
| 62 | $CH_3$ | H | $SO_2R_6R_7$ | H | H | H | $CH_2-CH(OH)-CH_2OH$ |
| 63 | $CH_3$ | H | $SO_2R_6R_7$ | H | H | $CH_2CH-(CH_3)OH$ | $CH_2CH-(CH_3)OH$ |
| 64 | $CH_3$ | H | $SO_2R_6R_7$ | H | H | $CH_3$ | $CH_2CH_2OH$ |
| 65 | $CH_3$ | H | $SO_2R_6R_7$ | H | H | $CH_2CH_3$ | $CH_2CH_2OH$ |

-continued

Examples 7-589:

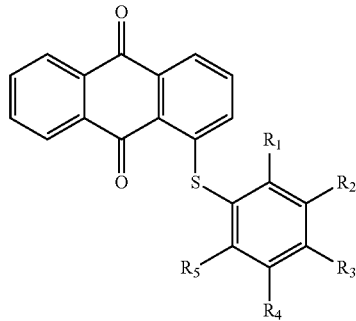

| Ex. | R$_1$ | R$_2$ | R$_3$ | R$_4$ | R$_5$ | R$_6$ | R$_7$ |
|---|---|---|---|---|---|---|---|
| 66 | CH$_3$ | H | SO$_2$R$_6$R$_7$ | H | H | H | CH(CH$_3$)—CH$_2$OH |
| 67 | CH$_3$ | H | SO$_2$R$_6$R$_7$ | H | H | H | CH—(CH$_2$OH)—CH$_2$CH$_3$ |
| 68 | CH$_3$ | H | SO$_2$R$_6$R$_7$ | H | H | H | CH$_2$CH$_2$SH |
| 69 | CH$_3$ | H | SO$_2$R$_6$R$_7$ | H | H | CH$_2$C$_6$H$_5$ | CH$_2$CH$_2$OH |
| 70 | CH$_3$ | H | SO$_2$R$_6$R$_7$ | H | H | CH$_2$CH$_2$—CH$_3$ | CH$_2$CH$_2$OH |
| 71 | CH$_3$ | H | SO$_2$R$_6$R$_7$ | H | H | H | CH$_2$CH—(CH$_3$)OH |
| 72 | CH$_3$ | H | SO$_2$R$_6$R$_7$ | H | H | H | CH$_2$CH$_2$—CH$_2$OH |
| 73 | CH$_3$ | H | SO$_2$R$_6$R$_7$ | H | H | H | CH$_2$CH$_2$—CH$_2$CH$_2$OH |
| 74 | CH$_3$ | H | SO$_2$R$_6$R$_7$ | H | H | H | CH(CH$_2$—CH$_2$CH$_3$)—CH$_2$OH |
| 75 | CH$_3$ | H | SO$_2$R$_6$R$_7$ | H | H | CH(CH$_3$)$_2$ | CH$_2$CH$_2$OH |
| 76 | CH$_3$ | H | SO$_2$R$_6$R$_7$ | H | H | H | CH—(CH$_2$OH)$_2$ |
| 77 | CH$_3$ | H | SO$_2$R$_6$R$_7$ | H | H | H | CH$_2$—CH(OH)—CH$_2$CH$_3$ |
| 78 | H | CH$_3$ | SO$_2$R$_6$R$_7$ | H | H | H | CH$_2$CH$_2$OH |
| 79 | H | CH$_3$ | SO$_2$R$_6$R$_7$ | H | H | CH$_2$CH$_2$OH | CH$_2$CH$_2$OH |
| 80 | H | CH$_3$ | SO$_2$R$_6$R$_7$ | H | H | H | CH$_2$CH$_2$O—CH$_2$CH$_2$OH |
| 81 | H | CH$_3$ | SO$_2$R$_6$R$_7$ | H | H | H | CH$_2$—CH(OH)—CH$_2$OH |
| 82 | H | CH$_3$ | SO$_2$R$_6$R$_7$ | H | H | CH$_2$CH—(CH$_3$)OH | CH$_2$CH—(CH$_3$)OH |
| 83 | H | CH$_3$ | SO$_2$R$_6$R$_7$ | H | H | CH$_3$ | CH$_2$CH$_2$OH |
| 84 | H | CH$_3$ | SO$_2$R$_6$R$_7$ | H | H | CH$_2$CH$_3$ | CH$_2$CH$_2$OH |
| 85 | H | CH$_3$ | SO$_2$R$_6$R$_7$ | H | H | H | CH(CH$_3$)—CH$_2$OH |
| 86 | H | CH$_3$ | SO$_2$R$_6$R$_7$ | H | H | H | CH—(CH$_2$OH)—CH$_2$CH$_3$ |
| 87 | H | CH$_3$ | SO$_2$R$_6$R$_7$ | H | H | H | CH$_2$CH$_2$SH |
| 88 | H | CH$_3$ | SO$_2$R$_6$R$_7$ | H | H | CH$_2$C$_6$H$_5$ | CH$_2$CH$_2$OH |
| 89 | H | CH$_3$ | SO$_2$R$_6$R$_7$ | H | H | CH$_2$CH$_2$—CH$_3$ | CH$_2$CH$_2$OH |
| 90 | H | CH$_3$ | SO$_2$R$_6$R$_7$ | H | H | H | CH$_2$CH—(CH$_3$)OH |
| 91 | H | CH$_3$ | SO$_2$R$_6$R$_7$ | H | H | H | CH$_2$CH$_2$—CH$_2$OH |
| 92 | H | CH$_3$ | SO$_2$R$_6$R$_7$ | H | H | H | CH$_2$CH$_2$—CH$_2$CH$_2$OH |
| 93 | H | CH$_3$ | SO$_2$R$_6$R$_7$ | H | H | H | CH(CH$_2$—CH$_2$CH$_3$)—CH$_2$OH |
| 94 | H | CH$_3$ | SO$_2$R$_6$R$_7$ | H | H | CH(CH$_3$)$_2$ | CH$_2$CH$_2$OH |
| 95 | H | CH$_3$ | SO$_2$R$_6$R$_7$ | H | H | H | CH—(CH$_2$OH)$_2$ |
| 96 | H | CH$_3$ | SO$_2$R$_6$R$_7$ | H | H | H | CH$_2$—CH(OH)—CH$_2$CH$_3$ |
| 97 | SO$_2$R$_6$R$_7$ | H | OCH$_3$ | H | H | H | CH$_2$CH$_2$OH |
| 98 | SO$_2$R$_6$R$_7$ | H | OCH$_3$ | H | H | CH$_2$CH$_2$OH | CH$_2$CH$_2$OH |
| 99 | SO$_2$R$_6$R$_7$ | H | OCH$_3$ | H | H | H | CH$_2$CH$_2$O—CH$_2$CH$_2$OH |
| 100 | SO$_2$R$_6$R$_7$ | H | OCH$_3$ | H | H | H | CH$_2$—CH(OH)—CH$_2$OH |
| 101 | SO$_2$R$_6$R$_7$ | H | OCH$_3$ | H | H | CH$_2$CH—(CH$_3$)OH | CH$_2$CH—(CH$_3$)OH |
| 102 | SO$_2$R$_6$R$_7$ | H | OCH$_3$ | H | H | CH$_3$ | CH$_2$CH$_2$OH |
| 103 | SO$_2$R$_6$R$_7$ | H | OCH$_3$ | H | H | CH$_2$CH$_3$ | CH$_2$CH$_2$OH |
| 104 | SO$_2$R$_6$R$_7$ | H | OCH$_3$ | H | H | H | CH(CH$_3$)—CH$_2$OH |
| 105 | SO$_2$R$_6$R$_7$ | H | OCH$_3$ | H | H | H | CH—(CH$_2$OH)—CH$_2$CH$_3$ |
| 106 | SO$_2$R$_6$R$_7$ | H | OCH$_3$ | H | H | H | CH$_2$CH$_2$SH |
| 107 | SO$_2$R$_6$R$_7$ | H | OCH$_3$ | H | H | CH$_2$C$_6$H$_5$ | CH$_2$CH$_2$OH |
| 108 | SO$_2$R$_6$R$_7$ | H | OCH$_3$ | H | H | CH$_2$CH$_2$—CH$_3$ | CH$_2$CH$_2$OH |
| 109 | SO$_2$R$_6$R$_7$ | H | OCH$_3$ | H | H | H | CH$_2$CH$_2$—(CH$_3$)OH |
| 110 | SO$_2$R$_6$R$_7$ | H | OCH$_3$ | H | H | H | CH$_2$CH$_2$—CH$_2$OH |
| 111 | SO$_2$R$_6$R$_7$ | H | OCH$_3$ | H | H | H | CH$_2$CH$_2$—CH$_2$CH$_2$OH |
| 112 | SO$_2$R$_6$R$_7$ | H | OCH$_3$ | H | H | H | CH(CH$_2$—CH$_2$CH$_3$)—CH$_2$OH |
| 113 | SO$_2$R$_6$R$_7$ | H | OCH$_3$ | H | H | CH(CH$_3$)$_2$ | CH$_2$CH$_2$OH |
| 114 | SO$_2$R$_6$R$_7$ | H | OCH$_3$ | H | H | H | CH—(CH$_2$OH)$_2$ |
| 115 | SO$_2$R$_6$R$_7$ | H | OCH$_3$ | H | H | H | CH$_2$—CH(OH)—CH$_2$CH$_3$ |
| 116 | OCH$_3$ | H | SO$_2$R$_6$R$_7$ | H | H | H | CH$_2$CH$_2$OH |
| 117 | OCH$_3$ | H | SO$_2$R$_6$R$_7$ | H | H | CH$_2$CH$_2$OH | CH$_2$CH$_2$OH |
| 118 | OCH$_3$ | H | SO$_2$R$_6$R$_7$ | H | H | H | CH$_2$CH$_2$O—CH$_2$CH$_2$OH |
| 119 | OCH$_3$ | H | SO$_2$R$_6$R$_7$ | H | H | H | CH$_2$—CH(OH)—CH$_2$OH |
| 120 | OCH$_3$ | H | SO$_2$R$_6$R$_7$ | H | H | CH$_2$CH—(CH$_3$)OH | CH$_2$CH—(CH$_3$)OH |
| 121 | OCH$_3$ | H | SO$_2$R$_6$R$_7$ | H | H | CH$_3$ | CH$_2$CH$_2$OH |
| 122 | OCH$_3$ | H | SO$_2$R$_6$R$_7$ | H | H | CH$_2$CH$_3$ | CH$_2$CH$_2$OH |
| 123 | OCH$_3$ | H | SO$_2$R$_6$R$_7$ | H | H | H | CH(CH$_3$)—CH$_2$OH |
| 124 | OCH$_3$ | H | SO$_2$R$_6$R$_7$ | H | H | H | CH—(CH$_2$OH)—CH$_2$CH$_3$ |

-continued

Examples 7-589:

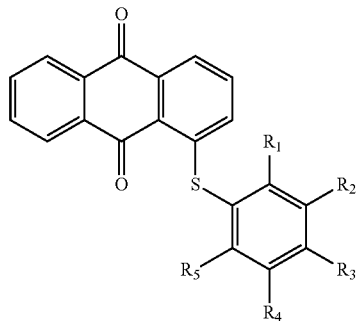

| Ex. | R$_1$ | R$_2$ | R$_3$ | R$_4$ | R$_5$ | R$_6$ | R$_7$ |
|---|---|---|---|---|---|---|---|
| 125 | OCH$_3$ | H | SO$_2$R$_6$R$_7$ | H | H | H | CH$_2$CH$_2$SH |
| 126 | OCH$_3$ | H | SO$_2$R$_6$R$_7$ | H | H | CH$_2$C$_6$H$_5$ | CH$_2$CH$_2$OH |
| 127 | OCH$_3$ | H | SO$_2$R$_6$R$_7$ | H | H | CH$_2$CH$_2$—CH$_3$ | CH$_2$CH$_2$OH |
| 128 | OCH$_3$ | H | SO$_2$R$_6$R$_7$ | H | H | H | CH$_2$CH—(CH$_3$)OH |
| 129 | OCH$_3$ | H | SO$_2$R$_6$R$_7$ | H | H | H | CH$_2$CH$_2$—CH$_2$OH |
| 130 | OCH$_3$ | H | SO$_2$R$_6$R$_7$ | H | H | H | CH$_2$CH$_2$—CH$_2$CH$_2$OH |
| 131 | OCH$_3$ | H | SO$_2$R$_6$R$_7$ | H | H | H | CH(CH$_2$—CH$_2$CH$_3$)—CH$_2$OH |
| 132 | OCH$_3$ | H | SO$_2$R$_6$R$_7$ | H | H | CH(CH$_3$)$_2$ | CH$_2$CH$_2$OH |
| 133 | OCH$_3$ | H | SO$_2$R$_6$R$_7$ | H | H | H | CH—(CH$_2$OH)$_2$ |
| 134 | OCH$_3$ | H | SO$_2$R$_6$R$_7$ | H | H | H | CH$_2$—CH(OH)—CH$_2$CH$_3$ |
| 135 | CH(CH$_3$)$_2$ | H | SO$_2$R$_6$R$_7$ | H | H | H | CH$_2$CH$_2$OH |
| 136 | CH(CH$_3$)$_2$ | H | SO$_2$R$_6$R$_7$ | H | H | CH$_2$CH$_2$OH | CH$_2$CH$_2$OH |
| 137 | CH(CH$_3$)$_2$ | H | SO$_2$R$_6$R$_7$ | H | H | H | CH$_2$CH$_2$O—CH$_2$CH$_2$OH |
| 138 | CH(CH$_3$)$_2$ | H | SO$_2$R$_6$R$_7$ | H | H | H | CH$_2$—CH(OH)—CH$_2$OH |
| 139 | CH(CH$_3$)$_2$ | H | SO$_2$R$_6$R$_7$ | H | H | CH$_2$CH—(CH$_3$)OH | CH$_2$CH—(CH$_3$)OH |
| 140 | CH(CH$_3$)$_2$ | H | SO$_2$R$_6$R$_7$ | H | H | CH$_3$ | CH$_2$CH$_2$OH |
| 141 | CH(CH$_3$)$_2$ | H | SO$_2$R$_6$R$_7$ | H | H | CH$_2$CH$_3$ | CH$_2$CH$_2$OH |
| 142 | CH(CH$_3$)$_2$ | H | SO$_2$R$_6$R$_7$ | H | H | H | CH(CH$_3$)—CH$_2$OH |
| 143 | CH(CH$_3$)$_2$ | H | SO$_2$R$_6$R$_7$ | H | H | H | CH—(CH$_2$OH)—CH$_2$CH$_3$ |
| 144 | CH(CH$_3$)$_2$ | H | SO$_2$R$_6$R$_7$ | H | H | H | CH$_2$CH$_2$SH |
| 145 | CH(CH$_3$)$_2$ | H | SO$_2$R$_6$R$_7$ | H | H | CH$_2$C$_6$H$_5$ | CH$_2$CH$_2$OH |
| 146 | CH(CH$_3$)$_2$ | H | SO$_2$R$_6$R$_7$ | H | H | CH$_2$CH$_2$—CH$_3$ | CH$_2$CH$_2$OH |
| 147 | CH(CH$_3$)$_2$ | H | SO$_2$R$_6$R$_7$ | H | H | H | CH$_2$CH—(CH$_3$)OH |
| 148 | CH(CH$_3$)$_2$ | H | SO$_2$R$_6$R$_7$ | H | H | H | CH$_2$CH$_2$—CH$_2$OH |
| 149 | CH(CH$_3$)$_2$ | H | SO$_2$R$_6$R$_7$ | H | H | H | CH$_2$CH$_2$—CH$_2$CH$_2$OH |
| 150 | CH(CH$_3$)$_2$ | H | SO$_2$R$_6$R$_7$ | H | H | H | CH(CH$_2$—CH$_2$CH$_3$)—CH$_2$OH |
| 151 | CH(CH$_3$)$_2$ | H | SO$_2$R$_6$R$_7$ | H | H | CH(CH$_3$)$_2$ | CH$_2$CH$_2$OH |
| 152 | CH(CH$_3$)$_2$ | H | SO$_2$R$_6$R$_7$ | H | H | H | CH—(CH$_2$OH)$_2$ |
| 153 | CH(CH$_3$)$_2$ | H | SO$_2$R$_6$R$_7$ | H | H | H | CH$_2$—CH(OH)—CH$_2$CH$_3$ |
| 154 | CH$_2$CH$_3$ | H | SO$_2$R$_6$R$_7$ | H | H | H | CH$_2$CH$_2$OH |
| 155 | CH$_2$CH$_3$ | H | SO$_2$R$_6$R$_7$ | H | H | CH$_2$CH$_2$OH | CH$_2$CH$_2$OH |
| 156 | CH$_2$CH$_3$ | H | SO$_2$R$_6$R$_7$ | H | H | H | CH$_2$CH$_2$O—CH$_2$CH$_2$OH |
| 157 | CH$_2$CH$_3$ | H | SO$_2$R$_6$R$_7$ | H | H | H | CH$_2$CH(OH)—CH$_2$OH |
| 158 | CH$_2$CH$_3$ | H | SO$_2$R$_6$R$_7$ | H | H | CH$_2$CH—(CH$_3$)OH | CH$_2$CH—(CH$_3$)OH |
| 159 | CH$_2$CH$_3$ | H | SO$_2$R$_6$R$_7$ | H | H | CH$_3$ | CH$_2$CH$_2$OH |
| 160 | CH$_2$CH$_3$ | H | SO$_2$R$_6$R$_7$ | H | H | CH$_2$CH$_3$ | CH$_2$CH$_2$OH |
| 161 | CH$_2$CH$_3$ | H | SO$_2$R$_6$R$_7$ | H | H | H | CH(CH$_3$)—CH$_2$OH |
| 162 | CH$_2$CH$_3$ | H | SO$_2$R$_6$R$_7$ | H | H | H | CH—(CH$_2$OH)—CH$_2$CH$_3$ |
| 163 | CH$_2$CH$_3$ | H | SO$_2$R$_6$R$_7$ | H | H | H | CH$_2$CH$_2$SH |
| 164 | CH$_2$CH$_3$ | H | SO$_2$R$_6$R$_7$ | H | H | CH$_2$C$_6$H$_5$ | CH$_2$CH$_2$OH |
| 165 | CH$_2$CH$_3$ | H | SO$_2$R$_6$R$_7$ | H | H | CH$_2$CH$_2$—CH$_3$ | CH$_2$CH$_2$OH |
| 166 | CH$_2$CH$_3$ | H | SO$_2$R$_6$R$_7$ | H | H | H | CH$_2$CH—(CH$_3$)OH |
| 167 | CH$_2$CH$_3$ | H | SO$_2$R$_6$R$_7$ | H | H | H | CH$_2$CH$_2$—CH$_2$OH |
| 168 | CH$_2$CH$_3$ | H | SO$_2$R$_6$R$_7$ | H | H | H | CH$_2$CH$_2$—CH$_2$CH$_2$OH |
| 169 | CH$_2$CH$_3$ | H | SO$_2$R$_6$R$_7$ | H | H | H | CH(CH$_2$—CH$_2$CH$_3$)—CH$_2$OH |
| 170 | CH$_2$CH$_3$ | H | SO$_2$R$_6$R$_7$ | H | H | CH(CH$_3$)$_2$ | CH$_2$CH$_2$OH |
| 171 | CH$_2$CH$_3$ | H | SO$_2$R$_6$R$_7$ | H | H | H | CH—(CH$_2$OH)$_2$ |
| 172 | CH$_2$CH$_3$ | H | SO$_2$R$_6$R$_7$ | H | H | H | CH$_2$—CH(OH)—CH$_2$CH$_3$ |
| 173 | SO$_2$R$_6$R$_7$ | H | CH$_2$CH$_2$—CH$_3$ | H | H | H | CH$_2$CH$_2$OH |
| 174 | SO$_2$R$_6$R$_7$ | H | CH$_2$CH$_2$—CH$_3$ | H | H | CH$_2$CH$_2$OH | CH$_2$CH$_2$OH |
| 175 | SO$_2$R$_6$R$_7$ | H | CH$_2$CH$_2$—CH$_3$ | H | H | H | CH$_2$CH$_2$O—CH$_2$CH$_2$OH |
| 176 | SO$_2$R$_6$R$_7$ | H | CH$_2$CH$_2$—CH$_3$ | H | H | H | CH$_2$—CH(OH)—CH$_2$OH |
| 177 | SO$_2$R$_6$R$_7$ | H | CH$_2$CH$_2$—CH$_3$ | H | H | CH$_2$CH—(CH$_3$)OH | CH$_2$CH—(CH$_3$)OH |
| 178 | SO$_2$R$_6$R$_7$ | H | CH$_2$CH$_2$—CH$_3$ | H | H | CH$_3$ | CH$_2$CH$_2$OH |
| 179 | SO$_2$R$_6$R$_7$ | H | CH$_2$CH$_2$—CH$_3$ | H | H | CH$_2$CH$_3$ | CH$_2$CH$_2$OH |
| 180 | SO$_2$R$_6$R$_7$ | H | CH$_2$CH$_2$—CH$_3$ | H | H | H | CH(CH$_3$)—CH$_2$OH |
| 181 | SO$_2$R$_6$R$_7$ | H | CH$_2$CH$_2$—CH$_3$ | H | H | H | CH—(CH$_2$OH)—CH$_2$CH$_3$ |
| 182 | SO$_2$R$_6$R$_7$ | H | CH$_2$CH$_2$—CH$_3$ | H | H | H | CH$_2$CH$_2$SH |
| 183 | SO$_2$R$_6$R$_7$ | H | CH$_2$CH$_2$—CH$_3$ | H | H | CH$_2$C$_6$H$_5$ | CH$_2$CH$_2$OH |

-continued

Examples 7-589:

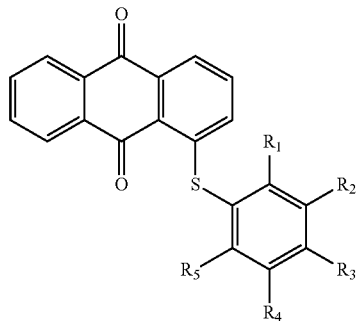

| Ex. | R₁ | R₂ | R₃ | R₄ | R₅ | R₆ | R₇ |
|---|---|---|---|---|---|---|---|
| 184 | SO₂R₆R₇ | H | CH₂CH₂—CH₃ | H | H | CH₂CH₂—CH₃ | CH₂CH₂OH |
| 185 | SO₂R₆R₇ | H | CH₂CH₂—CH₃ | H | H | H | CH₂CH—(CH₃)OH |
| 186 | SO₂R₆R₇ | H | CH₂CH₂—CH₃ | H | H | H | CH₂CH₂—CH₂OH |
| 187 | SO₂R₆R₇ | H | CH₂CH₂—CH₃ | H | H | H | CH₂CH₂—CH₂CH₂OH |
| 188 | SO₂R₆R₇ | H | CH₂CH₂—CH₃ | H | H | H | CH(CH₂—CH₂CH₃)—CH₂OH |
| 189 | SO₂R₆R₇ | H | CH₂CH₂—CH₃ | H | H | CH(CH₃)₂ | CH₂CH₂OH |
| 190 | SO₂R₆R₇ | H | CH₂CH₂—CH₃ | H | H | H | CH—(CH₂OH)₂ |
| 191 | SO₂R₆R₇ | H | CH₂CH₂—CH₃ | H | H | H | CH₂—CH(OH)—CH₂CH₃ |
| 192 | SO₂R₆R₇ | H | CH₂CH₂—CH₂CH₃ | H | H | H | CH₂CH₂OH |
| 193 | SO₂R₆R₇ | H | CH₂CH₂—CH₂CH₃ | H | H | CH₂CH₂OH | CH₂CH₂OH |
| 194 | SO₂R₆R₇ | H | CH₂CH₂—CH₂CH₃ | H | H | H | CH₂CH₂O—CH₂CH₂OH |
| 195 | SO₂R₆R₇ | H | CH₂CH₂—CH₂CH₃ | H | H | H | CH₂—CH(OH)—CH₂OH |
| 196 | SO₂R₆R₇ | H | CH₂CH₂—CH₂CH₃ | H | H | CH₂CH—(CH₃)OH | CH₂CH—(CH₃)OH |
| 197 | SO₂R₆R₇ | H | CH₂CH₂—CH₂CH₃ | H | H | CH₃ | CH₂CH₂OH |
| 198 | SO₂R₆R₇ | H | CH₂CH₂—CH₂CH₃ | H | H | CH₂CH₃ | CH₂CH₂OH |
| 199 | SO₂R₆R₇ | H | CH₂CH₂—CH₂CH₃ | H | H | H | CH(CH₃)—CH₂OH |
| 200 | SO₂R₆R₇ | H | CH₂CH₂—CH₂CH₃ | H | H | H | CH—(CH₂OH)—CH₂CH₃ |
| 201 | SO₂R₆R₇ | H | CH₂CH₂—CH₂CH₃ | H | H | H | CH₂CH₂SH |
| 202 | SO₂R₆R₇ | H | CH₂CH₂—CH₂CH₃ | H | H | CH₂C₆H₅ | CH₂CH₂OH |
| 203 | SO₂R₆R₇ | H | CH₂CH₂—CH₂CH₃ | H | H | CH₂CH₂—CH₃ | CH₂CH₂OH |
| 204 | SO₂R₆R₇ | H | CH₂CH₂—CH₂CH₃ | H | H | H | CH₂CH—(CH₃)OH |
| 205 | SO₂R₆R₇ | H | CH₂CH₂—CH₂CH₃ | H | H | H | CH₂CH₂—CH₂OH |
| 206 | SO₂R₆R₇ | H | CH₂CH₂—CH₂CH₃ | H | H | H | CH₂CH₂—CH₂CH₂OH |
| 207 | SO₂R₆R₇ | H | CH₂CH₂—CH₂CH₃ | H | H | H | CH(CH₂—CH₂CH₃)—CH₂OH |
| 208 | SO₂R₆R₇ | H | CH₂CH₂—CH₂CH₃ | H | H | CH(CH₃)₂ | CH₂CH₂OH |
| 209 | SO₂R₆R₇ | H | CH₂CH₂—CH₂CH₃ | H | H | H | CH—(CH₂OH)₂ |
| 210 | SO₂R₆R₇ | H | CH₂CH₂—CH₂CH₃ | H | H | H | CH₂—CH(OH)—CH₂CH₃ |
| 211 | CH(CH₃)₂ | H | SO₂R₆R₇ | H | H | H | CH₂CH₂OH |
| 212 | CH(CH₃)₂ | H | SO₂R₆R₇ | H | H | CH₂CH₂OH | CH₂CH₂OH |
| 213 | CH(CH₃)₂ | H | SO₂R₆R₇ | H | H | H | CH₂CH₂O—CH₂CH₂OH |
| 214 | CH(CH₃)₂ | H | SO₂R₆R₇ | H | H | H | CH₂—CH(OH)—CH₂OH |
| 215 | CH(CH₃)₂ | H | SO₂R₆R₇ | H | H | CH₂CH—(CH₃)OH | CH₂CH—(CH₃)OH |
| 216 | CH(CH₃)₂ | H | SO₂R₆R₇ | H | H | CH₃ | CH₂CH₂OH |
| 217 | CH(CH₃)₂ | H | SO₂R₆R₇ | H | H | CH₂CH₃ | CH₂CH₂OH |
| 218 | CH(CH₃)₂ | H | SO₂R₆R₇ | H | H | H | CH(CH₃)—CH₂OH |
| 219 | CH(CH₃)₂ | H | SO₂R₆R₇ | H | H | H | CH—(CH₂OH)—CH₂CH₃ |
| 220 | CH(CH₃)₂ | H | SO₂R₆R₇ | H | H | H | CH₂CH₂SH |
| 221 | CH(CH₃)₂ | H | SO₂R₆R₇ | H | H | CH₂C₆H₅ | CH₂CH₂OH |
| 222 | CH(CH₃)₂ | H | SO₂R₆R₇ | H | H | CH₂CH₂—CH₃ | CH₂CH₂OH |
| 223 | CH(CH₃)₂ | H | SO₂R₆R₇ | H | H | H | CH₂CH—(CH₃)OH |
| 224 | CH(CH₃)₂ | H | SO₂R₆R₇ | H | H | H | CH₂CH₂—CH₂OH |
| 225 | CH(CH₃)₂ | H | SO₂R₆R₇ | H | H | H | CH₂CH₂—CH₂CH₂OH |
| 226 | CH(CH₃)₂ | H | SO₂R₆R₇ | H | H | H | CH(CH₂—CH₂CH₃)—CH₂OH |
| 227 | CH(CH₃)₂ | H | SO₂R₆R₇ | H | H | CH(CH₃)₂ | CH₂CH₂OH |
| 228 | CH(CH₃)₂ | H | SO₂R₆R₇ | H | H | H | CH—(CH₂OH)₂ |
| 229 | CH(CH₃)₂ | H | SO₂R₆R₇ | H | H | H | CH₂—CH(OH)—CH₂CH₃ |
| 230 | SO₂R₆R₇ | H | C₆H₅ | H | H | H | CH₂CH₂OH |
| 231 | SO₂R₆R₇ | H | C₆H₅ | H | H | CH₂CH₂OH | CH₂CH₂OH |
| 232 | SO₂R₆R₇ | H | C₆H₅ | H | H | H | CH₂CH₂O—CH₂CH₂OH |
| 233 | SO₂R₆R₇ | H | C₆H₅ | H | H | H | CH₂—CH(OH)—CH₂OH |
| 234 | SO₂R₆R₇ | H | C₆H₅ | H | H | CH₂CH—(CH₃)OH | CH₂CH—(CH₃)OH |
| 235 | SO₂R₆R₇ | H | C₆H₅ | H | H | CH₃ | CH₂CH₂OH |
| 236 | SO₂R₆R₇ | H | C₆H₅ | H | H | CH₂CH₃ | CH₂CH₂OH |
| 237 | SO₂R₆R₇ | H | C₆H₅ | H | H | H | CH(CH₃)—CH₂OH |
| 238 | SO₂R₆R₇ | H | C₆H₅ | H | H | H | CH—(CH₂OH)—CH₂CH₃ |
| 239 | SO₂R₆R₇ | H | C₆H₅ | H | H | H | CH₂CH₂SH |
| 240 | SO₂R₆R₇ | H | C₆H₅ | H | H | CH₂C₆H₅ | CH₂CH₂OH |
| 241 | SO₂R₆R₇ | H | C₆H₅ | H | H | CH₂CH₂—CH₃ | CH₂CH₂OH |
| 242 | SO₂R₆R₇ | H | C₆H₅ | H | H | H | CH₂CH—(CH₃)OH |

-continued

Examples 7-589:

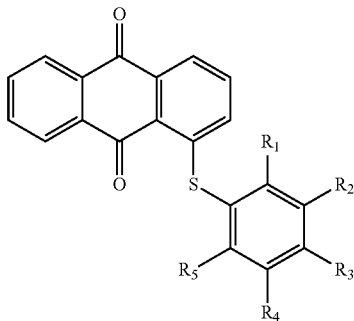

| Ex. | R₁ | R₂ | R₃ | R₄ | R₅ | R₆ | R₇ |
|---|---|---|---|---|---|---|---|
| 243 | SO₂R₆R₇ | H | C₆H₅ | H | H | H | CH₂CH₂—CH₂OH |
| 244 | SO₂R₆R₇ | H | C₆H₅ | H | H | H | CH₂CH₂—CH₂CH₂OH |
| 245 | SO₂R₆R₇ | H | C₆H₅ | H | H | H | CH(CH₂—CH₂CH₃)—CH₂OH |
| 246 | SO₂R₆R₇ | H | C₆H₅ | H | H | CH(CH₃)₂ | CH₂CH₂OH |
| 247 | SO₂R₆R₇ | H | C₆H₅ | H | H | H | CH—(CH₂OH)₂ |
| 248 | SO₂R₆R₇ | H | C₆H₅ | H | H | H | CH₂—CH(OH)—CH₂CH₃ |
| 249 | SO₂R₆R₇ | H | OCH₂CH₃ | H | H | H | CH₂CH₂OH |
| 250 | SO₂R₆R₇ | H | OCH₂CH₃ | H | H | CH₂CH₂OH | CH₂CH₂OH |
| 251 | SO₂R₆R₇ | H | OCH₂CH₃ | H | H | H | CH₂CH₂O—CH₂CH₂OH |
| 252 | SO₂R₆R₇ | H | OCH₂CH₃ | H | H | H | CH₂—CH(OH)—CH₂OH |
| 253 | SO₂R₆R₇ | H | OCH₂CH₃ | H | H | CH₂CH—(CH₃)OH | CH₂CH—(CH₃)OH |
| 254 | SO₂R₆R₇ | H | OCH₂CH₃ | H | H | CH₃ | CH₂CH₂OH |
| 255 | SO₂R₆R₇ | H | OCH₂CH₃ | H | H | CH₂CH₃ | CH₂CH₂OH |
| 256 | SO₂R₆R₇ | H | OCH₂CH₃ | H | H | H | CH(CH₃)—CH₂OH |
| 257 | SO₂R₆R₇ | H | OCH₂CH₃ | H | H | H | CH—(CH₂OH)—CH₂CH₃ |
| 258 | SO₂R₆R₇ | H | OCH₂CH₃ | H | H | H | CH₂CH₂SH |
| 259 | SO₂R₆R₇ | H | OCH₂CH₃ | H | H | CH₂C₆H₅ | CH₂CH₂OH |
| 260 | SO₂R₆R₇ | H | OCH₂CH₃ | H | H | CH₂CH₂—CH₃ | CH₂CH₂OH |
| 261 | SO₂R₆R₇ | H | OCH₂CH₃ | H | H | H | CH₂CH—(CH₃)OH |
| 262 | SO₂R₆R₇ | H | OCH₂CH₃ | H | H | H | CH₂CH₂—CH₂OH |
| 263 | SO₂R₆R₇ | H | OCH₂CH₃ | H | H | H | CH₂CH₂—CH₂CH₂OH |
| 264 | SO₂R₆R₇ | H | OCH₂CH₃ | H | H | H | CH(CH₂—CH₂CH₃)—CH₂OH |
| 265 | SO₂R₆R₇ | H | OCH₂CH₃ | H | H | CH(CH₃)₂ | CH₂CH₂OH |
| 266 | SO₂R₆R₇ | H | OCH₂CH₃ | H | H | H | CH—(CH₂OH)₂ |
| 267 | SO₂R₆R₇ | H | OCH₂CH₃ | H | H | H | CH₂—CH(OH)—CH₂CH₃ |
| 268 | SO₂R₆R₇ | H | SCH₂CH₃ | H | H | H | CH₂CH₂OH |
| 269 | SO₂R₆R₇ | H | SCH₂CH₃ | H | H | CH₂CH₂OH | CH₂CH₂OH |
| 270 | SO₂R₆R₇ | H | SCH₂CH₃ | H | H | H | CH₂CH₂O—CH₂CH₂OH |
| 271 | SO₂R₆R₇ | H | SCH₂CH₃ | H | H | H | CH—CH(OH)—CH₂OH |
| 272 | SO₂R₆R₇ | H | SCH₂CH₃ | H | H | CH₂CH—(CH₃)OH | CH₂CH—(CH₃)OH |
| 273 | SO₂R₆R₇ | H | SCH₂CH₃ | H | H | CH₃ | CH₂CH₂OH |
| 274 | SO₂R₆R₇ | H | SCH₂CH₃ | H | H | CH₂CH₃ | CH₂CH₂OH |
| 275 | SO₂R₆R₇ | H | SCH₂CH₃ | H | H | H | CH(CH₃)—CH₂OH |
| 276 | SO₂R₆R₇ | H | SCH₂CH₃ | H | H | H | CH—(CH₂OH)—CH₂CH₃ |
| 277 | SO₂R₆R₇ | H | SCH₂CH₃ | H | H | H | CH₂CH₂SH |
| 278 | SO₂R₆R₇ | H | SCH₂CH₃ | H | H | CH₂C₆H₅ | CH₂CH₂OH |
| 279 | SO₂R₆R₇ | H | SCH₂CH₃ | H | H | CH₂CH₂—CH₃ | CH₂CH₂OH |
| 280 | SO₂R₆R₇ | H | SCH₂CH₃ | H | H | H | CH₂CH—(CH₃)OH |
| 281 | SO₂R₆R₇ | H | SCH₂CH₃ | H | H | H | CH₂CH₂—CH₂OH |
| 282 | SO₂R₆R₇ | H | SCH₂CH₃ | H | H | H | CH₂CH₂—CH₂CH₂OH |
| 283 | SO₂R₆R₇ | H | SCH₂CH₃ | H | H | H | CH(CH₂—CH₂CH₃)—CH₂OH |
| 284 | SO₂R₆R₇ | H | SCH₂CH₃ | H | H | CH(CH₃)₂ | CH₂CH₂OH |
| 285 | SO₂R₆R₇ | H | SCH₂CH₃ | H | H | H | CH—(CH₂OH)₂ |
| 286 | SO₂R₆R₇ | H | SCH₂CH₃ | H | H | H | CH—CH(OH)—CH₂CH₃ |
| 287 | SO₂R₆R₇ | H | CH₃ | H | CH₃ | H | CH₂CH₂OH |
| 288 | SO₂R₆R₇ | H | CH₃ | H | CH₃ | CH₂CH₂OH | CH₂CH₂OH |
| 289 | SO₂R₆R₇ | H | CH₃ | H | CH₃ | H | CH₂CH₂O—CH₂CH₂OH |
| 290 | SO₂R₆R₇ | H | CH₃ | H | CH₃ | H | CH₂—CH(OH)—CH₂OH |
| 291 | SO₂R₆R₇ | H | CH₃ | H | CH₃ | CH₂CH—(CH₃)OH | CH₂CH—(CH₃)OH |
| 292 | SO₂R₆R₇ | H | CH₃ | H | CH₃ | CH₃ | CH₂CH₂OH |
| 293 | SO₂R₆R₇ | H | CH₃ | H | CH₃ | CH₂CH₃ | CH₂CH₂OH |
| 294 | SO₂R₆R₇ | H | CH₃ | H | CH₃ | H | CH(CH₃)—CH₂OH |
| 295 | SO₂R₆R₇ | H | CH₃ | H | CH₃ | H | CH—(CH₂OH)—CH₂CH₃ |
| 296 | SO₂R₆R₇ | H | CH₃ | H | CH₃ | H | CH₂CH₂SH |
| 297 | SO₂R₆R₇ | H | CH₃ | H | CH₃ | CH₂C₆H₅ | CH₂CH₂OH |
| 298 | SO₂R₆R₇ | H | CH₃ | H | CH₃ | CH₂CH₂—CH₃ | CH₂CH₂OH |
| 299 | SO₂R₆R₇ | H | CH₃ | H | CH₃ | H | CH₂CH—(CH₃)OH |
| 300 | SO₂R₆R₇ | H | CH₃ | H | CH₃ | H | CH₂CH₂—CH₂OH |
| 301 | SO₂R₆R₇ | H | CH₃ | H | CH₃ | H | CH₂CH₂—CH₂CH₂OH |

-continued

Examples 7-589:

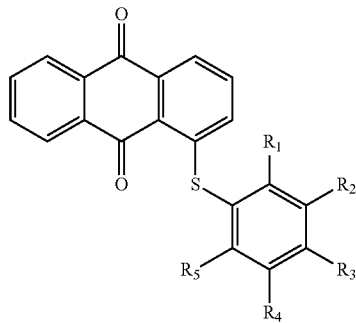

| Ex. | R$_1$ | R$_2$ | R$_3$ | R$_4$ | R$_5$ | R$_6$ | R$_7$ |
|---|---|---|---|---|---|---|---|
| 302 | SO$_2$R$_6$R$_7$ | H | CH$_3$ | H | CH$_3$ | H | CH(CH$_2$—CH$_2$CH$_3$)—CH$_2$OH |
| 303 | SO$_2$R$_6$R$_7$ | H | CH$_3$ | H | CH$_3$ | CH(CH$_3$)$_2$ | CH$_2$CH$_2$OH |
| 304 | SO$_2$R$_6$R$_7$ | H | CH$_3$ | H | CH$_3$ | H | CH—(CH$_2$OH)$_2$ |
| 305 | SO$_2$R$_6$R$_7$ | H | CH$_3$ | H | CH$_3$ | H | CH$_2$—CH(OH)—CH$_2$CH$_3$ |
| 306 | H | CH$_3$ | SO$_2$R$_6$R$_7$ | H | CH$_3$ | H | CH$_2$CH$_2$OH |
| 307 | H | CH$_3$ | SO$_2$R$_6$R$_7$ | H | CH$_3$ | CH$_2$CH$_2$OH | CH$_2$CH$_2$OH |
| 308 | H | CH$_3$ | SO$_2$R$_6$R$_7$ | H | CH$_3$ | H | CH$_2$CH$_2$O—CH$_2$CH$_2$OH |
| 309 | H | CH$_3$ | SO$_2$R$_6$R$_7$ | H | CH$_3$ | H | CH$_2$—CH(OH)—CH$_2$OH |
| 310 | H | CH$_3$ | SO$_2$R$_6$R$_7$ | H | CH$_3$ | CH$_2$CH—(CH$_3$)OH | CH$_2$CH—(CH$_3$)OH |
| 311 | H | CH$_3$ | SO$_2$R$_6$R$_7$ | H | CH$_3$ | CH$_3$ | CH$_2$CH$_2$OH |
| 312 | H | CH$_3$ | SO$_2$R$_6$R$_7$ | H | CH$_3$ | CH$_2$CH$_3$ | CH$_2$CH$_2$OH |
| 313 | H | CH$_3$ | SO$_2$R$_6$R$_7$ | H | CH$_3$ | H | CH(CH$_3$)—CH$_2$OH |
| 314 | H | CH$_3$ | SO$_2$R$_6$R$_7$ | H | CH$_3$ | H | CH—(CH$_2$OH)—CH$_2$CH$_3$ |
| 315 | H | CH$_3$ | SO$_2$R$_6$R$_7$ | H | CH$_3$ | H | CH$_2$CH$_2$SH |
| 316 | H | CH$_3$ | SO$_2$R$_6$R$_7$ | H | CH$_3$ | CH$_2$C$_6$H$_5$ | CH$_2$CH$_2$OH |
| 317 | H | CH$_3$ | SO$_2$R$_6$R$_7$ | H | CH$_3$ | CH$_2$CH$_2$—CH$_3$ | CH$_2$CH$_2$OH |
| 318 | H | CH$_3$ | SO$_2$R$_6$R$_7$ | H | CH$_3$ | H | CH$_2$CH—(CH$_3$)OH |
| 319 | H | CH$_3$ | SO$_2$R$_6$R$_7$ | H | CH$_3$ | H | CH$_2$CH$_2$—CH$_2$OH |
| 320 | H | CH$_3$ | SO$_2$R$_6$R$_7$ | H | CH$_3$ | H | CH$_2$CH$_2$—CH$_2$CH$_2$OH |
| 321 | H | CH$_3$ | SO$_2$R$_6$R$_7$ | H | CH$_3$ | H | CH(CH$_2$—CH$_2$CH$_3$)—CH$_2$OH |
| 322 | H | CH$_3$ | SO$_2$R$_6$R$_7$ | H | CH$_3$ | CH(CH$_3$)$_2$ | CH$_2$CH$_2$OH |
| 323 | H | CH$_3$ | SO$_2$R$_6$R$_7$ | H | CH$_3$ | H | CH—(CH$_2$OH)$_2$ |
| 324 | H | CH$_3$ | SO$_2$R$_6$R$_7$ | H | CH$_3$ | H | CH—CH(OH)—CH$_2$CH$_3$ |
| 325 | CH$_3$ | H | SO$_2$R$_6$R$_7$ | H | CH$_3$ | H | CH$_2$CH$_2$OH |
| 326 | CH$_3$ | H | SO$_2$R$_6$R$_7$ | H | CH$_3$ | CH$_2$CH$_2$OH | CH$_2$CH$_2$OH |
| 327 | CH$_3$ | H | SO$_2$R$_6$R$_7$ | H | CH$_3$ | H | CH$_2$CH$_2$O—CH$_2$CH$_2$OH |
| 328 | CH$_3$ | H | SO$_2$R$_6$R$_7$ | H | CH$_3$ | H | CH$_2$—CH(OH)—CH$_2$OH |
| 329 | CH$_3$ | H | SO$_2$R$_6$R$_7$ | H | CH$_3$ | CH$_2$CH—(CH$_3$)OH | CH$_2$CH—(CH$_3$)OH |
| 330 | CH$_3$ | H | SO$_2$R$_6$R$_7$ | H | CH$_3$ | CH$_3$ | CH$_2$CH$_2$OH |
| 331 | CH$_3$ | H | SO$_2$R$_6$R$_7$ | H | CH$_3$ | CH$_2$CH$_3$ | CH$_2$CH$_2$OH |
| 332 | CH$_3$ | H | SO$_2$R$_6$R$_7$ | H | CH$_3$ | H | CH(CH$_3$)—CH$_2$OH |
| 333 | CH$_3$ | H | SO$_2$R$_6$R$_7$ | H | CH$_3$ | H | CH—(CH$_2$OH)—CH$_2$CH$_3$ |
| 334 | CH$_3$ | H | SO$_2$R$_6$R$_7$ | H | CH$_3$ | H | CH$_2$CH$_2$SH |
| 335 | CH$_3$ | H | SO$_2$R$_6$R$_7$ | H | CH$_3$ | CH$_2$C$_6$H$_5$ | CH$_2$CH$_2$OH |
| 336 | CH$_3$ | H | SO$_2$R$_6$R$_7$ | H | CH$_3$ | CH$_2$CH$_2$—CH$_3$ | CH$_2$CH$_2$OH |
| 337 | CH$_3$ | H | SO$_2$R$_6$R$_7$ | H | CH$_3$ | H | CH$_2$CH—(CH$_3$)OH |
| 338 | CH$_3$ | H | SO$_2$R$_6$R$_7$ | H | CH$_3$ | H | CH$_2$CH$_2$—CH$_2$OH |
| 339 | CH$_3$ | H | SO$_2$R$_6$R$_7$ | H | CH$_3$ | H | CH$_2$CH$_2$—CH$_2$CH$_2$OH |
| 340 | CH$_3$ | H | SO$_2$R$_6$R$_7$ | H | CH$_3$ | H | CH(CH$_2$—CH$_2$CH$_3$)—CH$_2$OH |
| 341 | CH$_3$ | H | SO$_2$R$_6$R$_7$ | H | CH$_3$ | CH(CH$_3$)$_2$ | CH$_2$CH$_2$OH |
| 342 | CH$_3$ | H | SO$_2$R$_6$R$_7$ | H | CH$_3$ | H | CH—(CH$_2$OH)$_2$ |
| 343 | CH$_3$ | H | SO$_2$R$_6$R$_7$ | H | CH$_3$ | H | CH$_2$—CH(OH)—CH$_2$CH$_3$ |
| 344 | SO$_2$R$_6$R$_7$ | H | OCH$_3$ | H | CH$_3$ | H | CH$_2$CH$_2$OH |
| 345 | SO$_2$R$_6$R$_7$ | H | OCH$_3$ | H | CH$_3$ | CH$_2$CH$_2$OH | CH$_2$CH$_2$OH |
| 346 | SO$_2$R$_6$R$_7$ | H | OCH$_3$ | H | CH$_3$ | H | CH$_2$CH$_2$O—CH$_2$CH$_2$OH |
| 347 | SO$_2$R$_6$R$_7$ | H | OCH$_3$ | H | CH$_3$ | H | CH$_2$—CH(OH)—CH$_2$OH |
| 348 | SO$_2$R$_6$R$_7$ | H | OCH$_3$ | H | CH$_3$ | CH$_2$CH—(CH$_3$)OH | CH$_2$CH—(CH$_3$)OH |
| 349 | SO$_2$R$_6$R$_7$ | H | OCH$_3$ | H | CH$_3$ | CH$_3$ | CH$_2$CH$_2$OH |
| 350 | SO$_2$R$_6$R$_7$ | H | OCH$_3$ | H | CH$_3$ | CH$_2$CH$_3$ | CH$_2$CH$_2$OH |
| 351 | SO$_2$R$_6$R$_7$ | H | OCH$_3$ | H | CH$_3$ | H | CH(CH$_3$)—CH$_2$OH |
| 352 | SO$_2$R$_6$R$_7$ | H | OCH$_3$ | H | CH$_3$ | H | CH—(CH$_2$OH)—CH$_2$CH$_3$ |
| 353 | SO$_2$R$_6$R$_7$ | H | OCH$_3$ | H | CH$_3$ | H | CH$_2$CH$_2$SH |
| 354 | SO$_2$R$_6$R$_7$ | H | OCH$_3$ | H | CH$_3$ | CH$_2$C$_6$H$_5$ | CH$_2$CH$_2$OH |
| 355 | SO$_2$R$_6$R$_7$ | H | OCH$_3$ | H | CH$_3$ | CH$_2$CH$_2$—CH$_3$ | CH$_2$CH$_2$OH |
| 356 | SO$_2$R$_6$R$_7$ | H | OCH$_3$ | H | CH$_3$ | H | CH$_2$CH—(CH$_3$)OH |
| 357 | SO$_2$R$_6$R$_7$ | H | OCH$_3$ | H | CH$_3$ | H | CH$_2$CH$_2$—CH$_2$OH |
| 358 | SO$_2$R$_6$R$_7$ | H | OCH$_3$ | H | CH$_3$ | H | CH$_2$CH$_2$—CH$_2$CH$_2$OH |
| 359 | SO$_2$R$_6$R$_7$ | H | OCH$_3$ | H | CH$_3$ | H | CH(CH$_2$—CH$_2$CH$_3$)—CH$_2$OH |
| 360 | SO$_2$R$_6$R$_7$ | H | OCH$_3$ | H | CH$_3$ | CH(CH$_3$)$_2$ | CH$_2$CH$_2$OH |

-continued

Examples 7-589:

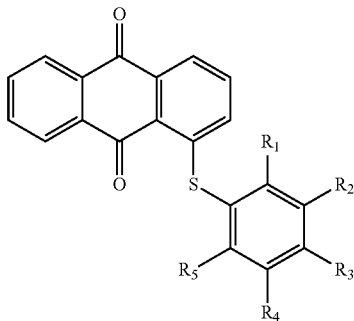

| Ex. | R$_1$ | R$_2$ | R$_3$ | R$_4$ | R$_5$ | R$_6$ | R$_7$ |
|---|---|---|---|---|---|---|---|
| 361 | SO$_2$R$_6$R$_7$ | H | OCH$_3$ | H | CH$_3$ | H | CH—(CH$_2$OH)$_2$ |
| 362 | SO$_2$R$_6$R$_7$ | H | OCH$_3$ | H | CH$_3$ | H | CH$_2$—CH(OH)—CH$_2$CH$_3$ |
| 363 | SO$_2$R$_6$R$_7$ | H | CH$_3$ | CH$_3$ | H | H | CH$_2$CH$_2$OH |
| 364 | SO$_2$R$_6$R$_7$ | H | CH$_3$ | CH$_3$ | H | CH$_2$CH$_2$OH | CH$_2$CH$_2$OH |
| 365 | SO$_2$R$_6$R$_7$ | H | CH$_3$ | CH$_3$ | H | H | CH$_2$CH$_2$O—CH$_2$CH$_2$OH |
| 366 | SO$_2$R$_6$R$_7$ | H | CH$_3$ | CH$_3$ | H | H | CH$_2$—CH(OH)—CH$_2$OH |
| 367 | SO$_2$R$_6$R$_7$ | H | CH$_3$ | CH$_3$ | H | CH$_2$CH—(CH$_3$)OH | CH$_2$CH—(CH$_3$)OH |
| 368 | SO$_2$R$_6$R$_7$ | H | CH$_3$ | CH$_3$ | H | CH$_3$ | CH$_2$CH$_2$OH |
| 369 | SO$_2$R$_6$R$_7$ | H | CH$_3$ | CH$_3$ | H | CH$_2$CH$_3$ | CH$_2$CH$_2$OH |
| 370 | SO$_2$R$_6$R$_7$ | H | CH$_3$ | CH$_3$ | H | H | CH(CH$_3$)—CH$_2$OH |
| 371 | SO$_2$R$_6$R$_7$ | H | CH$_3$ | CH$_3$ | H | H | CH—(CH$_2$OH)—CH$_2$CH$_3$ |
| 372 | SO$_2$R$_6$R$_7$ | H | CH$_3$ | CH$_3$ | H | H | CH$_2$CH$_2$SH |
| 373 | SO$_2$R$_6$R$_7$ | H | CH$_3$ | CH$_3$ | H | CH$_2$C$_6$H$_5$ | CH$_2$CH$_2$OH |
| 374 | SO$_2$R$_6$R$_7$ | H | CH$_3$ | CH$_3$ | H | CH$_2$CH$_2$—CH$_3$ | CH$_2$CH$_2$OH |
| 375 | SO$_2$R$_6$R$_7$ | H | CH$_3$ | CH$_3$ | H | H | CH$_2$CH—(CH$_3$)OH |
| 376 | SO$_2$R$_6$R$_7$ | H | CH$_3$ | CH$_3$ | H | H | CH$_2$CH$_2$—CH$_2$OH |
| 377 | SO$_2$R$_6$R$_7$ | H | CH$_3$ | CH$_3$ | H | H | CH$_2$CH$_2$—CH$_2$CH$_2$OH |
| 378 | SO$_2$R$_6$R$_7$ | H | CH$_3$ | CH$_3$ | H | H | CH(CH$_2$—CH$_2$CH$_3$)—CH$_2$OH |
| 379 | SO$_2$R$_6$R$_7$ | H | CH$_3$ | CH$_3$ | H | CH(CH$_3$)$_2$ | CH$_2$CH$_2$OH |
| 380 | SO$_2$R$_6$R$_7$ | H | CH$_3$ | CH$_3$ | H | H | CH—(CH$_2$OH)$_2$ |
| 381 | SO$_2$R$_6$R$_7$ | H | CH$_3$ | CH$_3$ | H | H | CH$_2$—CH(OH)—CH$_2$CH$_3$ |
| 382 | CH$_3$ | SO$_2$R$_6$R$_7$ | CH$_3$ | H | CH$_3$ | H | CH$_2$CH$_2$OH |
| 383 | CH$_3$ | SO$_2$R$_6$R$_7$ | CH$_3$ | H | CH$_3$ | CH$_2$CH$_2$OH | CH$_2$CH$_2$OH |
| 384 | CH$_3$ | SO$_2$R$_6$R$_7$ | CH$_3$ | H | CH$_3$ | H | CH$_2$CH$_2$O—CH$_2$CH$_2$OH |
| 385 | CH$_3$ | SO$_2$R$_6$R$_7$ | CH$_3$ | H | CH$_3$ | H | CH$_2$—CH(OH)—CH$_2$OH |
| 386 | CH$_3$ | SO$_2$R$_6$R$_7$ | CH$_3$ | H | CH$_3$ | CH$_2$CH—(CH$_3$)OH | CH$_2$CH—(CH$_3$)OH |
| 387 | CH$_3$ | SO$_2$R$_6$R$_7$ | CH$_3$ | H | CH$_3$ | CH$_3$ | CH$_2$CH$_2$OH |
| 388 | CH$_3$ | SO$_2$R$_6$R$_7$ | CH$_3$ | H | CH$_3$ | CH$_2$CH$_3$ | CH$_2$CH$_2$OH |
| 389 | CH$_3$ | SO$_2$R$_6$R$_7$ | CH$_3$ | H | CH$_3$ | H | CH(CH$_3$)—CH$_2$OH |
| 390 | CH$_3$ | SO$_2$R$_6$R$_7$ | CH$_3$ | H | CH$_3$ | H | CH—(CH$_2$OH)—CH$_2$CH$_3$ |
| 391 | CH$_3$ | SO$_2$R$_6$R$_7$ | CH$_3$ | H | CH$_3$ | H | CH$_2$CH$_2$SH |
| 392 | CH$_3$ | SO$_2$R$_6$R$_7$ | CH$_3$ | H | CH$_3$ | CH$_2$C$_6$H$_5$ | CH$_2$CH$_2$OH |
| 393 | CH$_3$ | SO$_2$R$_6$R$_7$ | CH$_3$ | H | CH$_3$ | CH$_2$CH$_2$—CH$_3$ | CH$_2$CH$_2$OH |
| 394 | CH$_3$ | SO$_2$R$_6$R$_7$ | CH$_3$ | H | CH$_3$ | H | CH$_2$CH—(CH$_3$)OH |
| 395 | CH$_3$ | SO$_2$R$_6$R$_7$ | CH$_3$ | H | CH$_3$ | H | CH$_2$CH$_2$—CH$_2$OH |
| 396 | CH$_3$ | SO$_2$R$_6$R$_7$ | CH$_3$ | H | CH$_3$ | H | CH$_2$CH$_2$—CH$_2$CH$_2$OH |
| 397 | CH$_3$ | SO$_2$R$_6$R$_7$ | CH$_3$ | H | CH$_3$ | H | CH(CH$_2$—CH$_2$CH$_3$)—CH$_2$OH |
| 398 | CH$_3$ | SO$_2$R$_6$R$_7$ | CH$_3$ | H | CH$_3$ | CH(CH$_3$)$_2$ | CH$_2$CH$_2$OH |
| 399 | CH$_3$ | SO$_2$R$_6$R$_7$ | CH$_3$ | H | CH$_3$ | H | CH—(CH$_2$OH)$_2$ |
| 400 | CH$_3$ | SO$_2$R$_6$R$_7$ | CH$_3$ | H | CH$_3$ | H | CH$_2$—CH(OH)—CH$_2$CH$_3$ |
| 401 | CH$_3$ | SO$_2$R$_6$R$_7$ | CH$_3$ | CH$_3$ | H | H | CH$_2$CH$_2$OH |
| 402 | CH$_3$ | SO$_2$R$_6$R$_7$ | CH$_3$ | CH$_3$ | H | CH$_2$CH$_2$OH | CH$_2$CH$_2$OH |
| 403 | CH$_3$ | SO$_2$R$_6$R$_7$ | CH$_3$ | CH$_3$ | H | H | CH$_2$CH$_2$O—CH$_2$CH$_2$OH |
| 404 | CH$_3$ | SO$_2$R$_6$R$_7$ | CH$_3$ | CH$_3$ | H | H | CH$_2$—CH(OH)—CH$_2$OH |
| 405 | CH$_3$ | SO$_2$R$_6$R$_7$ | CH$_3$ | CH$_3$ | H | CH$_2$CH—(CH$_3$)OH | CH$_2$CH—(CH$_3$)OH |
| 406 | CH$_3$ | SO$_2$R$_6$R$_7$ | CH$_3$ | CH$_3$ | H | CH$_3$ | CH$_2$CH$_2$OH |
| 407 | CH$_3$ | SO$_2$R$_6$R$_7$ | CH$_3$ | CH$_3$ | H | CH$_2$CH$_3$ | CH$_2$CH$_2$OH |
| 408 | CH$_3$ | SO$_2$R$_6$R$_7$ | CH$_3$ | CH$_3$ | H | H | CH(CH$_3$)—CH$_2$OH |
| 409 | CH$_3$ | SO$_2$R$_6$R$_7$ | CH$_3$ | CH$_3$ | H | H | CH—(CH$_2$OH)—CH$_2$CH$_3$ |
| 410 | CH$_3$ | SO$_2$R$_6$R$_7$ | CH$_3$ | CH$_3$ | H | H | CH$_2$CH$_2$SH |
| 411 | CH$_3$ | SO$_2$R$_6$R$_7$ | CH$_3$ | CH$_3$ | H | CH$_2$C$_6$H$_5$ | CH$_2$CH$_2$OH |
| 412 | CH$_3$ | SO$_2$R$_6$R$_7$ | CH$_3$ | CH$_3$ | H | CH$_2$CH$_2$—CH$_3$ | CH$_2$CH$_2$OH |
| 413 | CH$_3$ | SO$_2$R$_6$R$_7$ | CH$_3$ | CH$_3$ | H | H | CH$_2$CH$_2$—(CH$_3$)OH |
| 414 | CH$_3$ | SO$_2$R$_6$R$_7$ | CH$_3$ | CH$_3$ | H | H | CH$_2$CH$_2$—CH$_2$OH |
| 415 | CH$_3$ | SO$_2$R$_6$R$_7$ | CH$_3$ | CH$_3$ | H | H | CH$_2$CH$_2$—CH$_2$CH$_2$OH |
| 416 | CH$_3$ | SO$_2$R$_6$R$_7$ | CH$_3$ | CH$_3$ | H | H | CH(CH$_2$—CH$_2$CH$_3$)—CH$_2$OH |
| 417 | CH$_3$ | SO$_2$R$_6$R$_7$ | CH$_3$ | CH$_3$ | H | CH(CH$_3$)$_2$ | CH$_2$CH$_2$OH |
| 418 | CH$_3$ | SO$_2$R$_6$R$_7$ | CH$_3$ | CH$_3$ | H | H | CH—(CH$_2$OH)$_2$ |
| 419 | CH$_3$ | SO$_2$R$_6$R$_7$ | CH$_3$ | CH$_3$ | H | H | CH$_2$—CH(OH)—CH$_2$CH$_3$ |

-continued

Examples 7-589:

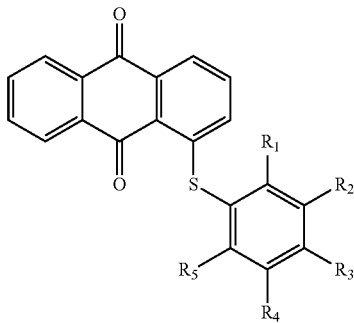

| Ex. | R₁ | R₂ | R₃ | R₄ | R₅ | R₆ | R₇ |
|---|---|---|---|---|---|---|---|
| 420 | H | CH₃ | SO₂R₆R₇ | H | OCH₃ | H | CH₂CH₂OH |
| 421 | H | CH₃ | SO₂R₆R₇ | H | OCH₃ | CH₂CH₂OH | CH₂CH₂OH |
| 422 | H | CH₃ | SO₂R₆R₇ | H | OCH₃ | H | CH₂CH₂O—CH₂CH₂OH |
| 423 | H | CH₃ | SO₂R₆R₇ | H | OCH₃ | H | CH₂—CH(OH)—CH₂OH |
| 424 | H | CH₃ | SO₂R₆R₇ | H | OCH₃ | CH₂CH—(CH₃)OH | CH₂CH—(CH₃)OH |
| 425 | H | CH₃ | SO₂R₆R₇ | H | OCH₃ | CH₃ | CH₂CH₂OH |
| 426 | H | CH₃ | SO₂R₆R₇ | H | OCH₃ | CH₂CH₃ | CH₂CH₂OH |
| 427 | H | CH₃ | SO₂R₆R₇ | H | OCH₃ | H | CH(CH₃)—CH₂OH |
| 428 | H | CH₃ | SO₂R₆R₇ | H | OCH₃ | H | CH—(CH₂OH)—CH₂CH₃ |
| 429 | H | CH₃ | SO₂R₆R₇ | H | OCH₃ | H | CH₂CH₂SH |
| 430 | H | CH₃ | SO₂R₆R₇ | H | OCH₃ | CH₂C₆H₅ | CH₂CH₂OH |
| 431 | H | CH₃ | SO₂R₆R₇ | H | OCH₃ | CH₂CH₂—CH₃ | CH₂CH₂OH |
| 432 | H | CH₃ | SO₂R₆R₇ | H | OCH₃ | H | CH₂CH—(CH₃)OH |
| 433 | H | CH₃ | SO₂R₆R₇ | H | OCH₃ | H | CH₂CH₂—CH₂OH |
| 434 | H | CH₃ | SO₂R₆R₇ | H | OCH₃ | H | CH₂CH₂—CH₂CH₂OH |
| 435 | H | CH₃ | SO₂R₆R₇ | H | OCH₃ | H | CH(CH₂—CH₂CH₃)—CH₂OH |
| 436 | H | CH₃ | SO₂R₆R₇ | H | OCH₃ | CH(CH₃)₂ | CH₂CH₂OH |
| 437 | H | CH₃ | SO₂R₆R₇ | H | OCH₃ | H | CH—(CH₂OH)₂ |
| 438 | H | CH₃ | SO₂R₆R₇ | H | OCH₃ | H | CH₂—CH(OH)—CH₂CH₃ |
| 439 | H | CH₃ | SO₂R₆R₇ | H | CH₃ | H | CH₂CH₂OH |
| 440 | H | CH₃ | SO₂R₆R₇ | H | CH₃ | CH₂CH₂OH | CH₂CH₂OH |
| 441 | H | CH₃ | SO₂R₆R₇ | H | CH₃ | H | CH₂CH₂O—CH₂CH₂OH |
| 442 | H | CH₃ | SO₂R₆R₇ | H | CH₃ | H | CH₂—CH(OH)—CH₂OH |
| 443 | H | CH₃ | SO₂R₆R₇ | H | CH₃ | CH₂CH—(CH₃)OH | CH₂CH—(CH₃)OH |
| 444 | H | CH₃ | SO₂R₆R₇ | H | CH₃ | CH₃ | CH₂CH₂OH |
| 445 | H | CH₃ | SO₂R₆R₇ | H | CH₃ | CH₂CH₃ | CH₂CH₂OH |
| 446 | H | CH₃ | SO₂R₆R₇ | H | CH₃ | H | CH(CH₃)—CH₂OH |
| 447 | H | CH₃ | SO₂R₆R₇ | H | CH₃ | H | CH—(CH₂OH)—CH₂CH₃ |
| 448 | H | CH₃ | SO₂R₆R₇ | H | CH₃ | H | CH₂CH₂SH |
| 449 | H | CH₃ | SO₂R₆R₇ | H | CH₃ | CH₂C₆H₅ | CH₂CH₂OH |
| 450 | H | CH₃ | SO₂R₆R₇ | H | CH₃ | CH₂CH₂—CH₃ | CH₂CH₂OH |
| 451 | H | CH₃ | SO₂R₆R₇ | H | CH₃ | H | CH₂CH—(CH₃)OH |
| 452 | H | CH₃ | SO₂R₆R₇ | H | CH₃ | H | CH₂CH₂—CH₂OH |
| 453 | H | CH₃ | SO₂R₆R₇ | H | CH₃ | H | CH₂CH₂—CH₂CH₂OH |
| 454 | H | CH₃ | SO₂R₆R₇ | H | CH₃ | H | CH(CH₂—CH₂CH₃)—CH₂OH |
| 455 | H | CH₃ | SO₂R₆R₇ | H | CH₃ | CH(CH₃)₂ | CH₂CH₂OH |
| 456 | H | CH₃ | SO₂R₆R₇ | H | CH₃ | H | CH—(CH₂OH)₂ |
| 457 | H | CH₃ | SO₂R₆R₇ | H | CH₃ | H | CH₂—CH(OH)—CH₂CH₃ |
| 458 | CH₃ | H | SO₂R₆R₇ | H | t-C₄H₉ | H | CH₂CH₂OH |
| 459 | CH₃ | H | SO₂R₆R₇ | H | t-C₄H₉ | CH₂CH₂OH | CH₂CH₂OH |
| 460 | CH₃ | H | SO₂R₆R₇ | H | t-C₄H₉ | H | CH₂CH₂O—CH₂CH₂OH |
| 461 | CH₃ | H | SO₂R₆R₇ | H | t-C₄H₉ | H | CH₂—CH(OH)—CH₂OH |
| 462 | CH₃ | H | SO₂R₆R₇ | H | t-C₄H₉ | CH₂CH—(CH₃)OH | CH₂CH—(CH₃)OH |
| 463 | CH₃ | H | SO₂R₆R₇ | H | t-C₄H₉ | CH₃ | CH₂CH₂OH |
| 464 | CH₃ | H | SO₂R₆R₇ | H | t-C₄H₉ | CH₂CH₃ | CH₂CH₂OH |
| 465 | CH₃ | H | SO₂R₆R₇ | H | t-C₄H₉ | H | CH(CH₃)—CH₂OH |
| 466 | CH₃ | H | SO₂R₆R₇ | H | t-C₄H₉ | H | CH—(CH₂OH)—CH₂CH₃ |
| 467 | CH₃ | H | SO₂R₆R₇ | H | t-C₄H₉ | H | CH₂CH₂SH |
| 468 | CH₃ | H | SO₂R₆R₇ | H | t-C₄H₉ | CH₂C₆H₅ | CH₂CH₂OH |
| 469 | CH₃ | H | SO₂R₆R₇ | H | t-C₄H₉ | CH₂CH₂—CH₃ | CH₂CH₂OH |
| 470 | CH₃ | H | SO₂R₆R₇ | H | t-C₄H₉ | H | CH₂CH—(CH₃)OH |
| 471 | CH₃ | H | SO₂R₆R₇ | H | t-C₄H₉ | H | CH₂CH₂—CH₂OH |
| 472 | CH₃ | H | SO₂R₆R₇ | H | t-C₄H₉ | H | CH₂CH₂—CH₂CH₂OH |
| 473 | CH₃ | H | SO₂R₆R₇ | H | t-C₄H₉ | H | CH(CH₂—CH₂CH₃)—CH₂OH |
| 474 | CH₃ | H | SO₂R₆R₇ | H | t-C₄H₉ | CH(CH₃)₂ | CH₂CH₂OH |
| 475 | CH₃ | H | SO₂R₆R₇ | H | t-C₄H₉ | H | CH—(CH₂OH)₂ |
| 476 | CH₃ | H | SO₂R₆R₇ | H | t-C₄H₉ | H | CH₂—CH(OH)—CH₂CH₃ |
| 477 | SO₂R₆R₇ | H | OCH₃ | H | OCH₃ | H | CH₂CH₂OH |
| 478 | SO₂R₆R₇ | H | OCH₃ | H | OCH₃ | CH₂CH₂OH | CH₂CH₂OH |

-continued

Examples 7-589:

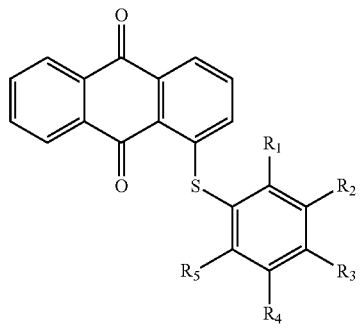

| Ex. | R₁ | R₂ | R₃ | R₄ | R₅ | R₆ | R₇ |
|---|---|---|---|---|---|---|---|
| 479 | SO₂R₆R₇ | H | OCH₃ | H | OCH₃ | H | CH₂CH₂O—CH₂CH₂OH |
| 480 | SO₂R₆R₇ | H | OCH₃ | H | OCH₃ | H | CH₂—CH(OH)—CH₂OH |
| 481 | SO₂R₆R₇ | H | OCH₃ | H | OCH₃ | CH₂CH—(CH₃)OH | CH₂CH—(CH₃)OH |
| 482 | SO₂R₆R₇ | H | OCH₃ | H | OCH₃ | CH₃ | CH₂CH₂OH |
| 483 | SO₂R₆R₇ | H | OCH₃ | H | OCH₃ | CH₂CH₃ | CH₂CH₂OH |
| 484 | SO₂R₆R₇ | H | OCH₃ | H | OCH₃ | H | CH(CH₃)—CH₂OH |
| 485 | SO₂R₆R₇ | H | OCH₃ | H | OCH₃ | H | CH—(CH₂OH)—CH₂CH₃ |
| 486 | SO₂R₆R₇ | H | OCH₃ | H | OCH₃ | H | CH₂CH₂SH |
| 487 | SO₂R₆R₇ | H | OCH₃ | H | OCH₃ | CH₂C₆H₅ | CH₂CH₂OH |
| 488 | SO₂R₆R₇ | H | OCH₃ | H | OCH₃ | CH₂CH₂—CH₃ | CH₂CH₂OH |
| 489 | SO₂R₆R₇ | H | OCH₃ | H | OCH₃ | H | CH₂CH—(CH₃)OH |
| 490 | SO₂R₆R₇ | H | OCH₃ | H | OCH₃ | H | CH₂CH₂—CH₂OH |
| 491 | SO₂R₆R₇ | H | OCH₃ | H | OCH₃ | H | CH₂CH₂—CH₂CH₂OH |
| 492 | SO₂R₆R₇ | H | OCH₃ | H | OCH₃ | H | CH(CH₂—CH₂CH₃)—CH₂OH |
| 493 | SO₂R₆R₇ | H | OCH₃ | H | OCH₃ | CH(CH₃)₂ | CH₂CH₂OH |
| 494 | SO₂R₆R₇ | H | OCH₃ | H | OCH₃ | H | CH—(CH₂OH)₂ |
| 495 | SO₂R₆R₇ | H | OCH₃ | H | OCH₃ | H | CH₂—CH(OH)—CH₂CH₃ |
| 496 | SO₂R₆R₇ | CH₃ | OCH₃ | CH₃ | H | H | CH₂CH₂OH |
| 497 | SO₂R₆R₇ | CH₃ | OCH₃ | CH₃ | H | CH₂CH₂OH | CH₂CH₂OH |
| 498 | SO₂R₆R₇ | CH₃ | OCH₃ | CH₃ | H | H | CH₂CH₂O—CH₂CH₂OH |
| 499 | SO₂R₆R₇ | CH₃ | OCH₃ | CH₃ | H | H | CH₂—CH(OH)—CH₂OH |
| 500 | SO₂R₆R₇ | CH₃ | OCH₃ | CH₃ | H | CH₂CH—(CH₃)OH | CH₂CH—(CH₃)OH |
| 501 | SO₂R₆R₇ | CH₃ | OCH₃ | CH₃ | H | CH₃ | CH₂CH₂OH |
| 502 | SO₂R₆R₇ | CH₃ | OCH₃ | CH₃ | H | CH₂CH₃ | CH₂CH₂OH |
| 503 | SO₂R₆R₇ | CH₃ | OCH₃ | CH₃ | H | H | CH(CH₃)—CH₂OH |
| 504 | SO₂R₆R₇ | CH₃ | OCH₃ | CH₃ | H | H | CH—(CH₂OH)—CH₂CH₃ |
| 505 | SO₂R₆R₇ | CH₃ | OCH₃ | CH₃ | H | H | CH₂CH₂SH |
| 506 | SO₂R₆R₇ | CH₃ | OCH₃ | CH₃ | H | CH₂C₆H₅ | CH₂CH₂OH |
| 507 | SO₂R₆R₇ | CH₃ | OCH₃ | CH₃ | H | CH₂CH₂—CH₃ | CH₂CH₂OH |
| 508 | SO₂R₆R₇ | CH₃ | OCH₃ | CH₃ | H | H | CH₂CH—(CH₃)OH |
| 509 | SO₂R₆R₇ | CH₃ | OCH₃ | CH₃ | H | H | CH₂CH₂—CH₂OH |
| 510 | SO₂R₆R₇ | CH₃ | OCH₃ | CH₃ | H | H | CH₂CH₂—CH₂CH₂OH |
| 511 | SO₂R₆R₇ | CH₃ | OCH₃ | CH₃ | H | H | CH(CH₂—CH₂CH₃)—CH₂OH |
| 512 | SO₂R₆R₇ | CH₃ | OCH₃ | CH₃ | H | CH(CH₃)₂ | CH₂CH₂OH |
| 513 | SO₂R₆R₇ | CH₃ | OCH₃ | CH₃ | H | H | CH—(CH₂OH)₂ |
| 514 | SO₂R₆R₇ | CH₃ | OCH₃ | CH₃ | H | H | CH₂—CH(OH)—CH₂CH₃ |
| 515 | SO₂R₆R₇ | H | ⟨-C₆H₄-CH₃⟩ | H | H | H | CH₂CH₂OH |
| 516 | SO₂R₆R₇ | H | ⟨-C₆H₄-CH₃⟩ | H | H | CH₂CH₂OH | CH₂CH₂OH |
| 517 | SO₂R₆R₇ | H | ⟨-C₆H₄-CH₃⟩ | H | H | H | CH₂CH₂O—CH₂CH₂OH |
| 518 | SO₂R₆R₇ | H | ⟨-C₆H₄-CH₃⟩ | H | H | H | CH₂—CH(OH)—CH₂OH |

-continued

Examples 7-589:

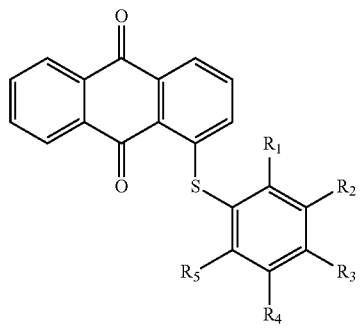

| Ex. | R<sub>1</sub> | R<sub>2</sub> | R<sub>3</sub> | R<sub>4</sub> | R<sub>5</sub> | R<sub>6</sub> | R<sub>7</sub> |
|---|---|---|---|---|---|---|---|
| 519 | $SO_2R_6R_7$ | H | ----C$_6$H$_4$-CH$_3$ | H | H | $CH_2CH-(CH_3)OH$ | $CH_2CH-(CH_3)OH$ |
| 520 | $SO_2R_6R_7$ | H | ----C$_6$H$_4$-CH$_3$ | H | H | $CH_3$ | $CH_2CH_2OH$ |
| 521 | $SO_2R_6R_7$ | H | ----C$_6$H$_4$-CH$_3$ | H | H | $CH_2CH_3$ | $CH_2CH_2OH$ |
| 522 | $SO_2R_6R_7$ | H | ----C$_6$H$_4$-CH$_3$ | H | H | H | $CH(CH_3)-CH_2OH$ |
| 523 | $SO_2R_6R_7$ | H | ----C$_6$H$_4$-CH$_3$ | H | H | H | $CH-(CH_2OH)-CH_2CH_3$ |
| 524 | $SO_2R_6R_7$ | H | ----C$_6$H$_4$-CH$_3$ | H | H | H | $CH_2CH_2SH$ |
| 525 | $SO_2R_6R_7$ | H | ----C$_6$H$_4$-CH$_3$ | H | H | $CH_2C_6H_5$ | $CH_2CH_2OH$ |
| 526 | $SO_2R_6R_7$ | H | ----C$_6$H$_4$-CH$_3$ | H | H | $CH_2CH_2-CH_3$ | $CH_2CH_2OH$ |
| 527 | $SO_2R_6R_7$ | H | ----C$_6$H$_4$-CH$_3$ | H | H | H | $CH_2CH-(CH_3)OH$ |
| 528 | $SO_2R_6R_7$ | H | ----C$_6$H$_4$-CH$_3$ | H | H | H | $CH_2CH_2-CH_2OH$ |
| 529 | $SO_2R_6R_7$ | H | ----C$_6$H$_4$-CH$_3$ | H | H | H | $CH_2CH_2-CH_2CH_2OH$ |
| 530 | $SO_2R_6R_7$ | H | ----C$_6$H$_4$-CH$_3$ | H | H | H | $CH(CH_2-CH_2CH_3)-CH_2OH$ |

-continued

Examples 7-589:

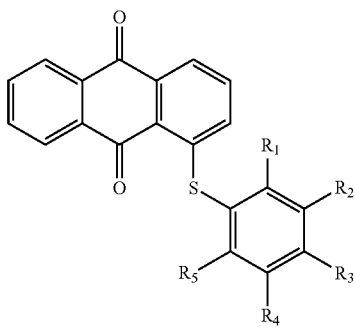

| Ex. | R₁ | R₂ | R₃ | R₄ | R₅ | R₆ | R₇ |
|---|---|---|---|---|---|---|---|
| 531 | SO₂R₆R₇ | H | -C₆H₄-CH₃ (para) | H | H | CH(CH₃)₂ | CH₂CH₂OH |
| 532 | SO₂R₆R₇ | H | -C₆H₄-CH₃ (para) | H | H | H | CH—(CH₂OH)₂ |
| 533 | SO₂R₆R₇ | H | -C₆H₄-CH₃ (para) | H | H | H | CH₂—CH(OH)—CH₂CH₃ |
| 534 | SO₂R₆R₇ | H | -C₆H₄-CH₃ (meta) | H | H | H | CH₂CH₂OH |
| 535 | SO₂R₆R₇ | H | -C₆H₄-CH₃ (meta) | H | H | CH₂CH₂OH | CH₂CH₂OH |
| 536 | SO₂R₆R₇ | H | -C₆H₄-CH₃ (meta) | H | H | H | CH₂CH₂O—CH₂CH₂OH |
| 537 | SO₂R₆R₇ | H | -C₆H₄-CH₃ (meta) | H | H | H | CH₂—CH(OH)—CH₂OH |
| 538 | SO₂R₆R₇ | H | -C₆H₄-CH₃ (meta) | H | H | CH₂CH—(CH₃)OH | CH₂CH—(CH₃)OH |
| 539 | SO₂R₆R₇ | H | -C₆H₄-CH₃ (meta) | H | H | CH₃ | CH₂CH₂OH |

Examples 7-589:
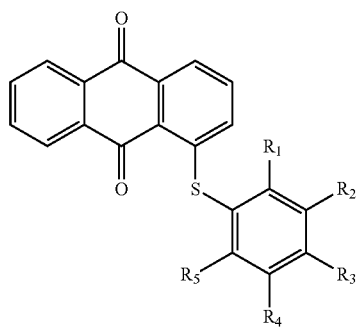
| Ex. | R₁ | R₂ | R₃ | R₄ | R₅ | R₆ | R₇ |
|---|---|---|---|---|---|---|---|
| 540 | SO₂R₆R₇ | H | 3-CH₃-C₆H₄- | H | H | CH₂CH₃ | CH₂CH₂OH |
| 541 | SO₂R₆R₇ | H | 3-CH₃-C₆H₄- | H | H | H | CH(CH₃)—CH₂OH |
| 542 | SO₂R₆R₇ | H | 3-CH₃-C₆H₄- | H | H | H | CH—(CH₂OH)—CH₂CH₃ |
| 543 | SO₂R₆R₇ | H | 3-CH₃-C₆H₄- | H | H | H | CH₂CH₂SH |
| 544 | SO₂R₆R₇ | H | 3-CH₃-C₆H₄- | H | H | CH₂C₆H₅ | CH₂CH₂OH |
| 545 | SO₂R₆R₇ | H | 3-CH₃-C₆H₄- | H | H | CH₂CH₂—CH₃ | CH₂CH₂OH |
| 546 | SO₂R₆R₇ | H | 3-CH₃-C₆H₄- | H | H | H | CH₂CH—(CH₃)OH |
| 547 | SO₂R₆R₇ | H | 3-CH₃-C₆H₄- | H | H | H | CH₂CH₂—CH₂OH |

Examples 7-589:

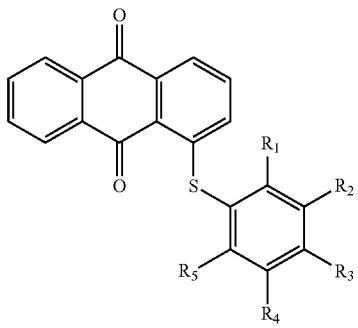

| Ex. | R₁ | R₂ | R₃ | R₄ | R₅ | R₆ | R₇ |
|---|---|---|---|---|---|---|---|
| 548 | SO$_2$R$_6$R$_7$ | H | 3-CH$_3$-C$_6$H$_4$ | H | H | H | CH$_2$CH$_2$—CH$_2$CH$_2$OH |
| 549 | SO$_2$R$_6$R$_7$ | H | 3-CH$_3$-C$_6$H$_4$ | H | H | H | CH(CH$_2$—CH$_2$CH$_3$)—CH$_2$OH |
| 550 | SO$_2$R$_6$R$_7$ | H | 3-CH$_3$-C$_6$H$_4$ | H | H | CH(CH$_3$)$_2$ | CH$_2$CH$_2$OH |
| 551 | SO$_2$R$_6$R$_7$ | H | 3-CH$_3$-C$_6$H$_4$ | H | H | H | CH—(CH$_2$OH)$_2$ |
| 552 | SO$_2$R$_6$R$_7$ | H | 3-CH$_3$-C$_6$H$_4$ | H | H | H | CH$_2$—CH(OH)—CH$_2$CH$_3$ |
| 553 | CH$_3$ | CH$_3$ | SO$_2$R$_6$R$_7$ | CH$_3$ | CH$_3$ | H | CH$_2$CH$_2$OH |
| 554 | CH$_3$ | CH$_3$ | SO$_2$R$_6$R$_7$ | CH$_3$ | CH$_3$ | CH$_2$CH$_2$OH | CH$_2$CH$_2$OH |
| 555 | CH$_3$ | CH$_3$ | SO$_2$R$_6$R$_7$ | CH$_3$ | CH$_3$ | H | CH$_2$CH$_2$O—CH$_2$CH$_2$OH |
| 556 | CH$_3$ | CH$_3$ | SO$_2$R$_6$R$_7$ | CH$_3$ | CH$_3$ | H | CH$_2$—CH(OH)—CH$_2$OH |
| 557 | CH$_3$ | CH$_3$ | SO$_2$R$_6$R$_7$ | CH$_3$ | CH$_3$ | CH$_2$CH—(CH$_3$)OH | CH$_2$CH—(CH$_3$)OH |
| 558 | CH$_3$ | CH$_3$ | SO$_2$R$_6$R$_7$ | CH$_3$ | CH$_3$ | CH$_3$ | CH$_2$CH$_2$OH |
| 559 | CH$_3$ | CH$_3$ | SO$_2$R$_6$R$_7$ | CH$_3$ | CH$_3$ | CH$_2$CH$_3$ | CH$_2$CH$_2$OH |
| 560 | CH$_3$ | CH$_3$ | SO$_2$R$_6$R$_7$ | CH$_3$ | CH$_3$ | H | CH(CH$_3$)—CH$_2$OH |
| 561 | CH$_3$ | CH$_3$ | SO$_2$R$_6$R$_7$ | CH$_3$ | CH$_3$ | H | CH—(CH$_2$OH)—CH$_2$CH$_3$ |
| 562 | CH$_3$ | CH$_3$ | SO$_2$R$_6$R$_7$ | CH$_3$ | CH$_3$ | H | CH$_2$CH$_2$SH |
| 563 | CH$_3$ | CH$_3$ | SO$_2$R$_6$R$_7$ | CH$_3$ | CH$_3$ | CH$_2$C$_6$H$_5$ | CH$_2$CH$_2$OH |
| 564 | CH$_3$ | CH$_3$ | SO$_2$R$_6$R$_7$ | CH$_3$ | CH$_3$ | CH$_2$CH$_2$—CH$_3$ | CH$_2$CH$_2$OH |
| 565 | CH$_3$ | CH$_3$ | SO$_2$R$_6$R$_7$ | CH$_3$ | CH$_3$ | H | CH$_2$CH—(CH$_3$)OH |
| 566 | CH$_3$ | CH$_3$ | SO$_2$R$_6$R$_7$ | CH$_3$ | CH$_3$ | H | CH$_2$CH$_2$—CH$_2$OH |
| 567 | CH$_3$ | CH$_3$ | SO$_2$R$_6$R$_7$ | CH$_3$ | CH$_3$ | H | CH$_2$CH$_2$—CH$_2$CH$_2$OH |
| 568 | CH$_3$ | CH$_3$ | SO$_2$R$_6$R$_7$ | CH$_3$ | CH$_3$ | H | CH(CH$_2$—CH$_2$CH$_3$)—CH$_2$OH |
| 569 | CH$_3$ | CH$_3$ | SO$_2$R$_6$R$_7$ | CH$_3$ | CH$_3$ | CH(CH$_3$)$_2$ | CH$_2$CH$_2$OH |
| 570 | CH$_3$ | CH$_3$ | SO$_2$R$_6$R$_7$ | CH$_3$ | CH$_3$ | H | CH—(CH$_2$OH)$_2$ |
| 571 | CH$_3$ | CH$_3$ | SO$_2$R$_6$R$_7$ | CH$_3$ | CH$_3$ | H | CH$_2$—CH(OH)—CH$_2$CH$_3$ |

Examples 7-589:

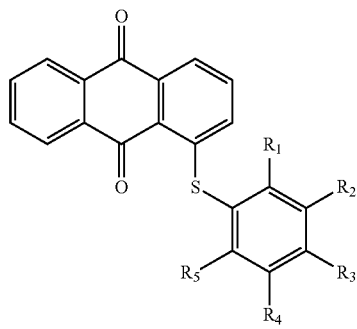

| Ex. | R₁ | R₂ | R₃ | R₄ | R₅ | R₆ | R₇ |
|---|---|---|---|---|---|---|---|
| 572 | $SO_2R_6R_7$ | H | 3,4-dimethylphenyl | H | H | H | $CH_2CH_2OH$ |
| 573 | $SO_2R_6R_7$ | H | 3,4-dimethylphenyl | H | H | $CH_2CH_2OH$ | $CH_2CH_2OH$ |
| 574 | $SO_2R_6R_7$ | H | 3,4-dimethylphenyl | H | H | H | $CH_2CH_2O-CH_2CH_2OH$ |
| 575 | $SO_2R_6R_7$ | H | 3,4-dimethylphenyl | H | H | H | $CH_2-CH(OH)-CH_2OH$ |
| 576 | $SO_2R_6R_7$ | H | 3,4-dimethylphenyl | H | H | $CH_2CH-(CH_3)OH$ | $CH_2CH-(CH_3)OH$ |
| 577 | $SO_2R_6R_7$ | H | 3,4-dimethylphenyl | H | H | $CH_3$ | $CH_2CH_2OH$ |
| 578 | $SO_2R_6R_7$ | H | 3,4-dimethylphenyl | H | H | $CH_2CH_3$ | $CH_2CH_2OH$ |
| 579 | $SO_2R_6R_7$ | H | 3,4-dimethylphenyl | H | H | H | $CH(CH_3)-CH_2OH$ |

Examples 7-589:

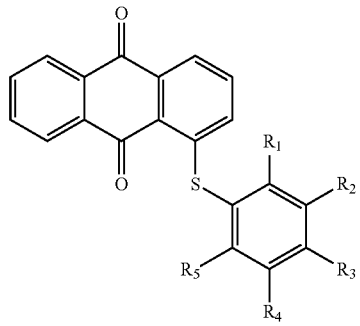

| Ex. | R$_1$ | R$_2$ | R$_3$ | R$_4$ | R$_5$ | R$_6$ | R$_7$ |
|---|---|---|---|---|---|---|---|
| 580 | SO$_2$R$_6$R$_7$ | H | ![3,4-dimethylphenyl] | H | H | H | CH—(CH$_2$OH)—CH$_2$CH$_3$ |
| 581 | SO$_2$R$_6$R$_7$ | H | ![3,4-dimethylphenyl] | H | H | H | CH$_2$CH$_2$SH |
| 582 | SO$_2$R$_6$R$_7$ | H | ![3,4-dimethylphenyl] | H | H | CH$_2$C$_6$H$_5$ | CH$_2$CH$_2$OH |
| 583 | SO$_2$R$_6$R$_7$ | H | ![3,4-dimethylphenyl] | H | H | CH$_2$CH$_2$—CH$_3$ | CH$_2$CH$_2$OH |
| 584 | SO$_2$R$_6$R$_7$ | H | ![3,4-dimethylphenyl] | H | H | H | CH$_2$CH—(CH$_3$)OH |
| 585 | SO$_2$R$_6$R$_7$ | H | ![3,4-dimethylphenyl] | H | H | H | CH$_2$CH$_2$—CH$_2$OH |
| 586 | SO$_2$R$_6$R$_7$ | H | ![3,4-dimethylphenyl] | H | H | H | CH$_2$CH$_2$—CH$_2$CH$_2$OH |
| 587 | SO$_2$R$_6$R$_7$ | H | ![3,4-dimethylphenyl] | H | H | H | CH(CH$_2$—CH$_2$CH$_3$)—CH$_2$OH |

-continued

Examples 7-589:

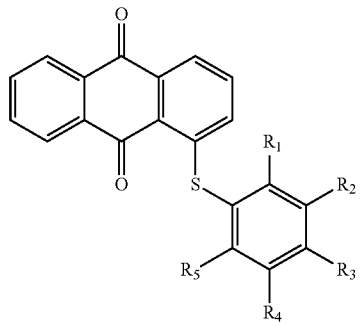

| Ex. | R₁ | R₂ | R₃ | R₄ | R₅ | R₆ | R₇ |
|-----|-----|-----|-----|-----|-----|-----|-----|
| 588 | SO$_2$R$_6$R$_7$ | H | 2,3-dimethylphenyl | H | H | CH(CH$_3$)$_2$ | CH$_2$CH$_2$OH |
| 589 | SO$_2$R$_6$R$_7$ | H | 2,3-dimethylphenyl | H | H | H | CH—(CH$_2$OH)$_2$ |

EXAMPLES 590-594

General Procedure

A formulation containing a colourant, an acrylic acid/acrylate polymeric resin binder, an organic solvent, a photoinitiator, a polymerisable monomer and optionally a dispersant is homogenized by stirring and filtered over a 0.45 μm Teflon® filter. Spin coating of this formulation is performed on 52 mm×76 mm glass plates at various spinning speeds in order to achieve various layer thicknesses. Soft bake at 80-100° C. for 2 minutes affords the required thin transparent layer. UV exposure through a mask for 30 seconds followed by basic aqueous development and final post bake for 5 minutes at 200° C. results in a structured pattern. Patterning is realised by irradiation through a mask enabling resolution ranging from 100 μm to 1 μm. The irradiation bandwidth of the UV lamp ranges from 300 nm to 410 nm with an energy intensity of 1.4 mW/cm². The developing bath is an aqueous basic developer prepared from commercial JSR 4625™ in 2% concentration.

EXAMPLES 590-594

The compounds of examples 2, 3, 4, 5 and 6 are tested according to above general procedure, using following liquid formulation (liq):
- 1.92 parts Disperbyk® 161 (cationic polyurethane, dispersing agent)
- 9 parts acrylic acid/acrylate resin binder
- 12.5 parts N-methylpyrrolidone (NMP)
- 2.3 parts Sartomer® 399 (dipentaerytritol pentaacrylate)
- 0.08 parts 2,4-bis(trichloromethyl)-6-(4-methoxyphenyl)-1,3,5-triazine The results in the below table correspond to the baked layer (5 minutes @ 200° C.). The contrast is measured on a TSUB-OSAKA ELECTRIC apparatus.

| example | colourant ex. | colourant [g] | (liq) [g] | speed [rpm] | x | y | Y | contrast | thickness [μm] |
|---------|---------------|---------------|-----------|-------------|-----|-----|-----|----------|---------------|
| 590 | 2 | 0.55 | 5.10 | 1000 | 0.397 | 0.460 | 93.88 | 4001 | 2.58 |
|     |   |      |      | 500  | 0.425 | 0.495 | 91.04 | 3990 | 4.84 |
| 591 | 3 | 0.41 | 4.11 | 1000 | 0.415 | 0.473 | 98.79 |      | 2.78 |
|     |   |      |      | 500  | 0.432 | 0.498 | 95.64 |      | 4.42 |
| 592 | 4 | 0.41 | 4.12 | 1000 | 0.412 | 0.469 | 97.57 |      | 2.67 |
|     |   |      |      | 500  | 0.429 | 0.495 | 95.97 |      | 5.20 |
| 593 | 5 | 0.41 | 4.11 | 1000 | 0.426 | 0.487 | 96.64 |      | 2.68 |
|     |   |      |      | 500  | 0.433 | 0.498 | 94.21 |      | 5.62 |
| 594 | 6 | 0.41 | 4.11 | 1000 | 0.399 | 0.450 | 99.36 |      | 2.67 |
|     |   |      |      | 500  | 0.429 | 0.495 | 96.21 |      | 0.485 |

EXAMPLES 595-599

It is proceeded as in examples 590-594, with the difference that a similar layer comprising C. I. Pigment Green 36 is first coated on the glass plate, on top of which the layers comprising the compounds of examples 2, 3, 4, 5 and 6 are coated after baking of the first green layer.

EXAMPLE 600

It is proceeded as in examples 595-599, with the difference that a layer comprising the compounds of example 1 is coated onto the layer comprising C. I. Pigment Green 36.

EXAMPLES 601-606

It is proceeded as in examples 595-600, with the difference that C. I. Pigment Green 7 is used instead of C. I. Pigment Green 36.

The invention claimed is:

1. A colourant composition comprising in a weight ratio of from 99:1 to 10:90, a pigment of average particle size from 10 to 200 nm and a compound of the formula

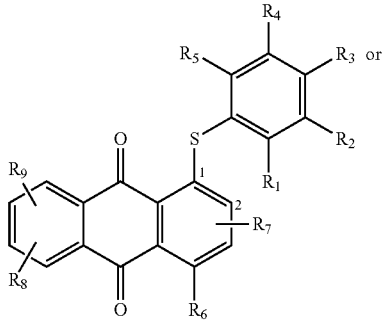

(I)

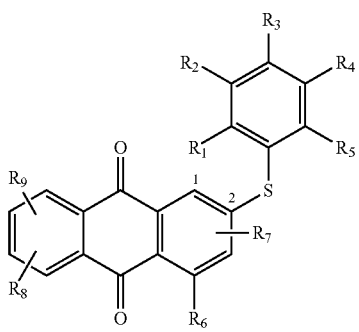

(II)

wherein $R_1$, $R_2$, $R_3$, $R_4$, $R_5$, $R_6$, $R_7$, $R_8$ and $R_9$ are, each independently of all others, H, Br, Cl, F, $SOR_{10}$, $SO_2R_{10}$, $SO_3R_{10}$, $SO_2NR_{11}R_{12}$, $NO_2$, CN, $COR_{10}$, $COOR_{10}$ or $CONR_{11}R_{12}$; $C_1$-$C_{12}$alkyl, $C_3$-$C_{12}$cycloalkyl, $C_2$-$C_{12}$alkenyl, $C_3$-$C_{12}$cycloalkenyl or $C_2$-$C_{12}$alkynyl, each of which is unsubstituted or substituted one or several times by Cl, F, OH, $OR_{10}$, $SR_{10}$, $SOR_{10}$, $SO_2R_{10}$, $NR_{11}R_{12}$, CN, $COR_{10}$, $COOR_{10}$ or $CONR_{11}R_{12}$; $C_7$-$C_{12}$aralkyl or $C_6$-$C_{12}$aryl, each of which is unsubstituted or substituted one or several times by $SO_3R_{10}$, $SO_2NR_{11}R_{12}$, $NO_2$, Br, Cl, F, OH, $OR_{10}$, $SR_{10}$, $SOR_{10}$, $SO_2R_{10}$, $NR_{11}R_{12}$, CN, $COR_{10}$, $COOR_{10}$ or $CONR_{11}R_{12}$;

or any of $R_1$, $R_2$, $R_3$, $R_4$ and $R_5$ is, each independently of all others, OH, $OR_{10}$, $SR_{10}$, $SOR_{10}$, $SO_2R_{10}$, or $NR_{11}R_{12}$;

or $R_4$ is together with $R_3$ or with $R_5$ 1,3-propylen, 1,3-propenylen, 1,4-butylen, 1,4-buten(1)ylen or 1,4-buten(2)ylen, each of which is unsubstituted or substituted one or several times by Cl, F, OH, $OR_{10}$, $SR_{10}$, $SOR_{10}$, $SO_2R_{10}$, $NR_{11}R_{12}$, CN, $COR_{10}$, $COOR_{10}$ or $CONR_{11}R_{12}$, or 1,4-butadienylen which is unsubstituted or substituted one or several times by $SO_3R_{10}$, $SO_2NR_{11}R_{12}$, $NO_2$, Br, Cl, F, OH, $OR_{10}$, $SR_{10}$, $SOR_{10}$, $SO_2R_{10}$, $NR_{11}R_{12}$, CN, $COR_{10}$, $COOR_{10}$ or $CONR_{11}R_{12}$;

or $R_6$ is a radical of formula

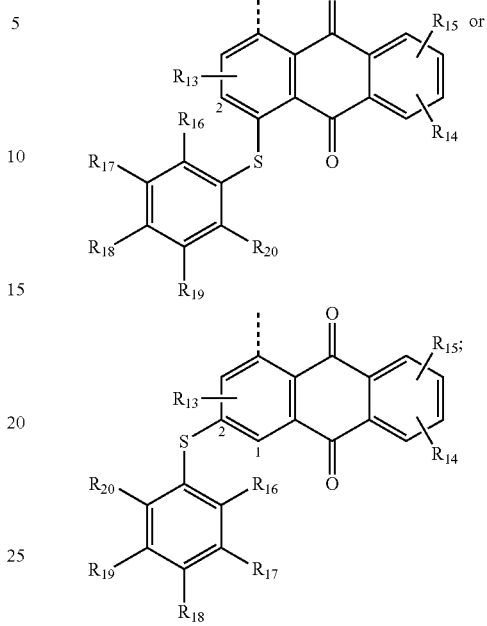

or $R_7$ is a direct bond from C in position 1 or 2 of the anthraquinone substructure to $R_1$;

$R_{10}$ is $[C_2$-$C_6$alkylene-O$]_nC_1$-$C_{12}$alkyl, $[C_2$-$C_6$alkylene-NH$]_nC_1$-$C_{12}$alkyl, $C_1$-$C_{12}$alkyl, $C_3$-$C_{12}$cycloalkyl, $C_2$-$C_{12}$alkenyl, $C_3$-$C_{12}$cycloalkenyl or $C_2$-$C_{12}$alkynyl, each of which is unsubstituted or substituted one or several times by Cl, F, $OR_{21}$, $NR_{22}R_{23}$, CN, $COR_{21}$, $COOR_{21}$ or $CONR_{22}R_{23}$; $C_7$-$C_{12}$aralkyl or $C_6$-$C_{12}$aryl, each of which is unsubstituted or substituted one or several times by $NO_2$, $SOR_{21}$, $SO_2R_{21}$, $SO_3R_{21}$, $SO_2NR_{22}R_{23}$, Br, Cl, F, $OR_{21}$, $SR_{21}$, $NR_{22}R_{23}$, CN, $COR_{21}$, $COOR_{21}$ or $CONR_{22}R_{23}$;

$R_{11}$ and $R_{12}$ are independently from one another H, $[C_2$-$C_6$alkylene-O$]_nC_1$-$C_{12}$alkyl, $[C_2$-$C_6$alkylene-NH$]_nC_1$-$C_{12}$alkyl, $C_1$-$C_{12}$alkyl, $C_3$-$C_{12}$cycloalkyl, $C_2$-$C_{12}$alkenyl, $C_3$-$C_{12}$cycloalkenyl or $C_2$-$C_{12}$alkynyl, each of which is unsubstituted or substituted one or several times by Cl, F, $OR_{21}$, $NR_{22}R_{23}$, CN, $COR_{21}$, $COOR_{21}$ or $CONR_{22}R_{23}$; $C_7$-$C_{12}$aralkyl or $C_6$-$C_{12}$aryl, each of which is unsubstituted or substituted one or several times by $NO_2$, $SOR_{21}$, $SO_2R_{21}$, $SO_3R_{21}$, $SO_2NR_{22}R_{23}$, Br, Cl, F, $OR_{21}$, $SR_{21}$, $NR_{22}R_{23}$, CN, $COR_{21}$, $COOR_{21}$ or $CONR_{22}R_{23}$; or $NR_{11}R_{12}$ is a 5-, 6- or 7-membered, saturated, unsaturated or aromatic, heterocyclic N-radical comprising C, N, O and/or S atoms, which heterocyclic N-radical may optionally be annellated with a cyclohexane, cyclohexene or benzene ring and is unsubstituted or substituted one or several times by oxo, hydroxy, $C_1$-$C_{12}$alkoxy, thiono and/or $R_{10}$, two or more $R_{10}$ being identical or different from each other, and which annellated benzene ring is unsubstituted or substituted by $NO_2$, $SOR_{21}$, $SO_2R_{21}$, $SO_3R_{21}$, $SO_2NR_{22}R_{23}$, Br, Cl, F, $OR_{21}$, $NR_{22}R_{23}$, CN, $COR_{21}$, $COOR_{21}$ or $CONR_{22}R_{23}$;

$R_{13}$, $R_{14}$ and $R_{15}$ have independently from $R_7$, $R_8$ and $R_9$ the same definition as $R_7$, $R_8$ and $R_9$, or $R_{13}$ is a direct bond from C in position 1 or 2 of the anthraquinone substructure to $R_{16}$;

$R_{16}$, $R_{17}$, $R_{18}$, $R_{19}$ and $R_{20}$ have independently from $R_1$, $R_2$, $R_3$, $R_4$ and $R_5$ the same definition as $R_1$, $R_2$, $R_3$, $R_4$ and $R_5$, $R_{21}$, $R_{22}$ and $R_{23}$ are independently of one another H; [$C_2$-$C_6$alkylene-O]$_n$$C_1$-$C_{12}$alkyl, [$C_2$-$C_6$alkylene-NH]$_n$ $C_1$-$C_{12}$alkyl or $C_1$-$C_{12}$alkyl which is unsubstituted or substituted one or several times by F, oxo, OH, O$C_1$-$C_6$alkyl, NH$_2$, NH$C_1$-$C_6$alkyl, N($C_1$-$C_6$alkyl)$_2$, COOH, COO$C_1$-$C_6$alkyl, CONH$C_1$-$C_6$alkyl, CON($C_1$-$C_6$alkyl)$_2$ or CN; and n is an integer 1, 2, 3, 4 or 5.

2. A colourant composition according to claim 1, wherein one or two of $R_1$, $R_2$ and $R_3$ are H, and $R_4$ and $R_5$ are both H; one of $R_1$, $R_2$ and $R_3$ is SO$R_{10}$, SO$_2$$R_{10}$, SO$_3$$R_{10}$, SO$_2$NR$_{11}$R$_{12}$, CN, COR$_{10}$, COOR$_{10}$ or CONR$_{11}$R$_{12}$; $R_6$, $R_7$, $R_8$, $R_9$, $R_{13}$, $R_{14}$ and $R_{15}$ are SO$_3$R$_{10}$, SO$_2$NR$_{11}$R$_{12}$, NO$_2$, $C_1$-$C_{12}$alkyl, Cl, F or H; and one or more of $R_{10}$, $R_{11}$ or $R_{12}$ a hydroxy group.

3. A colourant composition according to claim 1, wherein the pigment is Colour Index Pigment Yellow 3, 7, 12, 13, 14, 17, 24, 34, 42, 53, 62, 74, 83, 93, 95, 108, 109, 110, 111, 119, 123, 128, 129, 138, 139, 147, 150, 164, 168, 173, 174, 180, 184, 188, 191, 191:1, 191:2, 193, 199, Pigment Orange 5, 13, 16, 34, 40, 43, 48, 49, 51, 61, 64, 71, 73, Pigment Red 2, 4, 5, 23, 48:1, 48:2, 48:3, 48:4, 52:2, 53:1, 57, 57:1, 88, 89, 101, 104, 112, 122, 144, 146, 149, 166, 168, 177, 178, 179, 181, 184, 190, 192, 194, 202, 204, 206, 207, 209, 214, 216, 220, 221, 222, 224, 226, 254, 255, 262, 264, 270, 272, 282, 283, Pigment Brown 23, 24, 33, 42, 43, 44, Pigment Violet 19, 23, 29, 31, 37, 42, Pigment Blue 15, 15:1, 15:2, 15:3, 15:4, 15:6, 16, 25, 26, 28, 29, 60, 64, 66, 80, Pigment Green 7, 17, 36, 37, 50, 3,6-di(3'-cyano-phenyl)-2,5-dihydro-pyrrolo[3,4-c]pyrrole-1,4-dione, 3-phenyl-6-(4'-tert-butyl-phenyl)-2,5-dihydro-pyrrolo[3,4-c]pyrrole-1,4-dione or Vat Red 74, or a mixture thereof.

4. A colourant composition according to claim 1, which is a photoresist composition.

5. A composition comprising from 0.1 to 70% by weight of a colourant composition according to claim 1 and a liquid medium comprising a binder or a polymerisable compound.

6. A process for manufacturing a colour filter, wherein a composition according to claim 5 is applied onto a transparent substrate optionally comprising patterned or not patterned layers thereon, and the composition is dried and/or cured to give a patterned layer.

7. A colourant composition according to claim 1 comprising in a weight ratio of from 95:5 to 30:70, a pigment of average particle size from 10 to 200 nm and a compound of formula I or II.

8. A colourant composition according to claim 1 wherein $R_{13}$, $R_{14}$ and $R_{15}$ are each identical to $R_7$, $R_8$ and $R_9$, respectively and $R_{16}$, $R_{17}$, $R_{18}$, $R_{19}$ and $R_{20}$ are each identical to $R_1$, $R_2$, $R_3$, $R_4$ and $R_5$, respectively.

* * * * *